(12) United States Patent
Avalos et al.

(10) Patent No.: US 12,529,038 B2
(45) Date of Patent: *Jan. 20, 2026

(54) APPLYING OPTOGENETIC AMPLIFIER CIRCUITS FOR MULTI-PHASE LIGHT CONTROLLED MICROBIAL FERMENTATIONS

(71) Applicant: The Trustees of Princeton University, Princeton, NJ (US)

(72) Inventors: Jose L. Avalos, Princeton, NJ (US); Jared E. Toettcher, Princeton, NJ (US); Evan M. Zhao, Clarence Center, NY (US); Makoto A. Lalwani, San Jose, CA (US)

(73) Assignee: THE TRUSTEES OF PRINCETON UNIVERSITY, Princeton, NJ (US)

( * ) Notice: Subject to any disclaimer, the term of this patent is extended or adjusted under 35 U.S.C. 154(b) by 197 days.

This patent is subject to a terminal disclaimer.

(21) Appl. No.: 18/087,169

(22) Filed: Dec. 22, 2022

(65) Prior Publication Data

US 2023/0212626 A1     Jul. 6, 2023

Related U.S. Application Data

(60) Provisional application No. 63/292,849, filed on Dec. 22, 2021.

(51) Int. Cl.
    *C12N 9/04*     (2006.01)
    *C12N 1/16*     (2006.01)
    *C12N 9/10*     (2006.01)
    *C12N 9/88*     (2006.01)
    (Continued)

(52) U.S. Cl.
    CPC ............. *C12N 9/0006* (2013.01); *C12N 1/16* (2013.01); *C12N 9/1022* (2013.01); *C12N 9/88* (2013.01);
    (Continued)

(58) Field of Classification Search
    CPC . C12P 7/56; C12P 7/00; C12N 9/0006; C12N 1/16
    See application file for complete search history.

(56) References Cited

U.S. PATENT DOCUMENTS 11,859,223 B2 *   1/2024   Avalos ................... C12N 13/00
2019/0119331 A1   4/2019   Avalos et al.

OTHER PUBLICATIONS

Ghosh. Transcriptional regulation using the Q system in transgenic zebrafish. Methods Cell Biol. 2016; 135:205-18.*

(Continued)

*Primary Examiner* — Yong D Pak
(74) *Attorney, Agent, or Firm* — Meagher Emanuel Laks Goldberg & Liao, LLP

(57) ABSTRACT

Disclosed is a technique for constructing optogenetic amplifier and inverter circuits utilizing transcriptional activator/repressor pairs, in which expression of the transcriptional activator or repressor, respectively, is controlled by light-controlled transcription factors. This system is demonstrated utilizing the quinic acid regulon system from *Neurospora crassa*, or Q System, a transcriptional activator/repressor system. This is also demonstrated utilizing the galactose regulon from *Saccharomyces cerevisiae*, or GAL System. Such optogenetic amplifier circuits enable multi-phase microbial fermentations, in which different light schedules are applied in each phase to dynamically control different metabolic pathways for the production of proteins, fuels or chemicals. The orthogonal nature of the Q and GAL systems enable the co-expression of amplifier and inverter circuits to simultaneously amplify and invert the response of light-controlled transcriptional controls over different sets of genes in the same cell.

4 Claims, 32 Drawing Sheets

(51) Int. Cl.
*C12N 15/63* (2006.01)
*C12N 15/81* (2006.01)
*C12P 7/00* (2006.01)
*C12P 7/56* (2006.01)
*C12P 17/06* (2006.01)

(52) U.S. Cl.
CPC .......... *C12N 15/635* (2013.01); *C12N 15/81* (2013.01); *C12P 7/56* (2013.01); *C12P 17/06* (2013.01); *C12Y 101/01027* (2013.01); *C12Y 202/01006* (2013.01); *C12Y 401/01005* (2013.01); *C12Y 403/01023* (2013.01); *C12Y 403/01024* (2013.01); *C12N 2529/10* (2013.01); *C12N 2800/102* (2013.01); *C12N 2830/002* (2013.01)

(56) References Cited

OTHER PUBLICATIONS

Zhao, Evan M. et al., "Optogenic Amplification Circuits for Light-Induced Metabolic Control," ACS Synthetic Biology, vol. 10, pp. 1143-1154, Apr. 9, 2021.

Lalwani, Makoto A. et al., "The Neurospora crassa Inducible Q System Enables Simultaneous Optogenetic Amplification and Inversion in Saccharomyces cerevisiae for Bidirectional Control of Gene Expression," ACS Synthetic Biology, vol. 10, No. 8, pp. 2060-2075, Aug. 4, 2021.

Rivera-Cancel, Giomar et al., "Identification of natural and artificial DNA substrates for light-activated LOV-HTH transcription factor EL222", Biochemistry, vol. 51, No. 50, pp. 10024-10034, Dec. 18, 2012.

Motta-Mena, Laura B. et al., "An optogenetic gene expression system with rapid activation and deactivation kinetics," Nature Chemical Biology, vol. 10, No. 3, pp. 196-202, Mar. 2014.

Zhao, Evan M. et al., "Optogenetic regulation of engineered cellular metabolism for microbial chemical production," Nature, vol. 555, No. 7698, pp. 683-687, Mar. 29, 2018.

Zhao, Evan M. et al., "Design and Characterization of Rapid Optogenetic Circuits for Dynamic Control in Yeast Metabolic Engineering," ACS Synthetic Biology, vol. 9, No. 12, pp. 3254-3266, Nov. 24, 2020.

Lovelett, Robert J. et al., "Dynamical Modeling of Optogenetic Circuits in Yeast for Metabolic Engineering Applications," ACS Synthetic Biology, vol. 10, No. 2, pp. 219-227, Jan. 25, 2021.

* cited by examiner

| Plasmid | Position 1 | Position 2 | Position 3 | Position 4 | Position 5 | Position 6 | Position 7 | Marker | Vector type |
|---|---|---|---|---|---|---|---|---|---|
| EZ-L175 | P$_{PGK1}$_VP16-EL222_T$_{CYC1}$ | P$_{C120}$_GAL4_T$_{ACT1}$ | P$_{GAL1}$_GFP_T$_{ADH1}$ | EMPTY | EMPTY | EMPTY | EMPTY | HIS3 | Integration into HIS3 Locus |
| EZ-L316 | P$_{PGK1}$_VP16-EL222_T$_{CYC1}$ | P$_{C120}$_GAL4_T$_{ACT1}$ | P$_{GAL1-M}$_GFP_T$_{ADH1}$ | EMPTY | EMPTY | EMPTY | EMPTY | HIS3 | Integration into HIS3 Locus |
| EZ-L319 | P$_{PGK1}$_VP16-EL222_T$_{CYC1}$ | P$_{C120}$_GAL4_T$_{ACT1}$ | P$_{GAL10}$_GFP_T$_{ADH1}$ | EMPTY | EMPTY | EMPTY | EMPTY | HIS3 | Integration into HIS3 Locus |
| EZ-L320 | P$_{PGK1}$_VP16-EL222_T$_{CYC1}$ | P$_{C120}$_GAL4_T$_{ACT1}$ | P$_{GAL2}$_GFP_T$_{ADH1}$ | EMPTY | EMPTY | EMPTY | EMPTY | HIS3 | Integration into HIS3 Locus |
| EZ-L321 | P$_{PGK1}$_VP16-EL222_T$_{CYC1}$ | P$_{C120}$_GAL4_T$_{ACT1}$ | P$_{GAL7}$_GFP_T$_{ADH1}$ | EMPTY | EMPTY | EMPTY | EMPTY | HIS3 | Integration into HIS3 Locus |
| EZ-L339 | P$_{PGK1}$_VP16-EL222_T$_{CYC1}$ | P$_{C120}$_GAL4_T$_{ACT1}$ | P$_{GAL10-M}$_GFP_T$_{ADH1}$ | EMPTY | EMPTY | EMPTY | EMPTY | HIS3 | Integration into HIS3 Locus |
| EZ-L380 | P$_{PGK1}$_VP16-EL222_T$_{CYC1}$ | P$_{C120}$_GAL4_T$_{ACT1}$ | P$_{GAL1-M}$_ILV2_T$_{ADH1}$ | EMPTY | EMPTY | EMPTY | EMPTY | HIS3 | Integration into HIS3 Locus |
| EZ-L390 | P$_{PGK1}$_ILV3_T$_{CYC1}$ | P$_{TEF1}$_CoxIV_adhA$^{RE1}$_T$_{ACT1}$ | P$_{GAL1-M}$_ILV2_T$_{ADH1}$ | EMPTY | P$_{TEF1}$_ILV5_T$_{ACT1}$ | P$_{TDH1}$_CoxIV_ARO10_T$_{ADH1}$ | EMPTY | URA3 | 2μ |
| EZ-L444 | P$_{PGK1}$_VP16-EL222_T$_{CYC1}$ | P$_{C120}$_GAL4_T$_{ACT1}$ | P$_{GAL1-S}$_GFP_T$_{ADH1}$ | EMPTY | EMPTY | EMPTY | EMPTY | HIS3 | Integration into HIS3 Locus |
| EZ-L545 | P$_{TEF1}$_VP16-EL222$^{A79Q}$_T$_{CYC1}$ | P$_{C120}$_GFP_T$_{ADH1}$ | EMPTY | EMPTY | EMPTY | EMPTY | EMPTY | HIS3 | Integration into HIS3 Locus |
| EZ-L560 | P$_{TEF1}$_VP16-EL222$^{A79Q}$_T$_{CYC1}$ | P$_{C120}$_GAL4_T$_{ACT1}$ | P$_{GAL1-S}$_GFP_T$_{ADH1}$ | EMPTY | EMPTY | EMPTY | EMPTY | HIS3 | Integration into HIS3 Locus |

FIG. 7A

| Plasmid | Position 1 | Position 2 | Position 3 | Position 4 | Position 5 | Position 6 | Position 7 | Marker | Vector type |
|---|---|---|---|---|---|---|---|---|---|
| EZ-L580 | P$_{TEF1}$_VP16-EL222$^{A79Q}$_T$_{CYC1}$ | P$_{C120}$_GAL4_T$_{ACT1}$ | P$_{RNR2}$_GAL80_PSD_T$_{ADH1}$ | EMPTY | EMPTY | EMPTY | EMPTY | HIS3 | Integration into HIS3 Locus |
| EZ-L582 | P$_{TEF1}$_VP16-EL222$^{A79Q}$_T$_{CYC1}$ | P$_{C120}$_GAL4_T$_{ACT1}$ | EMPTY | EMPTY | P$_{C120}$_GAL4_T$_{ACT1}$ | P$_{GAL1-S}$_GFP_T$_{ADH1}$ | EMPTY | HIS3 | Integration into HIS3 Locus |
| EZ-L583 | P$_{TEF1}$_VP16-EL222$^{A79Q}$_T$_{CYC1}$ | P$_{ADH1}$_GAL80_PSD_T$_{ADH1}$ | EMPTY | EMPTY | P$_{C120}$_GAL4_T$_{ACT1}$ | P$_{GAL1-S}$_GFP_T$_{ADH1}$ | EMPTY | HIS3 | Integration into HIS3 Locus |
| EZ-L605 | P$_{GAL1-S}$_LDH_T$_{ADH1}$ | EMPTY | EMPTY | EMPTY | EMPTY | EMPTY | EMPTY | URA3 | 2μ |
| EZ-L645 | P$_{TEF1}$_AtC4H-AtATR2_T$_{ACT1}$ | P$_{GAL1-S}$_AtPAL_T$_{ADH1}$ | P$_{PGK1}$_At4CL2_T$_{CYC1}$ | EMPTY | P$_{GAL1-S}$_FjTAL1_T$_{TPS1}$ | P$_{TDH3}$_HaCHS_T$_{ADH1}$ | EMPTY | URA3 | 2μ |
| EZ-L891 | P$_{PGK1}$_RK11_T$_{CYC1}$ | P$_{C120}$_GAL4_T$_{ACT1}$ | P$_{GAL7-S}$_GFP_T$_{ADH1}$ | EMPTY | EMPTY | EMPTY | EMPTY | HIS3 | Integration into HIS3 Locus |
| pMAL236 | P$_{TDH3}$_RK11_T$_{ADH1}$ | P$_{TEF1}$_TAL1_T$_{ACT1}$ | P$_{HHF2}$_TKL1_T$_{SA1}$ | P$_{CCW12}$_ARO4$^{K229L}$_T$_{ENO1}$ | P$_{PGK1}$_ARO7$^{G141S}$_T$_{CYC1}$ | P$_{TEF1}$_ARO2_T$_{ACT1}$ | P$_{TDH3}$_ARO1_T$_{ADH1}$ | LEU2 | Integration into LEU2 Locus |
| pMAL311 | P$_{PGK1}$_ARO8_T$_{CYC1}$ | P$_{TDH3}$_ACC1$^{S1157A}$_T$_{ADH1}$ | EMPTY | EMPTY | EMPTY | EMPTY | EMPTY | Zeocin | Integration into δ sites |
| pMAL399 | P$_{TEF1}$_TYR1_T$_{ACT1}$ | P$_{CCW12}$_PHA2_T$_{ENO1}$ | EMPTY | EMPTY | EMPTY | EMPTY | EMPTY | Zeocin | Integration into δ sites |

FIG. 7B

| Plasmid | Position 1 | Position 2 | Position 3 | Position 4 | Position 5 | Position 6 | Marker | Vector | Ref. |
|---|---|---|---|---|---|---|---|---|---|
| pJLA121-PDC1$^{0202}$ | P$_{TEF1}$_PDC1_T$_{ACT1}$ | EMPTY | EMPTY | EMPTY | EMPTY | EMPTY | URA3 | 2μ | 1 |
| pYZ12-B | EMPTY | EMPTY | EMPTY | EMPTY | EMPTY | EMPTY | HIS3 | HIS3 Integration | 5 |
| pYZ23 | EMPTY | EMPTY | EMPTY | EMPTY | EMPTY | EMPTY | Zeocin | δ-site Integration | 5 |
| pYZ162 | EMPTY | EMPTY | EMPTY | EMPTY | EMPTY | EMPTY | LEU2 | LEU2 Integration | 6 |
| EZ-L164 | P$_{GAL1}$_GFP_T$_{ADH1}$ | EMPTY | EMPTY | EMPTY | EMPTY | EMPTY | HIS3 | HIS3 Integration | 7 |

FIG. 7C

| Plasmid | Col2 | Col3 | Col4 | Col5 | Col6 | Col7 | Col8 | Col9 | Ref |
|---|---|---|---|---|---|---|---|---|---|
| EZ_L439 | $P_{TEF1}$_VP16-EL222_$T_{CYC1}$ | $P_{C120}$_GAL80_ODCmut_$T_{ACT1}$ | EMPTY | EMPTY | $P_{C120}$_GAL80_ODCmut_$T_{ACT1}$ | $P_{PGK1}$_GAL4_PSD_$T_{ADH1}$ | HIS3 | HIS3 Integration | 7 |
| pMAL217 | $P_{5xQUAS}$_GFP_$T_{ADH1}$ | EMPTY | EMPTY | EMPTY | EMPTY | EMPTY | HIS3 | HIS3 Integration | This study |
| pMAL217f | $P_{5xQUASf}$_GFP_$T_{ADH1}$ | EMPTY | EMPTY | EMPTY | EMPTY | EMPTY | HIS3 | HIS3 Integration | This study |
| pMAL221 | $P_{5xQUAS}$_GFP_$T_{ADH1}$ | $P_{PGK1}$_QF2_$T_{ACT1}$ | EMPTY | EMPTY | EMPTY | EMPTY | HIS3 | HIS3 Integration | This study |
| pMAL221f | $P_{5xQUASf}$_GFP_$T_{ADH1}$ | $P_{C120}$_QF2_$T_{ACT1}$ | EMPTY | EMPTY | EMPTY | EMPTY | HIS3 | HIS3 Integration | This study |
| pMAL358 | $P_{TEF1}$_VP16-EL222_$T_{CYC1}$ | $P_{C120}$_QF2_$T_{ACT1}$ | $P_{5xQUAS}$_GFP_$T_{ADH1}$ | EMPTY | EMPTY | EMPTY | HIS3 | HIS3 Integration | This study |
| pMAL374 | $P_{GAL1}$_GFP_$T_{ADH1}$ | $P_{PGK1}$_GAL4_$T_{ACT1}$ | EMPTY | EMPTY | EMPTY | EMPTY | HIS3 | HIS3 Integration | This study |

FIG. 7D

| | | | | | | | | | |
|---|---|---|---|---|---|---|---|---|---|
| pMAL379 | P$_{GAL1}$_GFP_T$_{ADH1}$ | P$_{PGK1}$_GAL4_T$_{ACT1}$ | P$_{ADH1}$_QS_T$_{ENO1}$ | EMPTY | EMPTY | EMPTY | HIS3 | HIS3 Integration | This study |
| pMAL380 | P$_{5xQUAS5}$_GFP_T$_{ADH1}$ | P$_{PGK1}$_QF2_T$_{ACT1}$ | P$_{ADH1}$_GAL80_T$_{ENO1}$ | EMPTY | EMPTY | EMPTY | HIS3 | HIS3 Integration | This study |
| pMAL381 | P$_{5xQUAS5}$_GFP_T$_{ADH1}$ | P$_{PGK1}$_QF2_T$_{ACT1}$ | P$_{ADH1}$_QS_T$_{ENO1}$ | EMPTY | EMPTY | EMPTY | HIS3 | HIS3 Integration | This study |
| pMAL382 | P$_{5xQUAS5}$_GFP_T$_{ADH1}$ | P$_{PGK1}$_QF2_T$_{ACT1}$ | P$_{TEF1}$_QS_T$_{ENO1}$ | EMPTY | EMPTY | EMPTY | HIS3 | HIS3 Integration | This study |
| pMAL397 | P$_{GAL1}$_GFP_T$_{ADH1}$ | P$_{PGK1}$_GAL4_T$_{ACT1}$ | EMPTY | EMPTY | EMPTY | EMPTY | HIS3 | HIS3 Integration | This study |
| pMAL398 | P$_{5xQUAS5}$_GFP_T$_{ADH1}$ | P$_{PGK1}$_QF2_T$_{ACT1}$ | EMPTY | EMPTY | EMPTY | EMPTY | HIS3 | HIS3 Integration | This study |
| pMAL498 | P$_{TEF1}$_VP16-EL222_T$_{CYC1}$ | P$_{C120}$_QS_ODCmut_T$_{ENO1}$ | P$_{5xQUAS5}$_GFP_T$_{ADH1}$ | EMPTY | P$_{C120}$_QS_ODCmut_T$_{ENO1}$ | P$_{PGK1}$_QF2_PSD_T$_{ACT1}$ | HIS3 | HIS3 Integration | This study |
| pMAL513 | P$_{TEF1}$_VP16-EL222_T$_{CYC1}$ | P$_{C120}$_QS_T$_{ENO1}$ | P$_{5xQUAS5}$_GFP_T$_{ADH1}$ | EMPTY | P$_{C120}$_QS_T$_{ENO1}$ | P$_{PGK1}$_QF2_T$_{ACT1}$ | HIS3 | HIS3 Integration | This study |

FIG. 7E

| | | | | | | | | |
|---|---|---|---|---|---|---|---|---|
| pMAL557 | P_TDH3_alsS_T_ADH1 | P_CCW12_alsD_T_ENO1 | EMPTY | EMPTY | EMPTY | EMPTY | Zeocin | δ-site Integration | This study |
| pMAL558 | P_GAL1-S_alsS_T_ADH1 | P_CCW12_alsD_T_ENO1 | EMPTY | EMPTY | EMPTY | EMPTY | Zeocin | δ-site Integration | This study |
| pMAL566 | P_C120_QF2_T_ACT1 | P_5xQUASf_GFP_T_ADH1 | EMPTY | EMPTY | EMPTY | EMPTY | LEU2 | LEU2 Integration | This study |
| pMAL570 | P_5xQUASf_GFP_T_ADH1 | P_PGK1_QF2_T_ACT1 | P_NHF2_QS_T_ENO1 | EMPTY | EMPTY | EMPTY | HIS3 | HIS3 Integration | This study |
| pMAL592 | P_C120_QF2_T_ACT1 | P_5xQUASf_TagBFP_T_ADH1 | EMPTY | EMPTY | EMPTY | EMPTY | LEU2 | LEU2 Integration | This study |
| pMAL609 | P_TEF1_VP16-EL222^A79Q_T_CYC1 | P_RNR2_QS_PSD_T_ENO1 | P_C120_QF2_T_ACT1 | P_5xQUASf_GFP_T_ADH1 | EMPTY | EMPTY | HIS3 | HIS3 Integration | This study |
| pMAL653 | P_TEF1_TagBFP_T_SSA1 | EMPTY | EMPTY | EMPTY | EMPTY | EMPTY | LEU2 | LEU2 Integration | This study |

FIG. 7F

| pMAL669 | $P_{TEF1}$_VP16-EL222_$T_{CYC1}$ | $P_{C120}$_QF2_$T_{ACT1}$ | $P_{5xQUASf}$_GFP_$T_{ADH1}$ | EMPTY | $P_{C120}$_QF2_$T_{ACT1}$ | EMPTY | HIS3 | Integration | This study |
|---|---|---|---|---|---|---|---|---|---|
| pMAL716 | $P_{TEF1}$_VP16-EL222_$T_{CYC1}$ | $P_{C120}$_QF2_$T_{ACT1}$ | $P_{5xQUASf}$_GFP_$T_{ADH1}$ | $P_{CCW12}$_QS_PSD_$T_{ENO1}$ | EMPTY | EMPTY | HIS3 | Integration | This study |
| pMAL722 | $P_{TEF1}$_VP16-EL222^{A79Q}_$T_{CYC1}$ | $P_{C120}$_QF2_$T_{ACT1}$ | $P_{5xQUASf}$_GFP_$T_{ADH1}$ | EMPTY | EMPTY | EMPTY | HIS3 | Integration | This study |
| pMAL723 | $P_{TEF1}$_VP16-EL222^{A79Q}_$T_{CYC1}$ | $P_{C120}$_QF2_$T_{ACT1}$ | $P_{5xQUASf}$_GFP_$T_{ADH1}$ | $P_{PGK1}$_QS_PSD_$T_{ENO1}$ | EMPTY | EMPTY | HIS3 | Integration | This study |
| pMAL724 | $P_{TEF1}$_VP16-EL222^{A79Q}_$T_{CYC1}$ | $P_{C120}$_QF2_$T_{ACT1}$ | $P_{5xQUASf}$_GFP_$T_{ADH1}$ | $P_{CCW12}$_QS_PSD_$T_{ENO1}$ | EMPTY | EMPTY | HIS3 | Integration | This study |

FIG. 7G

| | | | | | | | | |
|---|---|---|---|---|---|---|---|---|
| pMAL728 | P$_{TEF1}$_VP16-EL222$^{A79Q}$_T$_{CYC1}$ | P$_{C120}$_QF2_T$_{ACT1}$ | P$_{5xQUAS f}$_GFP_T$_{ADH1}$ | P$_{CCW12}$_QS_PSD_T$_{ENO1}$ | P$_{C120}$_QF2_T$_{ACT1}$ | EMPTY | HIS3 | HIS3 Integration | This study |
| pMAL741 | P$_{C120}$_QF2_T$_{ACT1}$ | P$_{CCW12}$_QS_PSD_T$_{ENO1}$ | EMPTY | EMPTY | EMPTY | EMPTY | LEU2 | LEU2 Integration | This study |
| pMAL743 | P$_{C120}$_QF2_T$_{ACT1}$ | P$_{5xQUASf}$_MCS_T$_{ADH1}$ | EMPTY | EMPTY | EMPTY | EMPTY | LEU2 | LEU2 Integration | This study |
| pMAL745 | P$_{5xQUASf}$_GFP_T$_{ADH1}$ | P$_{PGK1}$_QF2_T$_{ACT1}$ | P$_{HHF2}$_QS_T$_{ENO1}$ | P$_{PGK1}$_qa-y_T$_{CYC1}$ | EMPTY | EMPTY | HIS3 | HIS3 Integration | This study |
| pMAL778 | P$_{TDH3}$_ERG20$^{F96C}$_T$_{ADH1}$ | P$_{GAL1-S}$_MaLIS_T$_{ADH1}$ | P$_{5xQUASf}$_ObGES_T$_{SSA1}$ | EMPTY | EMPTY | EMPTY | URA3 | 2μ | This study |

FIG. 7H

| Strain Name | Genotype | Source |
|---|---|---|
| BY4741 | S288C MATa his3Δ1 leu2Δ0 met15Δ0 ura3Δ0 | 1 |
| CEN.PK2-1C | MATa his3Δ1 leu2-3_112 trp1-289 ura3-53 | 2 |
| YEZ44 | CEN.PK2-1C gal80::KanMX gal4::HygB | 3 |
| YEZ72 | YEZ44 HIS3cg::(P_PGK1_VP16-EL222_T_CYC1, P_C120_GAL4_T_ACT1, P_GAL1_GFP_T_ADH1) | This Study |
| YEZ133 | YEZ44 HIS3cg::(P_PGK1_VP16-EL222_T_CYC1, P_C120_GAL4_T_ACT1, P_GAL1-M_GFP_T_ADH1) | This Study |
| YEZ139 | YEZ44 HIS3cg::(P_TEF1_VP16-EL222_T_CYC1, P_C120_GFP_T_ADH1) | 3 |
| YEZ140 | CEN.PK2-1C HIS3cg | 3 |
| YEZ141 | YEZ44 HIS3cg::(P_PGK1_VP16-EL222_T_CYC1, P_C120_GAL4_T_ACT1, P_GAL10_GFP_T_ADH1) | This Study |
| YEZ142 | YEZ44 HIS3cg::(P_PGK1_VP16-EL222_T_CYC1, P_C120_GAL4_T_ACT1, P_GAL2_GFP_T_ADH1) | This Study |
| YEZ143 | YEZ44 HIS3cg::(P_PGK1_VP16-EL222_T_CYC1, P_C120_GAL4_T_ACT1, P_GAL7_GFP_T_ADH1) | This Study |
| YEZ163 | YEZ44 HIS3cg::(P_PGK1_VP16-EL222_T_CYC1, P_C120_GAL4_T_ACT1, P_GAL1-M_GFP_T_ADH1) | This Study |
| YEZ186 | CEN.PK2-1C HIS3::P_TEF1_GFP_T_CYC1 | 3 |
| YEZ189 | YEZ44 HIS3cg::(P_PGK1_VP16-EL222_T_CYC1, P_C120_GAL4_T_ACT1, P_GAL10-M_GFP_T_ADH1) | This Study |
| YEZ214 | YEZ44 HIS3cg::(P_PGK1_VP16-EL222_T_CYC1, P_C120_GAL4_T_ACT1, P_GAL1-S_GFP_T_ADH1) | This Study |

FIG. 8A

| Strain Name | Genotype | Source |
|---|---|---|
| YEZ292 | YEZ44 HIS3cg::(P_TEF1_VP16-EL222^A79Q _T_CYC1, P_C120_GAL4_T_ACT1, P_GAL1-S_GFP_T_ADH1) | This Study |
| YEZ293 | YEZ44 HIS3cg::(P_TEF1_VP16-EL222^A79Q _T_CYC1, P_C120_GFP_T_ADH1) | This Study |
| YEZ336 | YEZ44 HIS3cg::(P_TEF1_VP16-EL222^A79Q _T_CYC1, P_RNR2_GAL80_PSD_T_ADH1, P_C120_GAL4_T_ACT1, P_GAL1-S_GFP_T_ADH1) | This Study |
| YEZ337 | YEZ44 HIS3cg::(P_TEF1_VP16-EL222^A79Q _T_CYC1, P_ADH1_GAL80_PSD_T_ADH1, P_C120_GAL4_T_ACT1, P_GAL1-S_GFP_T_ADH1) | This Study |
| YEZ423 | YEZ336 + EZ-L605 | This Study |
| YEZ480 | JCy125 HIS3cg::(P_TEF1_VP16-EL222^A79Q _T_CYC1, P_C120_GAL4_T_ACT1, P_RNR2_GAL80_PSD_T_ADH1) | |
| YEZ482 | YEZ480 LEU2::(P_TDH3_RKI1_T_ADH1, P_TEF1_TAL1_T_ACT1, P_PGK1_PAD1_T_CYC1, P_HHF2_TKL1_T_SSA1, P_CCW12_ARO4(K229L)_T_ENO1, P_TDH3_ARO1(D1407A)_T_ADH1, P_TEF1_ARO2_T_ACT1, P_PGK1_ARO7(G141S)_T_CYC1) | This Study |
| YEZ486 | YEZ482 YARCdelta5::(P_PGK1_ARO8_T_CYC1, P_TDH3_ACC1(S1157A)_T_ADH1, P_TEF1_TYR1_T_ACT1, P_CCW12_PHA2_T_ENO1) | This Study |
| YEZ488 | YEZ486 + EZ-L645 | This Study |
| YEZ516 | YEZ336 + EZ-L390 | This Study |
| JCY125 | CEN.PK2-1C gal80 gal4 aro10::KanMX | |

FIG. 8B

| Strain Name | Genotype | Source |
|---|---|---|
| BY4741 | S288C MATa his3Δ1 leu2Δ0 met15Δ0 ura3Δ0 | 8 |
| CEN.PK2-1C | MATa his3Δ1 leu2-3_112 trp1-289 ura3-53 | 9 |
| Y202 | S288C gal80::KanMX, pdc1Δ, pdc5Δ, pdc6Δ + pJLA121-PDC1$^{0202}$ | 5 |
| YEZ25 | CEN.PK2-1C gal80::KanMX | 7 |
| YEZ44 | CEN.PK2-1C gal80, gal4 | 5 |
| YEZ82 | YEZ44 HIS3$_{cg}$::HIS3$_{sg}$ (P$_{GAL1}$_GFP_T$_{ADH1}$) | This Study |
| YEZ101 | YEZ44 HIS3$_{cg}$::HIS3$_{sg}$ (P$_{TEF1}$_VP16-EL222_T$_{CYC1}$, P$_{C120}$_GAL80_T$_{ACT1}$, P$_{GAL1}$_GFP_T$_{ADH1}$, P$_{C120}$_GAL80_T$_{ADH1}$, P$_{PGK1}$_GAL4_T$_{ACT1}$) | 5 |
| YEZ139 | CEN.PK2-1C HIS3::(P$_{PGK1}$_VP16-EL222_T$_{CYC1}$, P$_{C120}$_GFP_T$_{ADH1}$) | 5 |
| YEZ140 | CEN.PK2-1C HIS3::HIS3$_{cg}$ | 5 |
| YEZ186 | CEN.PK2-1C HIS3$_{cg}$ (P$_{TEF1}$_GFP_T$_{CYC1}$) | 5 |
| YEZ207 | S288C gal80 gpd1 pdc1Δ, pdc5Δ, pdc6Δ + pJLA121-PDC1$^{0202}$ HIS3::HIS3$_{cg}$ (P$_{TEF1}$_VP16-EL222_T$_{CYC1}$, P$_{C120}$_GAL80_ODCmut_T$_{ACT1}$, P$_{PGK1}$_GAL4_PSD_T$_{ADH1}$) | 7 |

FIG. 8C

| | | |
|---|---|---|
| YEZ72 | YEZ44 HIS3::HIS3$_{cg}$_(P$_{TEF1}$_VP16-EL222_T$_{CYC1}$, P$_{C120}$_GAL4_T$_{ACT1}$, P$_{GAL1}$_GFP_T$_{ADH1}$) | 6 |
| YEZ230 | YEZ25 HIS3::HIS3$_{cg}$_(P$_{TEF1}$_VP16-EL222_T$_{CYC1}$, P$_{C120}$_GAL80_ODCmut_T$_{ACT1}$, P$_{GAL1-M}$_GFP_T$_{ADH1}$, P$_{C120}$_GAL80_ODCmut_T$_{ADH1}$, P$_{PGK1}$_GAL4_PSD_T$_{ACT1}$) | 7 |
| yMAL49 | CEN.PK2-1C HIS3::HIS3$_{cg}$_(P$_{5xQUAS}$_GFP_T$_{ADH1}$) | This Study |
| yMAL49f | CEN.PK2-1C HIS3::HIS3$_{cg}$_(P$_{5xQUAS}$_GFP_T$_{ADH1}$) | This Study |
| yMAL53 | CEN.PK2-1C HIS3::HIS3$_{cg}$_(P$_{5xQUAS}$_GFP_T$_{ADH1}$, P$_{PGK1}$_QF2_T$_{ACT1}$) | This Study |
| yMAL53f | CEN.PK2-1C HIS3::HIS3$_{cg}$_(P$_{5xQUAS}$_GFP_T$_{ADH1}$, P$_{PGK1}$_QF2_T$_{ACT1}$) | This Study |
| yMAL110 | CEN.PK2-1C HIS3::HIS3$_{cg}$_(P$_{5xQUAS}$_GFP_T$_{ADH1}$, P$_{PGK1}$_QF2_T$_{ACT1}$, P$_{ADH1}$_QS_T$_{ENO1}$) | This Study |
| yMAL111 | CEN.PK2-1C HIS3::HIS3$_{cg}$_(P$_{5xQUAS}$_GFP_T$_{ADH1}$, P$_{PGK1}$_QF2_T$_{ACT1}$, P$_{TEF1}$_QS_T$_{ENO1}$) | This Study |
| yMAL112 | CEN.PK2-1C HIS3::HIS3$_{cg}$_(P$_{5xQUAS}$_GFP_T$_{ADH1}$, P$_{PGK1}$_QF2_T$_{ACT1}$, P$_{HHF2}$_QS_T$_{ENO1}$) | This Study |
| yMAL155 | YEZ25 HIS3::HIS3$_{cg}$_(P$_{TEF1}$_VP16-EL222_T$_{CYC1}$, P$_{C120}$_GAL80_ODCmut_T$_{ADH1}$, P$_{PGK1}$_GAL4_PSD_T$_{ACT1}$) | This Study |
| yMAL176 | CEN.PK2-1C HIS3::HIS3$_{cg}$_(P$_{5xQUAS}$_GFP_T$_{ADH1}$, P$_{PGK1}$_QF2_T$_{ACT1}$, P$_{5xQUAS}$_GFP_T$_{ENO1}$) | This Study |
| yMAL194 | YEZ44 HIS3::HIS3$_{cg}$_(P$_{GAL1}$_GFP_T$_{ADH1}$) | This Study |
| yMAL195 | YEZ44 HIS3::HIS3$_{cg}$_(P$_{5xQUAS}$_GFP_T$_{ADH1}$, P$_{PGK1}$_GAL4_T$_{ACT1}$) | This Study |
| yMAL197 | YEZ44 HIS3::HIS3$_{cg}$_(P$_{5xQUAS}$_GFP_T$_{ADH1}$, P$_{ADH1}$_QS_T$_{ENO1}$) | This Study |

FIG. 8D

| | | |
|---|---|---|
| yMAL198 | YEZ44 HIS3::HIS3$_{cg}$ (P$_{5xQUAS}$ GFP_T$_{ADH1}$, P$_{PGK1}$_QF2_T$_{ACT1}$, P$_{ADH1}$_GAL80_T$_{ENO1}$) | This Study |
| yMAL207 | YEZ44 HIS3::HIS3$_{cg}$ (P$_{5xQUAS}$ GFP_T$_{ADH1}$) | This Study |
| yMAL227 | CEN.PK2-1C HIS3::HIS3$_{cg}$ (P$_{TEF1}$_VP16-EL222_T$_{CYC1}$, P$_{C120}$_QS_T$_{ENO1}$, P$_{5xQUAS}$_GFP_T$_{ADH1}$, P$_{C120}$_QS_T$_{ENO1}$, P$_{PGK1}$_QF2_T$_{ACT1}$) | This Study |
| yMAL239 | CEN.PK2-1C HIS3::HIS3$_{cg}$ (P$_{TEF1}$_VP16-EL222_T$_{CYC1}$, P$_{C120}$_QS_ODCmut_T$_{ENO1}$, P$_{5xQUAS}$_GSP_T$_{ADH1}$, P$_{C120}$_QS_ODCmut_T$_{ENO1}$, P$_{PGK1}$_QF2_PSD_T$_{ACT1}$) | This Study |
| yMAL241 | YEZ207 (pJLA121-PDC1$^{0202}$ removed) | This Study |
| | LEU2::LEU2$_{cg}$ (P$_{C120}$_QF2_T$_{ACT1}$, P$_{5xQUAS}$ PDC1_T$_{ADH1}$) | |
| yMAL243 | CEN.PK2-1C HIS3::HIS3$_{cg}$ (P$_{TEF1}$_VP16-EL222$^{A79Q}$_T$_{CYC1}$, P$_{RNR2}$_QS_PSD_T$_{ENO1}$, P$_{C120}$_QF2_T$_{ACT1}$, P$_{5xQUAS}$ GFP_T$_{ADH1}$) | This Study |
| yMAL245 | YEZ230 LEU2::LEU2$_{cg}$ (P$_{C120}$_QF2_T$_{ACT1}$, P$_{5xQUAS}$_MCS_T$_{ADH1}$) | This Study |
| yMAL246 | YEZ230 LEU2::LEU2$_{cg}$ (P$_{C120}$_QF2_T$_{ACT1}$, P$_{5xQUAS}$_TagBFP_T$_{ADH1}$) | This Study |
| yMAL248 | yMAL155 LEU2::LEU2$_{cg}$ (P$_{C120}$_QF2_T$_{ACT1}$, P$_{5xQUAS}$_MCS_T$_{ADH1}$) | This Study |
| yMAL249 | yMAL155 LEU2::LEU2$_{cg}$ (P$_{C120}$_QF2_T$_{ACT1}$, P$_{5xQUAS}$_TagBFP_T$_{ADH1}$) | This Study |
| yMAL251 | YEZ44 HIS3::HIS3$_{cg}$ (P$_{GAL1}$_GFP_T$_{ADH1}$, P$_{PGK1}$_QF2_T$_{ACT1}$) | This Study |
| yMAL268 | YEZ44 HIS3::HIS3$_{cg}$ (P$_{5xQUAS}$_GFP_T$_{ADH1}$, P$_{PGK1}$_QF2_T$_{ACT1}$) | This Study |

FIG. 8E

| | | |
|---|---|---|
| yMAL270 | YEZ186 LEU2::LEU2$_{cg}$ (P$_{TEF1}$_TagBFP_T$_{SSA1}$) | This Study |
| yMAL273 | CEN.PK2-1C HIS3::HIS3$_{cg}$ (P$_{TEF1}$_VP16-EL222_T$_{CYC1}$, P$_{C120}$_QF2_T$_{ACT1}$, P$_{5xQUAS}$_GFP_T$_{ADH1}$, P$_{C120}$_QF2_T$_{ACT1}$) | This Study |
| yMAL298 | CEN.PK2-1C HIS3::HIS3$_{cg}$ (P$_{TEF1}$_VP16-EL222_T$_{CYC1}$, P$_{C120}$_QF2_T$_{ACT1}$, P$_{5xQUAS}$_GFP_T$_{ADH1}$, P$_{CCW12}$_QS_PSD_T$_{ENO1}$) | This Study |
| yMAL299 | CEN.PK2-1C HIS3::HIS3$_{cg}$ (P$_{TEF1}$_VP16-EL222$^{A79Q}$_T$_{CYC1}$, P$_{C120}$_QF2_T$_{ACT1}$, P$_{5xQUAS}$_GFP_T$_{ADH1}$) | This Study |
| yMAL300 | CEN.PK2-1C HIS3::HIS3$_{cg}$ (P$_{TEF1}$_VP16-EL222$^{A79Q}$_T$_{CYC1}$, P$_{C120}$_QF2_T$_{ACT1}$, P$_{5xQUAS}$_GFP_T$_{ADH1}$, P$_{PGK1}$_QS_PSD_T$_{ENO1}$) | This Study |
| yMAL301 | CEN.PK2-1C HIS3::HIS3$_{cg}$ (P$_{TEF1}$_VP16-EL222$^{A79Q}$_T$_{CYC1}$, P$_{C120}$_QF2_T$_{ACT1}$, P$_{5xQUAS}$_GFP_T$_{ADH1}$, P$_{CCW12}$_QS_PSD_T$_{ENO1}$) | This Study |
| yMAL305 | CEN.PK2-1C HIS3::HIS3$_{cg}$ (P$_{TEF1}$_VP16-EL222$^{A79Q}$_T$_{CYC1}$, P$_{C120}$_QF2_T$_{ACT1}$, P$_{5xQUAS}$_GFP_T$_{ADH1}$, P$_{CCW12}$_QS_PSD_T$_{ENO1}$) | |
| yMAL310 | yMAL155 LEU2::LEU2$_{cg}$ (P$_{C120}$_QF2_T$_{ACT1}$, P$_{CCW12}$_QS_PSD_T$_{ENO1}$) | This Study |
| yMAL311 | yMAL241 bdh1::NatMX | This Study |
| yMAL321 | CEN.PK2-1C HIS3::HIS3$_{cg}$ (P$_{5xQUAS}$_GFP_T$_{ADH1}$, P$_{PGK1}$_QF2_T$_{ACT1}$, P$_{HHF2}$_QS_T$_{ENO1}$, P$_{PGK1}$_qa-y_T$_{CYC1}$) | This Study |
| yMAL322 | yMAL311 YARCdelta5::(P$_{GAL1-S}$_alsS_T$_{ADH1}$, P$_{CCW12}$_alsD_T$_{ENO1}$) | This Study |
| yMAL323 | yMAL311 YARCdelta5::(P$_{TDH3}$_alsS_T$_{ADH1}$, P$_{CCW12}$_alsD_T$_{ENO1}$) | This Study |

FIG. 8F

| | | |
|---|---|---|
| yMAL327 | S288C gal80 gpd1 pdc1Δ, pdc5Δ, pdc6Δ | This Study |
| | HIS3::HIS3$_{cg}$_(P$_{TEF1}$_VP16-EL222_T$_{CYC1}$, P$_{C120}$_GAL80_ODCmut_T$_{ACT1}$, P$_{C120}$_GAL80_ODCmut_T$_{ACT1}$, P$_{PGK1}$_GAL4_PSD_T$_{ADH1}$) | |
| yMAL328 | yMAL327 LEU2::LEU2$_{cg}$_(P$_{C120}$_QF2_T$_{ACT1}$, P$_{5xQUASf}$_MCS_T$_{ADH1}$) | This Study |
| yMAL331 | yMAL328 bdh1::NatMX | This Study |
| yMAL332 | yMAL331 YARCdelta5::(P$_{GAL1-S}$_alsS_T$_{ADH1}$, P$_{CCW12}$_alsD_T$_{ENO1}$) | This Study |
| yMAL360 | yMAL310 + pMAL778 | This Study |
| yMAL364 | yMAL331 YARCdelta5::(P$_{TDH3}$_alsS_T$_{ADH1}$, P$_{CCW12}$_alsD_T$_{ENO1}$) | This Study |

FIG. 8G

APPLYING OPTOGENETIC AMPLIFIER CIRCUITS FOR MULTI-PHASE LIGHT CONTROLLED MICROBIAL FERMENTATIONS

CROSS-REFERENCE TO RELATED APPLICATIONS

This application claims priority to U.S. Provisional Application No. 63/292,849, filed Dec. 22, 2021, which is incorporated by reference herein in its entirety.

STATEMENT REGARDING FEDERALLY SPONSORED RESEARCH OR DEVELOPMENT

This invention was made with government support under Grant No. DE-SC0019363 awarded by the Department of Energy, Grant No. EB024247 awarded by the National Institutes of Health, and Grant No. CBET-1751840 awarded by the National Science Foundation. The government has certain rights in the invention.

CROSS-REFERENCE TO RELATED APPLICATIONS

This application contains a Sequence Listing which has been submitted electronically in XML format using the ST. 26 standard and is hereby incorporated by reference in its entirety.

BACKGROUND

Dynamic control of microbial metabolism is an effective strategy to improve chemical production in fermentations. While dynamic control is most often implemented using chemical inducers, optogenetics offers an attractive alternative due to the high tunability and reversibility afforded by light. However, a major concern of applying optogenetics in metabolic engineering is the risk of insufficient light penetration at high cell densities, especially in large bioreactors.

BRIEF SUMMARY

Various deficiencies in the prior art are addressed below by the disclosed techniques.

Disclosed herein is applying optogenetic amplifier and invert circuits useful for, e.g., multi-phase light controlled microbial fermentations.

In some embodiments, a yeast cell may be provided that may include a first optogenetic gene expression system (OGES). The first OGES may include a first sequence encoding a transcriptional activator under a first promoter. The first OGES may optionally include a second sequence encoding a transcriptional repressor under a second promoter. The first OGES may include a third sequence encoding a protein or enzyme of interest downstream of a promoter activated by the transcriptional activator. The first OGES may include a fourth sequence encoding a light-responsive transcription factor that controls either the first promoter or the second promoter.

In various embodiments, the light-responsive transcription factor may control the first promoter. This can be understood as forming an amplifier circuit.

In some embodiments, the first optogenetic gene expression system contains a system, an amplifier circuit (OptoQ-AMP), defined by: (i) the transcriptional activator is a QF or truncated QF transcriptional activator; (ii) the transcriptional repressor is a QS transcriptional repressor; and (iii) the promoter activated by the transcriptional activator is a QF- or truncated QF-activated promoter. In some embodiments, the QF or truncated QF transcriptional activator may be a QF2 transcriptional activator. In some embodiments, the QF- or truncated QF-activated promoter may be a promoter containing $P_{5xQUAS}$ or a $P_{5xQUAS}$ mutant sequence, where in some embodiments, the $P_{5xQUAS}$ mutant may be a modified version of $P_{5xQUAS}$ where all CGG sequences are replaced with AGG sequences. In some embodiments, the QF or truncated QF transcriptional activator may be fused to a degron domain and/or the QS transcriptional repressor is fused to a degron domain. In some embodiments, the QS transcriptional repressor may be fused to a photosensitive degron domain. In some embodiments, at least some gene expression is configured to be induced by adding quinic acid to a culture medium.

In some embodiments, the first optogenetic gene expression system contains a system, an amplifier circuit (OptoAMP), defined by: (i) the transcriptional activator is a GAL4 transcriptional activator; (ii) the transcriptional repressor is a GAL80 transcriptional repressor; and (iii) the promoter activated by the transcriptional activator is a GAL4-activated promoter. In some embodiments, the GAL4-activated promoter may be $P_{GAL1}$, $P_{GAL10}$, $P_{GAL7}$, $P_{GAL2}$, or a mutant derivative thereof. In some embodiments, the endogenous GAL4 and/or GAL80 are disrupted by mutation or deletion. In some embodiments, the GAL4 transcriptional activator is fused to a degron domain and/or the GAL80 transcriptional repressor is fused to a degron domain. In some embodiments, the GAL80 transcriptional repressor is fused to a photosensitive degron domain. In some embodiments, at least some gene expression is configured to be induced by adding galactose to a culture medium.

In various embodiments, the second sequence is present in the first optogenetic gene expression system and the light-responsive transcription factor controls the second promoter. This can be understood as forming an inverter circuit.

In some embodiments, the first optogenetic gene expression system contains a system, an inverter circuit (OptoQ-INVRT), defined by: (i) the transcriptional repressor is a QS transcriptional repressor; (ii) the transcriptional activator is a QF or truncated QF transcriptional activator; and (iii) the promoter activated by the transcriptional activator is a QF- or truncated QF-activated promoter. In some embodiments, the QF or truncated QF transcriptional activator may be a QF2 transcriptional activator. In some embodiments, the QF- or truncated QF-activated promoter may be a promoter containing $P_{5xQUAS}$ or a $P_{5xQUAS}$ mutant sequence, where in some embodiments, the $P_{5xQUAS}$ mutant may be a modified version of $P_{5xQUAS}$ where all CGG sequences are replaced with AGG sequences. In some embodiments, the QF or truncated QF transcriptional activator may be fused to a degron domain and/or the QS transcriptional repressor is fused to a degron domain. In some embodiments, the QF or truncated QF transcriptional activator may be fused to a photosensitive degron domain. In some embodiments, at least some gene expression is configured to be induced by adding quinic acid to a culture medium.

In some embodiments, the first optogenetic gene expression system contains a system, an inverter circuit (OptoINVRT), defined by: (i) the transcriptional repressor is a GAL80 transcriptional repressor; (ii) the transcriptional activator is a GAL4 transcriptional activator; and (iii) the promoter activated by the transcriptional activator is a GAL4-activated promoter. In some embodiments, the GAL4-activated promoter may be $P_{GAL1}$, $P_{GAL10}$, $P_{GAL7}$, $P_{GAL2}$, or a mutant derivative thereof. In some embodiments, the endogenous GAL4 and/or GAL80 are disrupted by mutation or deletion. In some embodiments, the GAL4 transcriptional activator is fused to a degron domain and/or the GAL80 transcriptional repressor is fused to a degron domain. In some embodiments, the GAL4 transcriptional activator is fused to a photosensitive degron domain. In some embodiments, at least some gene expression is configured to be induced by adding galactose to a culture medium.

In various embodiments, the fourth sequence may encode the blue-light activated VP16-EL222 transcription factor, or an EL222 mutant, controlling the promoter $PC_{120}$.

In various embodiments, the protein or enzyme of interest is a metabolic enzyme to control an endogenous metabolic pathway or a metabolic pathway for synthesis of a desired chemical.

In various embodiments, the yeast cell may include an additional optogenetic gene expression system, the additional optogenetic gene expression system being different from the first optogenetic gene expression system. In some embodiments, the additional optogenetic gene expression system may be orthogonal to the first optogenetic gene expression system. In some embodiments, the first optogenetic gene expression system is OptoQ-AMP and the additional optogenetic gene expression system is OptoINVRT; or the first optogenetic gene expression system is OptoAMP and the additional optogenetic gene expression system is OptoQ-INVRT; or the first optogenetic gene expression system is OptoAMP and the additional optogenetic gene expression system is OptoQ-AMP; or the first optogenetic gene expression system is OptoINVRT and the additional optogenetic gene expression system is OptoQ-INVRT.

In some embodiments, a method may be provided for amplifying and inverting the light controls for regulation of different sets of genes in the same cell. The method may include allowing a yeast culture grown from a yeast cell as disclosed herein to co-express two desired optogenetic gene expression systems that are either: (i) OptoQ-Amp and OptoINVRT; or (ii) OptoAMP and OptoQ-INVRT. The method may include amplifying and inverting the light controls for regulation of different sets of genes by exposing the cell containing the desired optogenetic gene expression systems to at least one period of darkness and/or at least one period exposure to light.

In some embodiments, a method may be provided for operating fermentations. The method may include fermenting yeast grown from a yeast cell as disclosed herein, and, while fermenting, exposing the yeast culture to one or more temporal phases, where each temporal phase has a specific light-duty schedule. In some embodiments, the specific light-duty schedule in each temporal phase may be constant across the temporal phase. In some embodiments, the specific light-duty schedule in at least one temporal phase may continuously change from an initial light condition to a final light condition. In some embodiments, at least one specific light-duty schedule includes darkness, at least one specific light-duty schedule includes constant light exposure, and at least one specific light-duty schedule includes conditions in which multiple cycles of light are on for a first period of time and off for a second period of time, where the second period of time is greater than or equal to the first period of time.

BRIEF DESCRIPTION OF THE FIGURES

The accompanying drawings, which are incorporated in and constitute a part of this specification, illustrate embodiments of the present invention and, together with a general description of the invention given above, and the detailed description of the embodiments given below, serve to explain the principles of the present invention.

FIGS. 7A-7B are tables describing plasmids used for a first set of various examples.

FIGS. 7C-7H are tables describing plasmids used for a second set of various examples.

FIGS. 8A-8B are tables describing yeasts used for a first set of various examples.

FIGS. 8C-8G are tables describing yeasts used for a second set of various examples.

DETAILED DESCRIPTION

Figure 1:
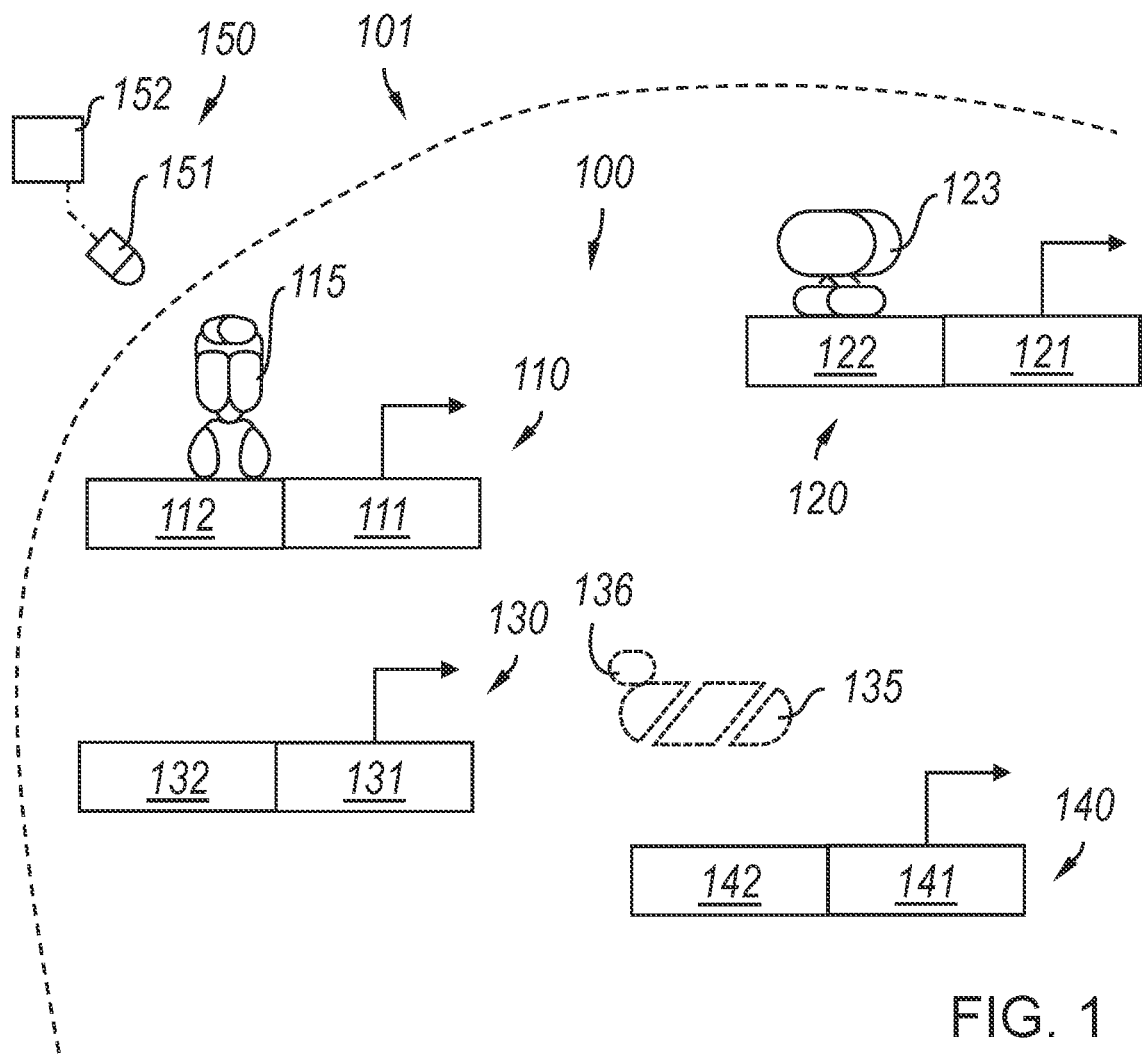
FIG. 1 is a schematic of an embodiment of sequences in a yeast cell.

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for illustrative purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

Disclosed is a technique for constructing optogenetic amplifier and inverter circuits utilizing transcriptional activator/repressor pairs, in which expression of the transcriptional activator or repressor, respectively, is controlled by light-controlled transcription factors. This system is demonstrated utilizing the quinic acid regulon system from *Neurospora crassa*, or Q System, a transcriptional activator/repressor system. This is also demonstrated utilizing the galactose regulon from *Saccharomyces cerevisiae*, or GAL System. Such optogenetic amplifier circuits enable multiphase microbial fermentations, in which different light schedules are applied in each phase to dynamically control different metabolic pathways for the production of proteins, fuels or chemicals. The orthogonal nature of the Q and GAL systems enable the co-expression of amplifier and inverter circuits to simultaneously amplify and invert the response of light-controlled transcriptional controls over different sets of genes in the same cell. Utilizing the Q system allows the construction of circuits in yeast cells for producing desired proteins or enzymes that are inducible using darkness, blue light, or quinic acid, and can be co-utilized with circuitry using the GAL system, which are in turn inducible with blue light, darkness, or galactose.

Disclosed herein is a series of optogenetic circuits which amplify or invert the transcriptional response to blue light. These circuits show high folds of induction between dark and light conditions, efficient activation at light duty cycles as low as ~1%, and strong homogeneous light-induction in bioreactors of at least 5 L, with limited illumination at cell densities above 40 $OD_{600}$. The ability of these circuits to control engineered metabolic pathways in three-phase fermentations using different light schedules to control enzyme expression and improve production of three unique chemical products was demonstrated. These circuits expand the applicability of optogenetics to metabolic engineering.

Bidirectional optogenetic control of yeast gene expression has great potential for biotechnological applications.

Further, ideally, multiple circuits are used together. However, circuits that are not orthogonal (e.g., if two circuits both rely on controlling Gal4p and Gal80p from the galactose (GAL) regulon), they cannot be used simultaneously.

Here, the Q System, a transcriptional activator/inhibitor system from *Neurospora crassa*, has been applied to build circuits in yeast cells that are inducible using quinic acid, darkness, or blue light. Light-repressed OptoQ-INVRT circuits were developed that initiate darkness-triggered transcription within an hour of induction, as well as light-activated OptoQ-AMP circuits that achieve up to 39-fold induction. The Q System does not exhibit crosstalk with the GAL regulon, allowing circuits using the Q System to work together in the same cell with circuits relying on the GAL regulon.

As an example of practical applications in metabolic engineering, simultaneous use of these circuits can be used to dynamically control both growth and production to improve acetoin production, as well as enable light-tunable co-production of geraniol and linalool, two terpenoids implicated in the hoppy flavor of beer. The Q-system-based OptoQ-AMP and OptoQ-INVRT circuits, when combined with the GAL-regulon-based OptoINVRT and OptoAMP, respectively, enable simultaneous optogenetic signal amplification and inversion in the same strain, providing powerful additions to the yeast optogenetic toolkit.

Disclosed herein is applying optogenetic circuits useful for, e.g., multi-phase light controlled microbial fermentations.

In some embodiments, a yeast cell may be provided. Referring to FIG. 1, in some embodiments, the yeast cell 101 may include a plurality of sequences 100 that form an optogenetic gene expression system (OGES). The plurality of sequences may include a first component 110 (i.e., an activator component). The first component may include a first promoter 112, which may be controlled by a light-activated protein, where in the promoter is operably linked to a first gene 111 encoding a transcriptional activator 123 (e.g., such as a QF or truncated QF transcriptional activator, or Gal4). In some embodiments, the QF or truncated QF transcriptional activator may be a QF2 transcriptional activator. In some embodiments, the transcriptional activator may be fused to a degron domain.

In some embodiments, the yeast may optionally include a second component 130 (i.e., a repressor component). The second component may include a second gene 131 encoding a transcriptional repressor 135 (e.g., such as a QS transcriptional repressor or Gal80) under a second promoter 132. In some embodiments, the transcriptional repressor may be fused to a degron domain 136. In some embodiments, the degron domain may be fused to a photosensitive degron domain. That is, if the activator component is light controlled, the repressor may preferably be degraded in light. Further, in any given optogenetic gene expression system, a QS transcriptional repressor is preferably used when a QF or truncated QF transcriptional activator is used, while GAL80 is used when GAL4 is used as the transcriptional activator.

The yeast may also include a third component 120. The third component may include a third gene 121 encoding a protein or at least a portion of a biosynthetic pathway of one or more enzymes, whose expression is driven by a third promoter 122 that is controlled by the transcriptional activator 123. For example, when the transcriptional activator is GAL4, the third promoter may be, e.g., known promoters capable of being controlled by Gal4, including $P_{GAL1}$, $P_{GAL10}$, $P_{GAL7}$, $P_{GAL2}$, or mutants derived from them. In the most preferred embodiments, when GAL4 and/or GAL80 are used in the optogenetic gene expression system, all of the activity of endogenous GAL4 and GAL80 in the yeast cell is disrupted. In some embodiments, the endogenous GAL4 and/or GAL80 may be disrupted by deletion.

The first promoter 112 should be activated by a photosensitive molecule 115, which may be, e.g., a photosensitive protein coupled to a transcription activator. The first promoter is preferably a $P_{C120}$ promoter, that is activated by VP16-EL222 or an EL222 mutant. Thus, the yeast may include a fourth component 140, where the fourth component may include a fourth gene 141 encoding the light-responsive transcription factor 115. Any known light-responsive transcription factor may be used. In some embodiments, this may include a photosensitive protein coupled to a transcription activator. In some embodiments, the light-responsive transcription factor may include, e.g., VP16-EL222 or EL222 mutant, or transcription factors based on CRY2/CIB, PhyB/Pif3, LOV, etc. Such light-responsive transcription factors are well-known in the art, and promoters that can be controlled by such transcription factors are also well-known in the art.

In some embodiments, the fourth gene may be under a fourth promoter 142. In some embodiments, the fourth gene may be constitutively expressed. The systems may be configured such that the light-responsive transcription factor controls the first promoter (the activator component) or the second promoter (the repressor component). FIG. 1 shows the light-responsive transcription factor controlling the first promoter, but those of skill in the art will recognize it is trivial to have it control the second promoter instead.

In some embodiments, a method for optogenetically controlling microbial fermentations to produce fuels, chemicals, proteins, or materials, may be provided. The method may include fermenting a plurality of yeast cells as disclosed herein, and then exposing the fermenting yeast cells to a plurality of stages (and preferably three or more) of a multi-stage fermentation process. Each stage of the plurality of stages may having a defined light condition that is adjusted according to a predetermined or adjustable light schedule.

The lighting component 150 may include a light source 151 operably controlled by one or more controllers 152, such as a processor, circuitry, etc. The light source illuminates the yeast cell, at one or more wavelengths configured to control the light-responsive transcription factor 115, thereby controlling production of the transcriptional activator, which therefore also controls production of the protein(s)/biosynthetic pathway(s) encoded by the third gene 121.

Figure 2:
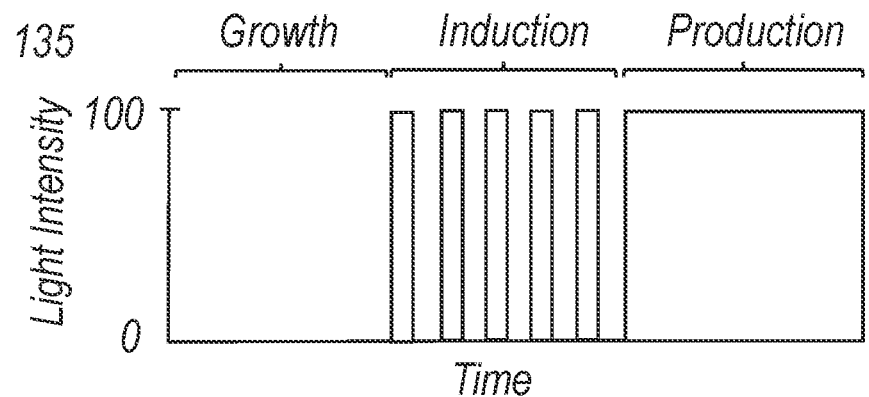
FIG. 2 is a graph of an embodiment of a light schedule.

Referring to FIG. 2, in some embodiments, the multi-stage fermentation process may consist of three stages, which may be a growth stage, an induction stage, and a production stage. In some embodiments, each stage has a different predetermined or adjustable light schedule. In some embodiments, no light (or a low level of light) is used during the growth stage. In some embodiments, the induction stage includes a plurality of cycles of time in which the yeast cells are alternately exposed to light, then dark. In some embodiments, the period of time in which the yeast cell is exposed to light during a given cycle of time is shorter than the period of time in which the yeast cell is in the dark during that cycle (e.g., 10 seconds on/60 seconds off). In some embodiments, the period of time in which the yeast cell is exposed to light during a given cycle is equal to the period of time in which the yeast cell is in the dark during that cycle (e.g., 10 seconds on/10 seconds off).

In some embodiments, a yeast cell may be provided containing one or more OGES. In some embodiments, the yeast cell includes a plurality of optogenetic gene expression systems. Various OGES may be provided.

There are two basic variants of the disclosed OGES—an amplification circuit, and an inverting circuit—depending on whether the light-responsive transcription factor controls the first promoter or the second promoter, respectively. Further, within each variant, there are two preferred approaches—one based on the Q system, and one based on GAL4/GAL80.

Amplification Circuits.

For amplification circuits, the yeast cell may be configured such that the light-responsive transcription factor controls the first promoter.

First Approach—OptoQ-AMP

In some embodiments, referred to as "OptoQ-AMP", the first optogenetic gene expression system may contain a system that is defined by four things.

First, the transcriptional activator in the first component is a QF or truncated QF transcriptional activator derived from *Neurospora crassa*. In some embodiments, the QF or truncated QF transcriptional activator may be a QF2 transcriptional activator. In some embodiments, the QF or truncated QF transcriptional activator may be fused to a degron domain (e.g., a degradation tag may be fused to C-terminus of the QF or truncated QF transcriptional activator).

Second, the transcriptional repressor in the second component, if present, is a QS transcriptional repressor. In some embodiments, the QS transcriptional repressor may be fused to a degron domain (e.g., a degradation tag may be fused to C-terminus of the QS transcriptional repressor). In some embodiments, the QS transcriptional repressor may be fused to a photosensitive degron domain.

Third, the promoter in the third component that is activated by the transcriptional activator is a QF- or truncated QF-activated promoter. In some embodiments, the QF- or truncated QF-activated promoter may be a promoter containing $P_{5xQUAS}$ or a $P_{5xQUAS}$ mutant sequence. In some embodiments, the $P_{5xQUAS}$ mutant may be a modified version of $P_{5xQUAS}$ where all CGG sequences are replaced with AGG sequences.

And fourth, a light-activated transcription factor that activates the promoter controlling expression of the transcriptional activator QF or truncated QF transcriptional activator.

In some embodiments, at least some gene expression of a gene within the yeast cell may be induced by adding quinic acid to a culture medium.

Second Approach—OptoAMP

In some embodiments, referred to as "OptoAMP", the first optogenetic gene expression system may contain a system that is defined by four things.

First, the transcriptional activator is a GAL4 transcriptional activator. In some embodiments, the GAL4 transcriptional activator may be fused to a degron domain (e.g., a degradation tag may be fused to C-terminus of GAL4).

Second, the transcriptional repressor, if present, is a GAL80 transcriptional repressor. In some embodiments, the GAL80 transcriptional repressor may be fused to a degron domain (e.g., a degradation tag may be fused to C-terminus of GAL80). In some embodiments, the GAL80 transcriptional repressor may be fused to a photosensitive degron domain.

Third, the promoter in the third sequence that is activated by the transcriptional activator is a GAL4-activated promoter. In some embodiments, the GAL4-activated promoter may be $P_{GAL1}$, $P_{GAL10}$, $P_{GAL7}$, $P_{GAL2}$, or a mutant derivative thereof.

And fourth, a light-activated transcription factor that activates the promoter controlling expression of the transcriptional activator GAL4.

In preferred embodiments, endogenous GAL4 and/or GAL80 are disrupted, e.g., by mutation or deletion.

In some embodiments, at least some gene expression of a gene within the yeast cell may be induced by adding galactose to a culture medium.

Invert Circuits.

For invert circuits, the second sequence is present in the yeast cell, and the yeast cell may be configured such that the light-responsive transcription factor controls the second promoter.

Third Approach—OptoQ-INVRT

In some embodiments, referred to as "OptoQ-INVRT", the first optogenetic gene expression system may contain a system that is defined by four things.

First, the transcriptional activator in the first component is a QF or truncated QF transcriptional activator. In some embodiments, the QF or truncated QF transcriptional activator may be a QF2 transcriptional activator. In some embodiments, the QF or truncated QF transcriptional activator may be fused to a degron domain. In some embodiments, the QF or truncated QF transcriptional activator may be fused to a photosensitive degron domain.

Second, the transcriptional repressor in the second component, if present, is a QS transcriptional repressor. In some embodiments, the QS transcriptional repressor may be fused to a degron domain.

Third, the promoter in the third component that is activated by the transcriptional activator is a QF- or truncated QF-activated promoter. In some embodiments, the QF- or truncated QF-activated promoter may be a promoter containing $P_{5xQUAS}$ or a $P_{5xQUAS}$ mutant sequence. In some embodiments, the $P_{5xQUAS}$ mutant may be a modified version of $P_{5xQUAS}$ where all CGG sequences are replaced with AGG sequences.

And fourth, a light-activated transcription factor that activates the promoter controlling expression of the transcriptional repressor QS.

In some embodiments, at least some gene expression of a gene within the yeast cell may be induced by adding quinic acid to a culture medium.

Third Approach—OptoINVRT

In some embodiments, referred to as "OptoINVRT", the first optogenetic gene expression system may contain a system that is defined by three things.

First, the transcriptional activator is a GAL4 transcriptional activator. In some embodiments, the GAL4 transcriptional activator may be fused to a degron domain. In some embodiments, the GAL4 transcriptional activator may be fused to a photosensitive degron domain.

Second, the transcriptional repressor, if present, is a GAL80 transcriptional repressor. In some embodiments, the GAL80 transcriptional repressor may be fused to a degron domain.

Third, the promoter in the third sequence that is activated by the transcriptional activator is a GAL4-activated promoter. In some embodiments, the GAL4-activated promoter may be $P_{GAL1}$, $P_{GAL10}$, $P_{GAL7}$, $P_{GAL2}$, or a mutant derivative thereof.

And fourth, a light-activated transcription factor that activates the promoter controlling expression of the transcriptional repressor GAL80.

In preferred embodiments, endogenous GAL4 and/or GAL80 are disrupted, e.g., by mutation or deletion.

In some embodiments, at least some gene expression of a gene within the yeast cell may be induced by adding galactose to a culture medium.

In various embodiments of the circuits, multiple copies of the second component (the repressor component) may be included.

In various embodiments of the circuits, the fourth sequence may encode the blue-light activated VP16-EL222 transcription factor, or an EL222 mutant, for controlling the promoter $P_{C120}$ (which may be used as the first or second promoter, depending on whether it is an amplification circuit or an invert circuit). Other light-responsive transcription factors (e.g., derived from CRY2/CIB, PhyB/PIF3, LOV, etc.).

In some embodiments, the protein or enzyme of interest may be a metabolic enzyme to control an endogenous metabolic pathway or a metabolic pathway for synthesis of a desired chemical. One of skill in the art will understand that once an appropriate metabolic pathway is known, it is trivial to incorporate the disclosed systems into that pathway, by selecting an appropriate protein or enzyme along the pathway that will be controlled using the third component of the disclosed systems.

As will be understood, the disclosed yeast cells may include an additional optogenetic gene expression system, where the additional optogenetic gene expression system being different from the first optogenetic gene expression system. The additional optogenetic gene expression system may be orthogonal to the first optogenetic gene expression system.

In some embodiments, the yeast cell includes an amplification circuit and an inverter circuit. In some embodiments, the yeast cell includes one optogenetic gene expression system that is an OptoQ-AMP circuit, and one that is an OptoINVRT circuit. In some embodiments, the yeast cell includes one optogenetic gene expression system that is an OptoAMP circuit, and one that is an OptoQ-INVRT circuit. That is—the system preferably does not use an amplification circuit and an inverter circuit that are not orthogonal to each other.

In some embodiments, the yeast cell includes two amplification circuits or two inverter circuits. In some embodiments, the yeast cell includes one optogenetic gene expression system that is an OptoQ-AMP circuit, and one that is an OptoAMP circuit. In some embodiments, the yeast cell includes one optogenetic gene expression system that is an OptoQ-INVRT circuit, and one that is an OptoINVRT circuit.

Figure 3:
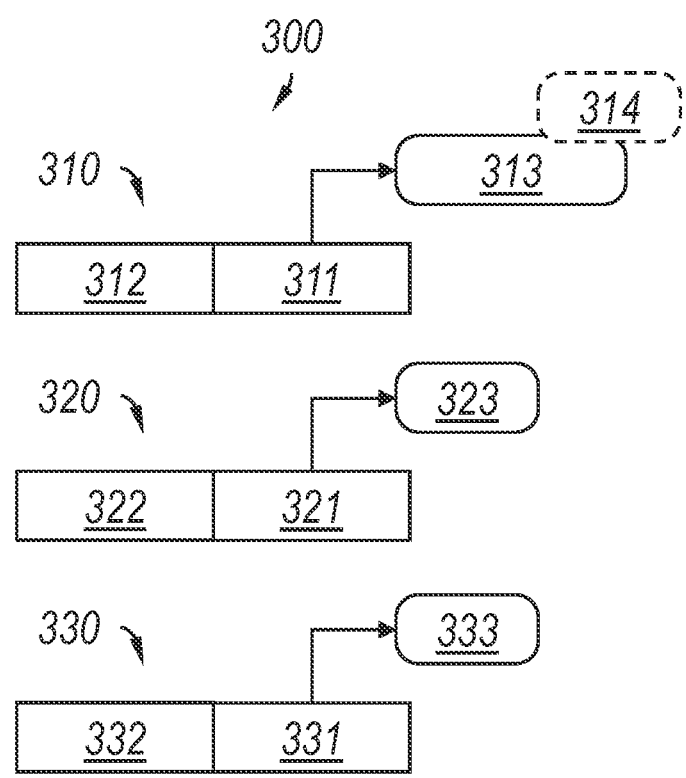
FIGS. 3-6 are schematics of embodiments of sequences in a yeast cell.

Referring to FIG. 3, in some embodiments, the yeast cell may include an optogenetic gene expression system 300 (OGES). The OGES may include a first sequence 310, that includes a gene 311 encoding a QF or truncated QF transcriptional activator 313 under a first promoter 312. In some embodiments, the truncated QF transcriptional activator may be a QF2 transcriptional activator. In some embodiments, a photosensitive degradation tag 314 may be fused to the C terminus of the QF or truncated QF transcriptional activator. In some embodiments, the first promoter may be $P_{PGK1}$.

The OGES may include a second sequence 320, that includes a gene 321 encoding a QS transcriptional repressor 323 under a second promoter 322. The second promoter may be $P_{C120}$, which may be controlled by VP16-EL222 or an EL222 mutant. In some embodiments, the yeast cell may have a gene that encodes for VP16-EL222 or an EL222 mutant under a constitutive promoter, and a light source can control when the VP16-EL222 or EL222 mutant activates with the promoter. In some embodiments, two copies of the second sequence are present. In some embodiments, a plurality of copies of the second sequence are present.

The OGES may include a third sequence 330, that includes a gene 331 encoding a protein or enzyme of interest 333 downstream of a QF- or truncated QF-activated promoter 332. In some embodiments, the QF- or truncated QF-activated promoter is a promoter containing $P_{5xQUAS}$ or a $P_{5xQUAS}$ mutant sequence. In some embodiments, the $P_{5xQUAS}$ mutant is a modified version of $P_{5xQUAS}$ where all CGG sequences are replaced with AGG sequences.

In some embodiments, gene expression in the OGES may be induced by adding quinic acid to a culture medium for the yeast cells.

In some embodiments, the yeast cell may include a second OGES, where the second OGES is different from the first OGES.

Figure 4:
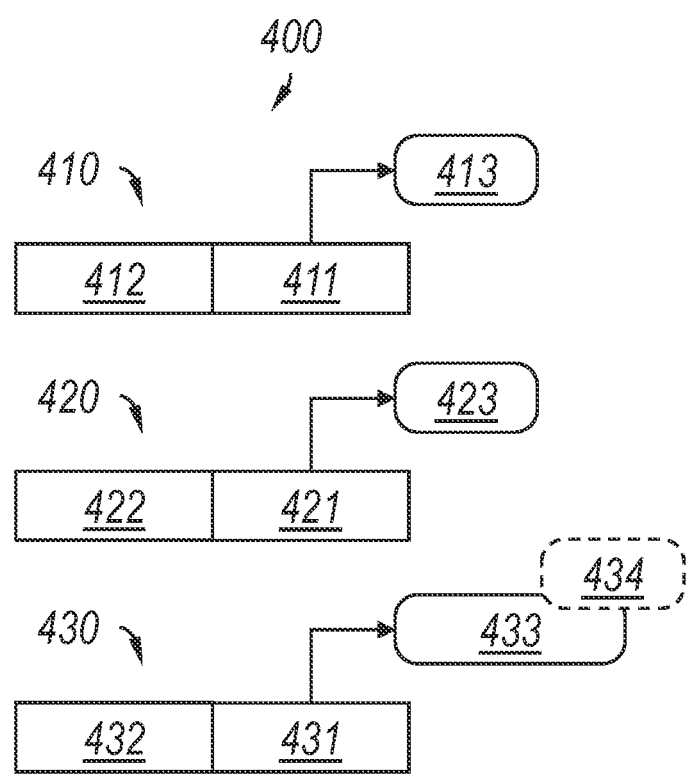

Referring to FIG. 4, in some embodiments, a yeast cell may be provided. The yeast cell may include an optogenetic gene expression system 400 (OGES). The OGES 400 may include a first sequence 410, that includes a gene 411 encoding a QF or truncated QF transcriptional activator 413 downstream of a $PC_{120}$ promoter 412, which may be controlled by VP16-EL222 or an EL222 mutant (not shown). In some embodiments, the $P_{C120}$ promoter is controlled by an EL222 mutant. In some embodiments, the truncated QF transcriptional activator may be a QF2 transcriptional activator. In some embodiments, the yeast cell may include two copies of the first sequence. In some embodiments, the yeast cell may include a plurality of copies of the first sequence.

The OGES may include a second sequence 420, that includes a gene 421 encoding a protein or enzyme of interest 423 downstream of a promoter 422 controlled by a QF, or truncated QF transcriptional activator. In some embodiments, the QF- or truncated QF-activated promoter is a promoter containing $P_{5xQUAS}$ or a $P_{5xQUAS}$ mutant sequence. In some embodiments, the $P_{5xQUAS}$ mutant is a modified version of $P_{5xQUAS}$ where all CGG sequences are replaced with AGG sequences.

In some embodiments, the OGES may also include a third sequence 430, that includes a gene 431 encoding a QS transcriptional repressor 433 C-terminally tagged with a degradation tag 434 or a photosensitive degradation tag, that is expressed by a constitutive promoter 432. In some embodiments, the constitutive promoter may be $P_{CCW12}$.

In some embodiments, the yeast cell may include a second OGES, where the second OGES is different from the first OGES.

As disclosed herein, these various optogenetic gene expression systems may be combined as appropriate. For example, a first OGES (e.g., OGES 100, FIG. 1), may be combined with a second OGES (e.g., OGES 300, FIG. 3, or OGES 400, FIG. 4).

Figure 5:
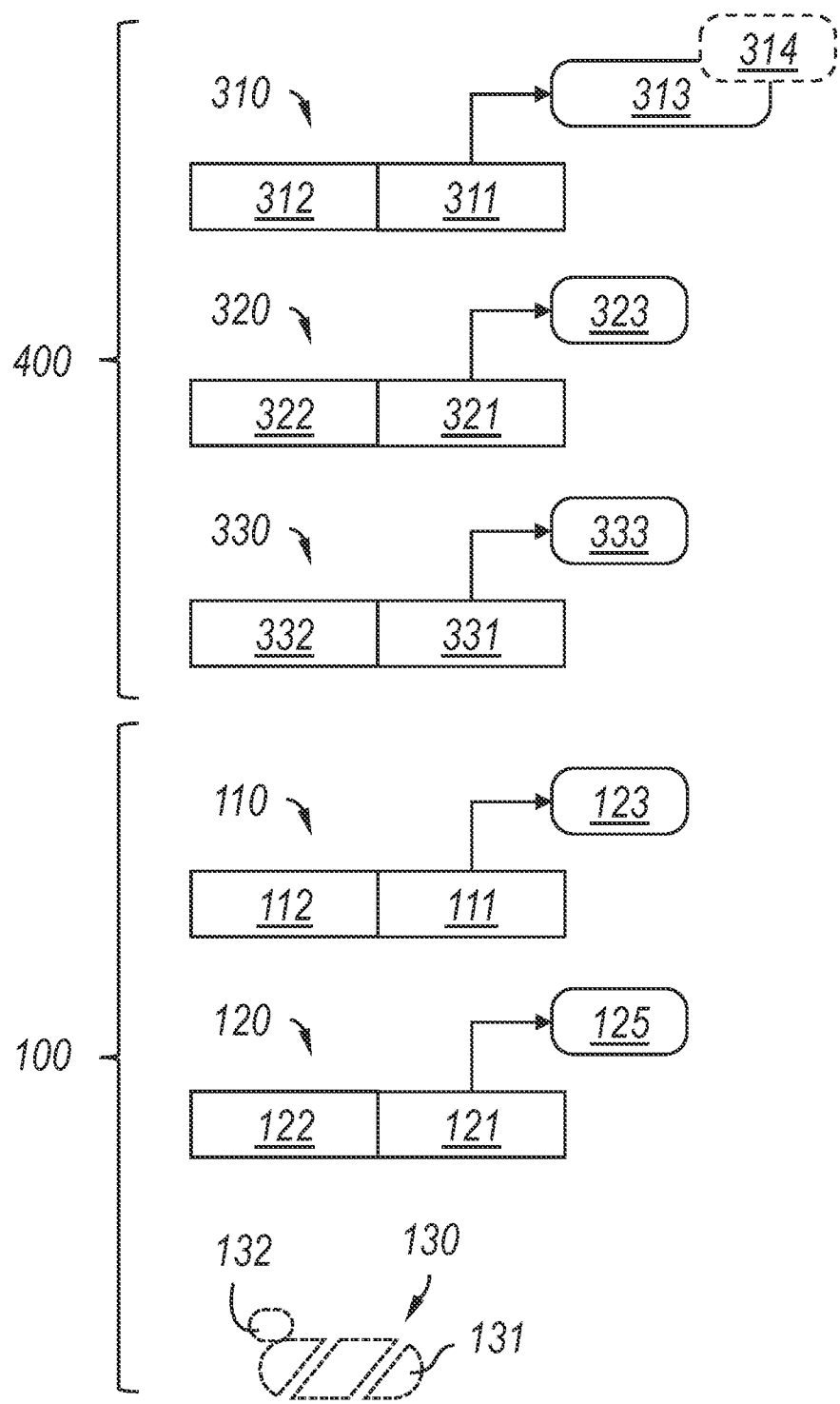

In some embodiments, a yeast cell may be provided. As seen in FIG. 5, in some embodiments, the yeast cell may include a first OGES (OGES 100, as disclosed herein), as well as a second OGES (OGES 300, as disclosed herein).

That is, in some embodiments, the yeast cell may include one OGES that includes a first sequence encoding a QF or truncated QF transcriptional activator under a promoter, a second sequence encoding a QS transcriptional repressor under $P_{C120}$ controlled by VP16-EL222 or an EL222 mutant, and a copy of constitutively expressed VP16-EL222 or EL222 mutant, and a third sequence encoding a protein or enzyme of interest 333 downstream of a QF- or truncated QF-activated promoter; and may also include a second OGES that may include a fourth sequence encoding a GAL4 transcriptional activator expressed from a $PC_{120}$ promoter, activated by VP16-EL222 or an EL222 mutant, and a copy of constitutively expressed VP16-EL222 or EL222 mutant, and a fifth sequence encoding a protein or enzyme of interest 125 downstream of a GAL4-activated promoter, wherein the activity of endogenous GAL4 and GAL80 in the yeast cell is disrupted.

In some embodiments, the truncated QF transcriptional activator in the first optogenetic gene expression system may be a QF2 transcriptional activator. In some embodiments, the first optogenetic gene expression system may include a gene encoding a QF or truncated QF transcriptional activator fused to a photosensitive degron domain. In some embodiments, the second optogenetic gene expression system further may include a GAL80 repressor. In some embodiments, the second optogenetic gene expression system may include GAL80 fused to a photosensitive degron domain. In some embodiments, one or more QF- or truncated QF-activated promoters control expression of one or more proteins or enzymes of interest, and one or more GAL4-activated promoters control expression of one or more other proteins or enzymes of interest. That is, referring to FIG. 5, in some embodiments, protein or enzyme of interest 333 may be different from protein or enzyme of interest 125. In some embodiments, one or more proteins or enzymes of interest are capable of being controlled by either (i) a QF- or truncated QF-activated promoter or (ii) a GAL4-activated promoter. That is, referring to FIG. 5, in some embodiments, protein or enzyme of interest 333 may be the same as protein or enzyme of interest 125.

In some embodiments, the one or more GAL4-activated promoters comprise $P_{GAL1}$, $P_{GAL10}$, $P_{GAL7}$, $P_{GAL2}$, or mutants derived from them. In some embodiments, the one or more QF- or truncated QF-activated promotors comprise $P_{5xQUAS}$ or a $P_{5xQUAS}$ mutant sequence.

Figure 6:
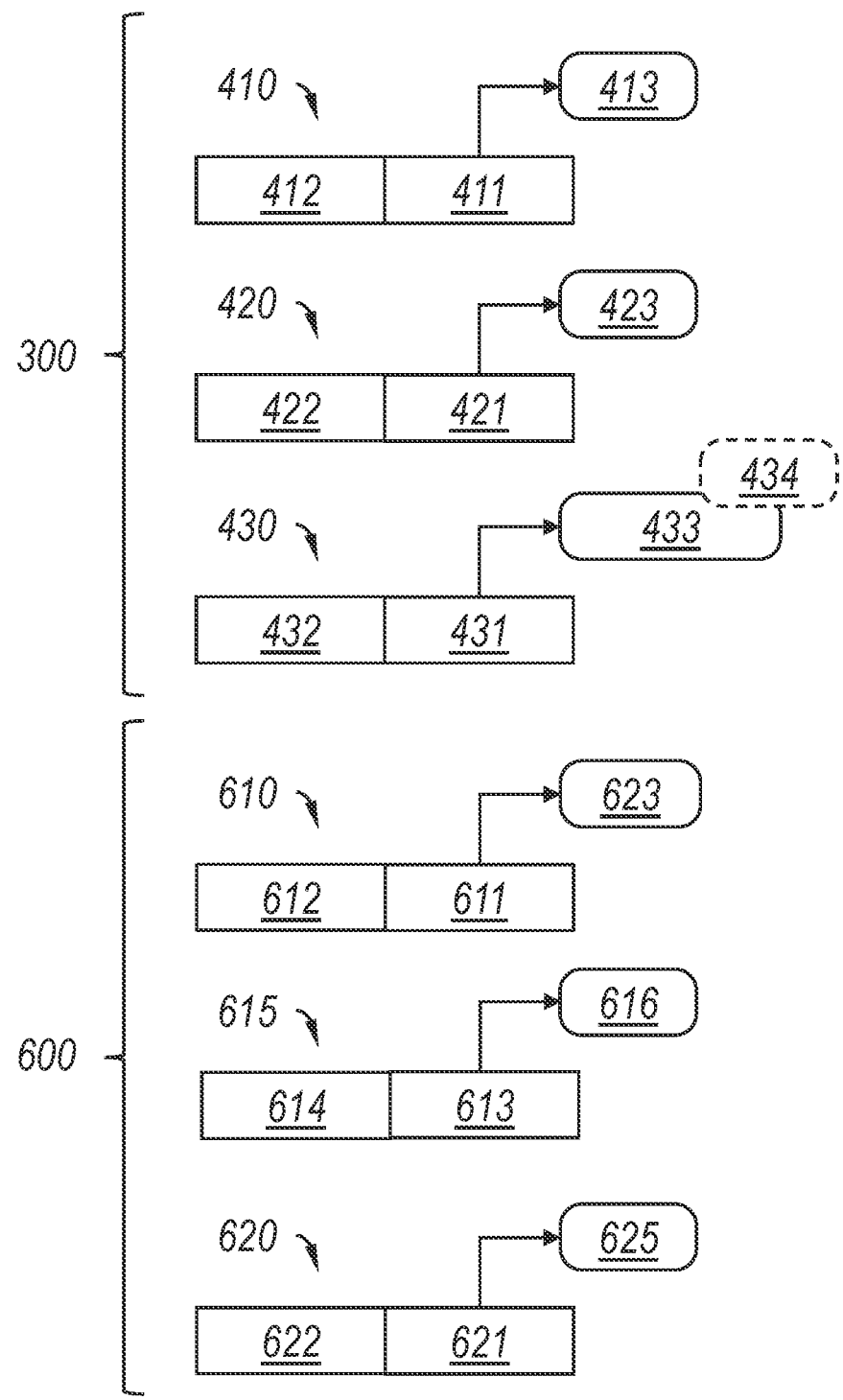

Alternatively, the sequences described with respect to FIG. 4 may be combined with the sequences described with respect to FIG. 1. Referring to FIG. 6, a yeast cell may include a first OGES (e.g., OGES 400, FIG. 4) and a second OGES (e.g., OGES 600) as disclosed herein. Thus, in some embodiments, the yeast cell may include a first OGES that may include a first sequence 410 including a gene 411 encoding a QF or truncated QF transcriptional activator 413 downstream of a $PC_{120}$ promoter 412, controlled by VP16-EL222 or an EL222 mutant, and a sequence (not shown) encoding a copy of constitutively expressed VP16-EL222 or EL222 mutant, as well as a second sequence 420 including a gene 421 encoding a protein or enzyme of interest 423 downstream of a QF- or truncated QF-activated promoter 422.

The yeast cell may also include a second OGES 600 that may include a third sequence 610 including a gene 611 encoding a GAL4 transcriptional activator 623 under a promoter 612, a fourth sequence 615 including a gene 613 encoding a GAL80 transcriptional repressor 616 under $PC_{120}$ 614 controlled by VP16-EL222 or an EL222 mutant, a sequence (not shown) encoding a copy of constitutively expressed VP16-EL222 or EL222 mutant; and a fifth sequence 620 including a gene 621 encoding a protein or enzyme of interest 625 downstream of a GAL4-activated promoter 622, wherein the activity of endogenous GAL4 and GAL80 in the yeast cell is disrupted.

In some embodiments, the first optogenetic gene expression system may include a sequence 430 including a gene 431 encoding a QS repressor 433 optionally fused to a degron domain 434 or a photosensitive degron domain under a promoter 432. In some embodiments, the second optogenetic gene expression system may encode a GAL4 transcriptional activator fused to a degron or photosensitive degron domain.

In some embodiments, one or more QF- or truncated QF-activated promoters control expression of one or more proteins or enzymes of interest, and one or more GAL4-activated promoters control expression of one or more other proteins or enzymes of interest. That is, referring to FIG. 6, in some embodiments, protein or enzyme of interest 423 may be different from protein or enzyme of interest 625. In some embodiments, one or more proteins or enzymes of interest are capable of being controlled by either (i) a QF- or truncated QF-activated promoter or (ii) a GAL4-activated promoter. That is, referring to FIG. 6, in some embodiments, protein or enzyme of interest 623 may be the same as protein or enzyme of interest 625.

In some embodiments, the QF- or truncated QF-activated promoter may be a promoter containing $P_{5xQUAS}$ or a $P_{5xQUAS}$ mutant sequence. In some embodiments, the one or more GAL4-activated promoters may include $P_{GAL1}$, $P_{GAL10}$, $P_{GAL7}$, $P_{GAL2}$, or mutants derived from them.

A process to optogenetically control microbial fermentations to produce fuels, chemicals or materials. This is achieved by increasing the sensitivity and strength of previous optogenetic systems so that they effectively respond to light stimuli at the high cell densities typically found in microbial fermentations or at low light doses. Because it solves the challenge of limited light penetration encountered in large and dense fermentations, the disclosed method can replace the standard nutrient- or chemical-based inducers (such as galactose and doxycycline) to dynamically regulate biosynthetic pathways using minimal amounts of light. By enabling light to be an effective inducible agent even at high cell densities with limited light penetration, the disclosed circuits can then be used to implement multi-phase light-controlled fermentations (beyond the typical biphasic growth/production) by selectively applying light at different stages of a process, leading to improved chemical production. Thus the process, as implied by FIG. 2, may include providing yeast cells as disclosed herein, and controlling production by varying the light schedule as appropriate, based on, e.g., the stage of the process (growth, induction, etc.), the proteins or enzymes being controlled, etc.

The disclosed approach can be used to divide microbial fermentation processes into any number of phases (beyond the typical two-phased approach using growth and production) using variable light schedules, thereby improving chemical yields.

In some embodiments, a yeast culture is grown from a yeast cell as described herein, that is configured to co-express two desired optogenetic gene expression systems that are either: (i) OptoQ-Amp and OptoINVRT; or (ii) OptoAMP and OptoQ-INVRT. In some embodiments, the approach may then include amplifying and inverting the light controls for regulation of different sets of genes by exposing the cell containing the desired optogenetic gene expression systems to at least one period of darkness and/or at least one period exposure to light.

Various approaches may include fermenting yeast grown from a yeast cell as disclosed herein, and while fermenting, exposing the yeast culture to one or more temporal phases, where each temporal phase has a specific light-duty schedule.

In some embodiments, the one or more temporal phases may include two or more phases, and may include three or more. In some embodiments, the specific light-duty schedule in each temporal phase is constant across the temporal phase. In some embodiments, the specific light-duty schedule in at least one temporal phase continuously changes from an initial light condition to a final light condition. Preferably, each temporal phase may be recognized by the change in specific light-duty schedule that occurs between the phases. In some embodiments, at least one set of specific light-duty schedule includes darkness, at least one specific light-duty schedule includes constant light exposure at some predetermined power, and at least one specific light-duty schedule includes conditions in which multiple cycles of light are on for a first period of time and off for a second period of time, where the second period of time is greater than or equal to the first period of time.

The disclosed approach enables induction of gene expression with very small amounts of light. Such a feature could be used to control sensitive processes that require large changes in gene expression with minimal perturbation (i.e., very small amounts of light input). Furthermore, it could be used to accelerate optimization of fermentations, as light can be inputted at any frequency, at any stage of a process. Lastly, it allows for robust activation even at large scales and high cell densities, paving the way for implementation of optogenetic induction at industrial scales.

An optogenetic amplification circuit to control cell metabolism or for use in high cell density microbial fermentations, including for the purpose of chemical production is not believed to have heretofore been developed. The use of light is cheap, easily controlled, and reversible; because the disclosed approach requires minimal light input to function, it should in principle provide robust activation even at industrial fermentation scales. Additionally, the disclosed circuits function independently of carbon source or media components, unlike industrial processes that commonly use nutrient- or chemical-based inducing agents, which can be costly or difficult to control. Therefore, it makes it easier and cheaper to implement dynamic control of cell metabolism during microbial fermentations for improved chemical production.

The disclosed approach may be implemented into a wide range of yeast strains. In some embodiments, the yeast strain is a strain of *Saccharomyces*. In some embodiments, the yeast strain is a strain of *S. cerevisiae*. However, as will be readily understood, any yeast (e.g., an industrial yeast) producing a protein or enzyme of interest may be utilized.

As an example, strains of *S. cerevisiae* have been produced that contain different versions of what are called here an OptoAMP circuit. As to the basic architecture of OptoAMP circuits, after deleting the endogenous copies of the activator GAL4 and repressor GAL80, GAL4 was integrated under the PC120 promoter controlled by VP16-EL222, as was a copy of constitutively expressed VP16-EL222 (using PTEF1), resulting in an optogenetic circuit called here OptoAMP1. To test this circuit, also integrated was GFP expressed using various promoters natively activated by Gal4p: PGAL1, PGAL10, PGAL2. If one were to use a more light-sensitive mutant of EL222, one obtains OptoAMP2. By fusing the GAL80 repressor to a photosensitive degron domain (PSD) varying its level of expression, one can obtain OptoAMP3 and OptoAMP4. The steps to making these strains are the following:
 1. Integrating an optogenetic gene expression system into the chromosome of an engineered yeast strain.
 2. Transforming a plasmid containing, or integrating into the chromosome, a biosynthetic pathway of one or more enzymes, whose expression is driven by the optogenetic gene expression system.

The disclosed approach also provides a process in which the strains described above are used in light-controlled fermentations to improve chemical production. Light is used to directly activate biosynthetic pathways for chemical production, in light-controlled multi-stage fermentations. Fermentations can be divided in time in different phases defined by the light schedules they are exposed to. This was demonstrated in three-phase fermentations in which cells are grown under a specific light schedule, induced in a second phase under a different light schedule, and then incubated for production in a third phase under yet another different light schedule.

Therefore, the process involves controlling the gene expression profile of the engineered yeast strain in multi-stage fermentations.

A preferred embodiment of the disclosed approach requires blue light to activate. Having them be sensitive to red or infra-red light would be even better for light activation at high cell densities. Nevertheless, this issue is ameliorated by using OptoAMP or OptoQ-AMP circuits disclosed herein and EL222 mutants discovered by others that are more sensitive to light.

Experimental results for these circuits confirm that they function as intended (GFP reporter). The process was also demonstrated by showing that they can be used to implement light-controlled three-phase fermentations for improving chemical production.

The disclosed technology may be employed, inter alia, by companies that produce chemicals using microbial fermentations. The technology would be more directly applicable if fermentations use engineered *S. cerevisiae*, in which the system was demonstrated. However, the tools, methods, and the process may be transferred to other organisms. The disclosed approach can be easily substituted for commonly used media-dependent induction strategies, with the added advantage of facilitated control and the potential for process optimization through experimentation with light schedules. The disclosed method enables multi-phase fermentations beyond the typical 2-phase fermentations used for decades (growth and production). 3-phase fermentations (enabled by this technology) have been shown to improve chemical production.

Example 1

OptoAMP Circuits Amplify Optogenetic Signals by Controlling GAL4 Expression. The ability to induce gene expression with light in large bioreactors and the high cell densities typically found in the production phase of fermentations would greatly increase the impact of optogenetics in metabolic engineering. However, this will be difficult to achieve using the previously disclosed OptoEXP to directly induce genes of interest because of the rapid reversibility of the activated EL222 transcription factor and relative weakness of the PC120 promoter. Therefore, a goal was set to lower the light requirements for optogenetic circuit activation by exploiting the GAL regulon of *Saccharomyces cerevisiae*. After deleting the endogenous copies of the activator GAL4 and repressor GAL80, GAL4 was integrated under the $P_{C120}$ promoter controlled by VP16-EL222, and a copy of constitutively expressed VP16-EL222 (using $P_{TEF1}$), resulting in a new optogenetic circuit called Opto-AMP1. To test this circuit, GFP was also integrated, expressed using various promoters natively activated by Gal4p: $P_{GAL1}$, $P_{GAL10}$, $P_{GAL2}$, and $P_{GAL7}$.

Specifically, promoter-gene-terminator sequences were cloned into previously described standardized vector series (pJLA vectors) as known in the art. Plasmids were transformed into chemically competent *Escherichia coli* strain DH5α. Qiagen Miniprep, Qiagen Gel Extraction, and Qiagen PCR purification kits were used to extract and purify plasmids and DNA fragments, following manufacturer's instructions. The EL222 mutant was ordered as a gBlock from Integrated DNA Technologies. All vectors were sequenced with Sanger Sequencing from GENEWIZ before using them to transform yeast. All plasmids used in this example are cataloged in FIGS. 7A-7B.

Yeast transformations were carried out using standard lithium acetate protocols, and the resulting strains are catalogued in FIGS. 8A-8B. Gene constructs derived from pYZ12-B, pYZ162, and pYZ23 vectors were genomically integrated into the HIS3 locus, LEU2 locus, or δ-sites (YARCdelta5), respectively. Zeocin (Thermo Fisher Scientific), ranging from 800 to 1200 μg/mL, was used to select for strains with δ-integrations. Gene deletions were carried out by homologous recombination as previously described. All strains with gene deletions were genotyped with PCR to confirm their accuracy. Constructs were integrated into the HIS3 locus, LEU2 locus, or δ-sites to promote strain stability. Tandem repeats were avoided to prevent recombination after yeast transformation, and thus do not observe strain instability.

Liquid yeast cultures were inoculated from single colonies and grown in 24-well plates (USA Scientific Item #CC7672-7524), at 30° C. and shaken at 200 rpm (19 mm orbital diameter), in either YPD or SC-dropout media with 2% glucose. To stimulate cells with light, blue LED panels (HQRP New Square 12" Grow Light Blue LED 14 W) were used, placed 40 cm from cell cultures. At this distance, the light panel outputs ranged from 52 μmol/m$^2$/s to 94 μmol/m$^2$/s, measured with a quantum meter (Model MQ-510 from Apogee Instruments). Light duty cycles were set using a Nearpow Multifunctional Infinite Loop Programmable Plug-in Digital Timer Switch to control the LED panels. Cell cultures were centrifuged (Sorvall Legend XTR) at 1000 rpm for 10 min using 24-well plate rotor adaptors.

Fluorescence and optical density (OD$_{600}$) measurements were taken using a TECAN plate reader (infinite M200PRO). The excitation and emission wavelengths used for GFP fluorescence measurements were 485 and 535 nm, respectively. To process fluorescence data, the background fluorescence from the media exposed to the same light conditions was first subtracted from measured values. Then, the GFP/OD$_{600}$ values of cells lacking a GFP construct but exposed to the same light conditions were subtracted from the fluorescence values (GFP/OD$_{600}$) of each sample to correct for light bleaching of the media and cell contents. Reported values were calculated per the following formula:

$$\frac{GFP}{OD_{Strain,Condition}} = \frac{(GFP_{Strain,Condition} - GFP_{Media,Condition})}{(OD_{Strain,Condition} - OD_{Media,Condition})} - \frac{(GFP_{No\ GFP\ Control\ Strain,Condition} - GFP_{Media,Condition})}{(OD_{No\ GFP\ Control\ Strain,Condition} - OD_{Media,Condition})}$$

All fluorescence measurements were taken at the end of experiments or on samples taken from bioreactor cultures, such that potential activation of VP16-EL222 by the light used to excite GFP did not affect experimental progression or final results. Controls using constitutive P$_{TEF1}$ to express GFP showed that this fluorophore does not bleach under the light conditions tested.

To measure cell concentration, optical density measurements were taken at 600 nm wavelength, using media (exposed to the same conditions as the yeast cultures) as blank. Measurements were done with the TECAN plate reader (infinite M200PRO) or Eppendorf spectrophotometer (Bio-Spectrometer basic), from samples diluted to a range of OD$_{600}$ of 0.1 to 1.0.

Flow Cytometry. GFP fluorescence of bioreactor experiments was quantified by flow cytometry using a BD LSR II flow cytometer and BD FacsDiva 8.0.2 software with a 488 nm laser and 525/50 nm bandpass filter. The gating used in these analyses was defined to exclude particles that are either too small or too large to be single living yeast cells, based on the side scatter (SSC-A) vs forward scatter (FSC-A) plots as previously described. Median fluorescence values were determined from 10,000 cells. Data were analyzed using FCS Express (De Novo Software, Pasadena, CA, USA).

Figure 9A:
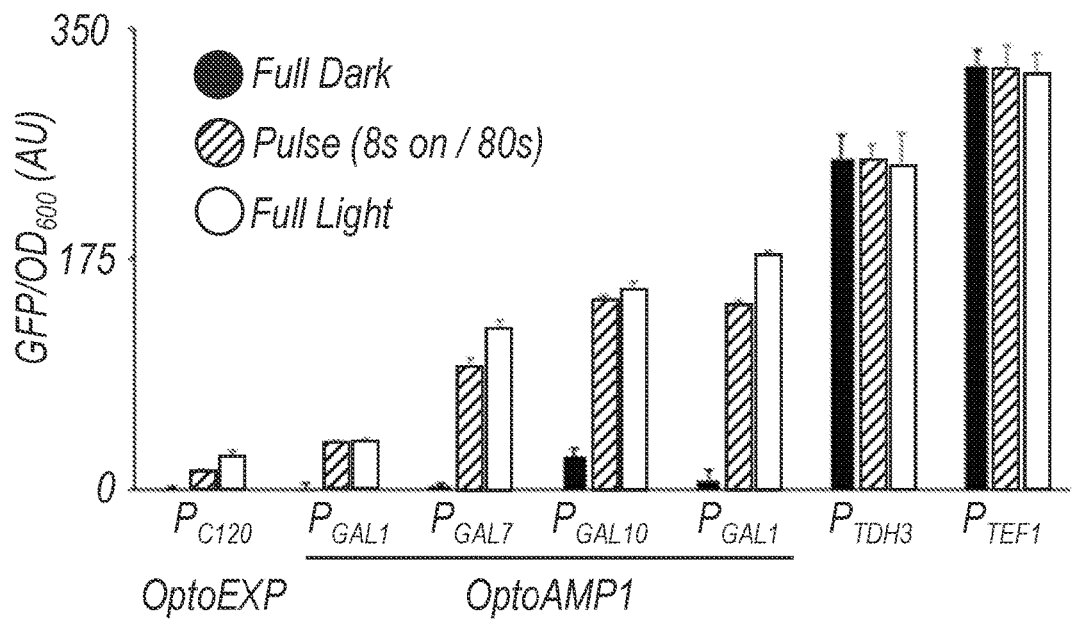
FIGS. 9A-9B are graphs showing GFP/$OD_{600}$ data for various systems in full dark, full light, or in a varying light condition (8 s of illumination per 80 s cycle).

These example strains (see FIGS. 7A-8B) show blue light-dependent GFP expression, with different promoters showing varying light sensitivities and fold-changes in maximum expression relative to OptoEXP (FIG. 9A). As shown, P$_{GAL1}$ and P$_{GAL7}$ express 80% and 76% (respectively) of maximal expression when exposed to 10% light dose (compared to 57% for conventional OptoEXP), while P$_{GAL2}$ and P$_{GAL10}$ show full activation when exposed to 10% light dose.

While OptoAMP1 amplifies the transcriptional response of conventional OptoEXP by more than 7-fold (when controlling P$_{GAL1}$), it is unable to reach the expression levels achieved by the strong constitutive promoters P$_{TDH3}$ and P$_{TEF1}$, with any of the GAL promoters tested. OptoAMP1 controlling the strongest P$_{GAL1}$ promoter reaches only 73% of P$_{TEF1}$ expression in full blue light. Furthermore, OptoAMP1 controlling P$_{GAL1}$ only reaches 37% of the native P$_{GAL1}$ promoter induced with galactose, the strongest known native inducible promoter in yeast. This suggests that OptoAMP1 control of native GAL promoters is still limiting, and that additional engineering is required to harness the full potential of the GAL regulon.

Figure 9B:
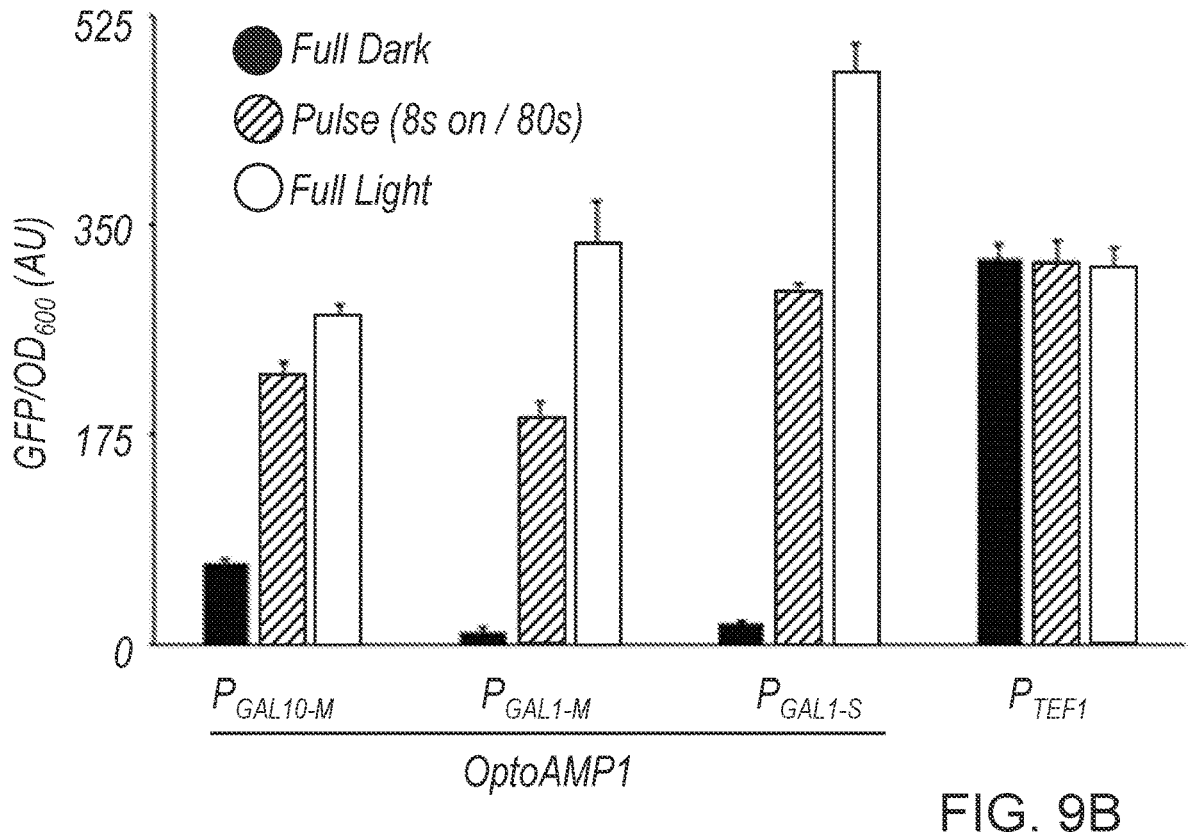

Engineering promoters to increase maximum expression level provides an opportunity to further increase amplification capabilities. To develop a set of strong light-inducible promoters, we removed the binding sites of Mig1p, a global repressor that binds in the presence of glucose, within P$_{GAL10}$ and P$_{GAL1}$. Referring to FIG. 9B, these mutants, P$_{GAL10}$-M [SEQ ID NO. 2] and P$_{GAL1}$-M [SEQ ID NO. 3], increase GFP expression levels by 39% and 45%, respectively, compared to the wild-type promoters. Addition of a P$_{GAL1}$ fragment containing four additional Gal4p binding sites upstream of the P$_{GAL1-M}$ promoter, results in a super enhanced GAL1 promoter named P$_{GAL1-S}$ [SEQ ID NO. 3] which further increases expression by 43%. P$_{GAL1-S}$ reaches an activation level under full blue light that is 52% higher than that of P$_{TEF1}$, a strong constitutive promoter commonly used in metabolic engineering. Although these promoters are tunable by varying the light duty cycle, they still require more than 10% light dose to reach maximal gene expression levels, leaving ample room for improvement.

To reduce the amount of light required to activate these optogenetic circuits, the photosensitivity of VP16-EL222 was altered. Previous studies have shown that EL222 mutations affect its lit- or dark-state half-life and transition kinetics. The A79Q substitution was made in EL222, resulting in a EL222 A79Q mutant [SEQ ID NO. 1], reported to increase its lit-state half-life from 30 to 300 s, reasoning that this mutant would require less light to maintain transcriptional activation. This mutant was fused with a VP16 domain to activate P$_{C120}$, resulting in a new circuit, called OptoEXP2. Using GFP to measure gene expression under different light duty cycles, it was found that OptoEXP2 achieves 78% of maximal activation with only 2 s of illumination in 80-s periods, and has 3.5-fold stronger maximal expression than conventional OptoEXP under full light. However, OptoEXP2 is also ~31 times leakier (expression in the dark) than conventional OptoEXP. Increasing the active-state half-life of VP16-EL222 not only increases light sensitivity, but also raises maximum expression level, likely due to longer binding of VP16-EL222 to PC$_{120}$. This VP16-EL222(A79Q) variant was combined with GAL4 expression from $P_{C120}$ to create OptoAMP2. When OptoAMP2 is used to control GFP expression from $P_{GAL1-S}$, the maximum GFP level achieved (under full blue light) is 2.6-fold higher than what is obtained with $P_{TEF1}$. However, this circuit is very leaky, exhibiting 48% of the expression from $P_{TEF1}$ even in complete darkness. Therefore, while OptoEXP2 and OptoAMP2 are significantly more light-sensitive than OptoEXP1 and OptoAMP1, respectively, additional modifications are necessary to restore tight OFF-state repression.

Effective dynamic control in metabolic engineering requires that the enzymes under control have a low background level of gene expression. It was previously shown that controlling protein stability of gene circuit components with photo-sensitive degradation domains can reduce leakiness. The Gal80p repressor fused to a C-terminal photosensitive degron domain (PSD) was expressed, reasoning that it would repress leaky Gal4p activity in the dark, but also get actively degraded in blue light to allow Gal4p-mediated transcriptional activation. The expression level of the Gal80p-PSD fusion was varied using two moderate-strength constitutive promoters, $P_{ADH1}$ and $P_{RNR2}$, resulting in OptoAMP3 and OptoAMP4, respectively.

It should be noted that all OptoAMP circuits and promoters were characterized in yeast strain YEZ44 (CENPK.2-1C, gal80-Δ, gal4-Δ). OptoAMP1 controlling GFP expression from $P_{GAL1}$, $P_{GAL10}$, $P_{GAL2}$, or $P_{GAL7}$ was integrated into the HIS3 locus of YEZ44 to make YEZ72 (EZ-L175), YEZ141 (EZ-L319), YEZ142 (EZ-L320), and YEZ143 (EZ-L321), respectively. OptoAMP1 controlling GFP expression from $P_{GAL10}$-M, $P_{GAL1}$-M, and $P_{GAL1-S}$ was integrated into the HIS3 locus of YEZ44 to make strains YEZ189 (EZ-L380), YEZ163 (EZ-L316), and YEZ214 (EZ-L444) respectively. OptoEXP2 driving GFP expression from $P_{C120}$ or OptoAMP2 driving GFP expression from $P_{GAL1-S}$ were integrated into the HIS3 locus of YEZ44 to make strains YEZ293 (EZ-L545) and YEZ292 (EZ-L560), respectively. Single colonies of each strain were inoculated into SC-His media+ 2% glucose media in 24-well plates and grown overnight; cultures were kept in darkness (covered in aluminum foil) to avoid premature activation of optogenetic systems. Each culture was then back-diluted into fresh media to an $OD_{600}$=0.1, and grown for 8 h under full light, complete darkness, or light pulses of 8 s ON/72 s OFF.

OptoAMP3 or OptoAMP4 driving GFP expression from $P_{GAL1-S}$ were integrated into the HIS3 locus of YEZ44 to make strains YEZ337 (EZ-L583) and YEZ336 (EZ-L582), respectively. GFP expression was monitored as above, exposing cells to full light, ambient light (warm room with lights turned off), complete darkness, or light pulses of 1 s ON/119 s OFF, 2 s ON/118 s OFF, 4 s ON/116 s OFF, is ON/59 s OFF, is ON/179 s OFF, or 5 s ON/95 s OFF.

Figure 10:
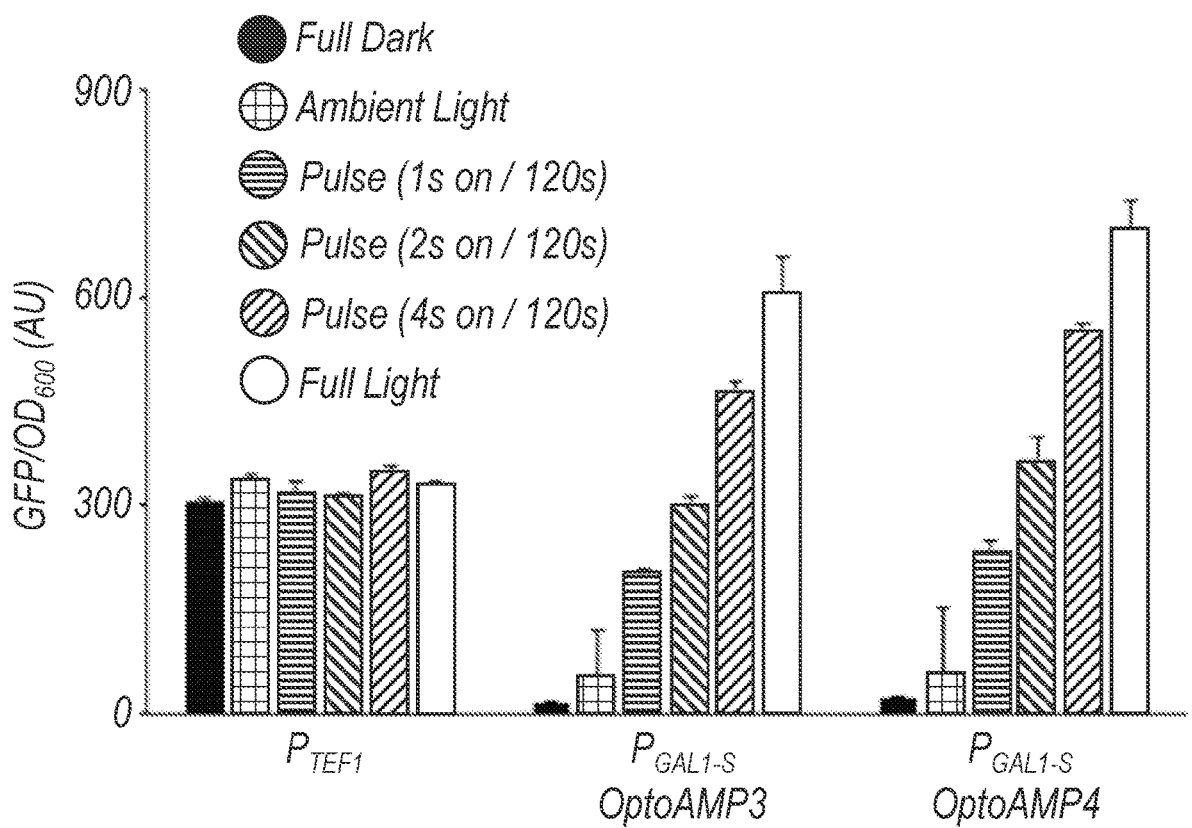
FIG. 10 is a graph showing GFP/$OD_{600}$ data for various systems in full dark, full light, ambient light, or in a varying light condition.

The combination of enhanced $P_{C120}$ activation by VP16-EL222(A79Q) and light-triggered degradation of Gal80p due to the PSD tag results in both circuits being tunable to light doses as low as 0.56% (1 s ON/179 s OFF), and displaying reduced leakiness in the dark (2.5% and 3.2% of maximal activity for OptoAMP3 and OptoAMP4, respectively). See FIG. 10. Both circuits show strong light response amplification: for example, OptoAMP3 requires only a 1.7% light duty cycle to reach 52% of its maximum expression, which corresponds to 116% the expression level of $P_{TEF1}$. Furthermore, the maximal activity of OptoAMP4 (5% light duty cycle, e.g., 5 s ON/95 s OFF) is 6.5% higher than that of OptoAMP3, corresponding to 231% of $P_{TEF1}$ activity. Both OptoAMP3 and OptoAMP4 achieve maximal expression levels at 5% light duty cycle, possibly because oversaturation of GAL4 expression causes additional cellular burden under full light conditions. The higher strength of OptoAMP4 is likely due to the weaker promoter ($P_{RNR2}$) used to express GAL80-PSD in this circuit, relatively to OptoAMP3 ($P_{ADH1}$). However, OptoAMP3 has a higher light-to-dark fold change in activity (46 vs 32 of OptoAMP4), which makes both circuits potentially useful for different applications.

OptoAMP4 Facilitates Light-Induced Gene Expression at High Cell Density. OptoAMP circuits are designed to overcome light-limited conditions in bioreactors (at least lab-scale) at high cell densities. To demonstrate their enhanced functionality, the ability of OptoAMP4 to induce gene expression with light in a 5 L bioreactor at high cell density was compared against that of a conventional OptoEXP circuit. YEZ139 (OptoEXP) or YEZ336 (OptoAMP4) was inoculated into 10 mL of SC-His+2% glucose from a single colony and grew in the dark for 16 h. A BioFlo120 system with a 5 L bioreactor (Eppendorf, B120110002) was set up and 3 L of SC-His medium supplemented with 15% glucose was added after autoclaving. The reactor was set to 30° C., pH of 5.5, and a minimum dissolved oxygen of 40%. One blue LED panel (HQRP New Square 12" Grow Light Blue 517 LED 14 W) was placed 20 cm from the cell culture. At this distance, the light panel output was 75 µmol/m²/s and covered ~7% of the available bulk surface area of the fermentation. The reactor was inoculated to an $OD_{600}$ of 1 and the cells were grown in the dark (maintained by covering the reactor with black fabric) until the cultured reached an $OD_{600}$ of 15, which took about 12 h. At an $OD_{600}$ of 15, the lights were turned on at 5 s ON/95 s OFF duty cycles and samples were taken 0, 3, and 24 h after light induction. At each time point, cell samples were diluted in ice-cold PBS to an $OD_{600}$ of 0.5, kept on ice in the dark, and taken to flow cytometry.

Under these conditions, conventional OptoEXP shows no detectable light-induced GFP expression after 24 h of starting the light exposure. In contrast, OptoAMP4 shows homogeneous expression of GFP after only 3 h of limited light induction. Furthermore, OptoAMP4 maintains its GFP expression even after 24 h of batch fermentation, at which point the $OD_{600}$ of the culture is 41.2—well into stationary phase. These results demonstrate the feasibility of using OptoAMP4 for light-induced gene expression in fermentations at relatively high cell densities, in bioreactors of at least 5 L, and using low light doses, which are conditions with substantially limited light penetration that prevent activation of earlier optogenetic circuits (OptoEXP).

OptoAMP Circuits Enhance Production of Valuable Chemicals. Having established that OptoAMP circuits can overcome limitations in light penetration at least in lab scale bioreactors, it was sought to determine whether they could be used to control biosynthetic pathways with minimal light stimulation. A unique benefit of using optogenetics to control microbial fermentations is that distinct light schedules may be applied to design any number of fermentation protocols. Thus, a new fermentation protocol was developed consisting of three phases: (i) a growth phase, in which biomass accumulates; (ii) an induction phase, in which OptoAMP activates production pathways; and (iii) a production phase, in which strains produce chemicals of interest after resuspension in fresh media under variable light conditions. See, e.g., FIG. 2. With this new fermentation protocol, we can apply various light conditions (full light, full darkness, or light pulses) in each phase, to maximize production.

Example 2

Figure 11A:
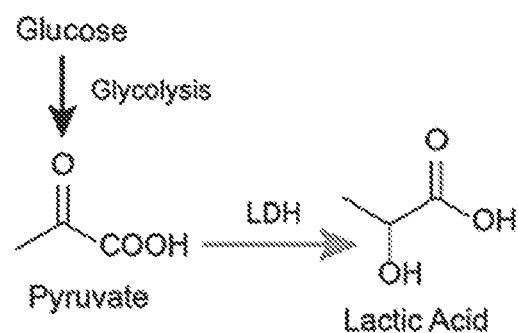
FIG. 11A is a schematic showing lactic acid biosynthesis, with optogenetic control of LDH.
Figure 11B:
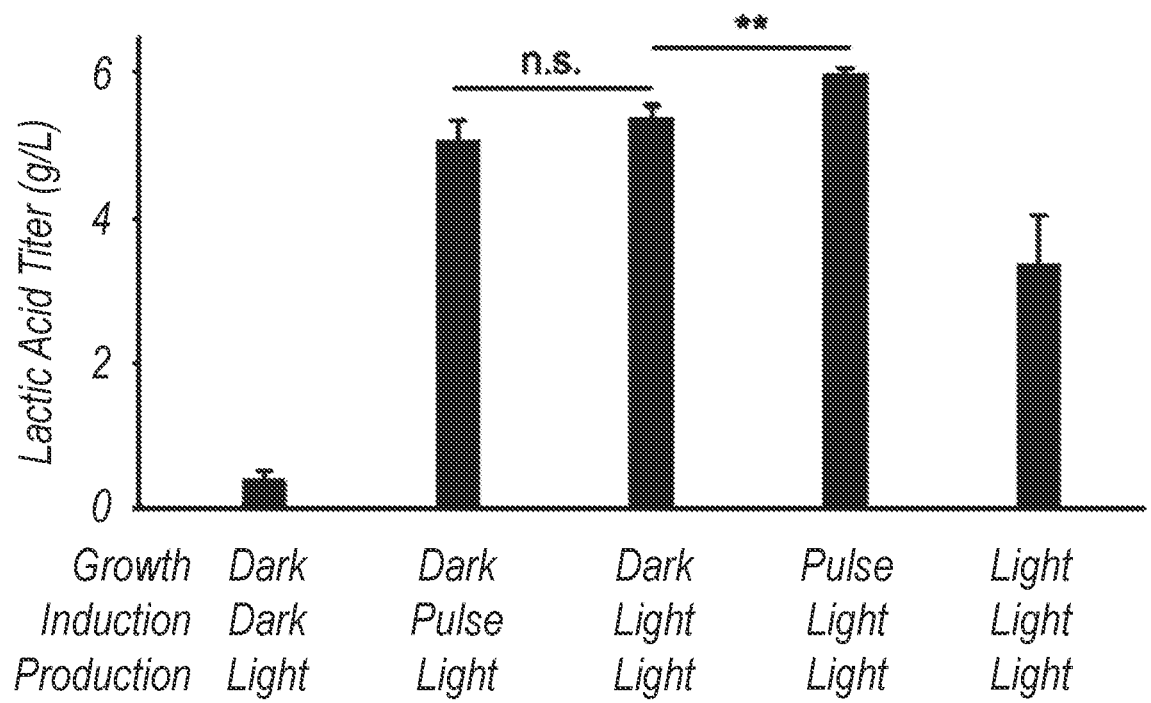
FIG. 11B is a graph showing lactic acid production using OptoAMP4 to control LDH expression from $P_{GAL1-S}$ (YEZ423) using different light schedules in the growth and induction phases. Graphs shown in 11B, 12B, and 13B use *=P<0.05, **=P<0.01. Statistics are derived using a two-sided t-test. All data are shown as mean values; error bars represent the s.d. of four biologically independent 1-mL sample replicates exposed to the same conditions.

This new fermentation protocol was used to test OptoAMP4 in the production of lactic acid (LA), a valuable polymer precursor and food additive that only requires one exogenous enzyme (lactate dehydrogenase, LDH) to synthesize from pyruvate. See FIG. 11A. OptoAMP4 was used to drive $P_{GAL1-S}$ to control LDH expression during the three-phase fermentation protocol. Referring to FIG. 11B, different light schedules—dark ("Dark"), full light ("Light"), or 1 s ON/79 s OFF light pulses ("Pulse")—were applied during the growth (20 h) and induction (12 h) phases, but always full light during the production (24 h) phase to maximize LDH induction.

Specifically, starting from strain YEZ44, OptoAMP4 (EZ-L582) was integrated into the HIS3 locus, creating YEZ336. Next, lactate dehydrogenase (LDH1) was transformed from *Lactobacillus casei* under $P_{GAL1-S}$(EZ-L605: 2 µl plasmid with URA3 selection) into YEZ336, creating YEZ423. Single colonies of YEZ423 were used to inoculate 1 mL of SC-Ura+2% glucose media in 24-well plates and grown overnight at 30° C., 200 rpm, and under ambient light conditions. Each culture was then back-diluted into fresh media to $OD_{600}$=0.1 and grown for 20 h (until cultures reached an $OD_{600}$ of 3) while grown in the dark (wrapped in aluminum foil). Cultures were then grown for 12 more hours under full light. Each culture was then centrifuged at 1000 rpm for 5 min and cell pellets were resuspended in 1 mL of fresh SC-Ura+2% glucose media. The plates were then sealed with Nunc Sealing Tape and incubated for 24 h at 30° C. under full blue light. Finally, cells were centrifuged, and supernatants were collected for HPLC analysis.

After screening 12 colonies for production of each chemical, 3-phase fermentations (in quadruplicates) were performed with the colony exhibiting the highest product yield, using different light schedules (full light, full darkness, or 1 s ON/79 s OFF pulses) during the growth, and induction phases. For all fermentations, the growth phase was 20 h following back-dilution of the overnight cultures; the induction phase was 12 h immediately following the growth phase, and carried out in the same media; finally, the production phase initiated after centrifuging the cultures and resuspending the cells in fresh media (to replenish nutrients, including glucose, as well as to remove inhibitory waste products, such as ethanol, that may accumulate during the previous phases). For lactic acid, the production phase was performed under full blue light for 24 h. After the fermentation, the cultures were centrifuged and the supernatants collected for HPLC analysis.

Applying only 1.3% light pulses during the induction phase leads to a 12.8-fold increase in LA titer (5.1±0.3 g/L), relative to keeping cells in the dark during the induction phase (0.4±0.1 g/L). See FIG. 11B. Furthermore, there is an improvement in LA production (6.0±0.1 g/L) when a 1.3% light pulse is applied during the growth phase, compared to growing the cells in complete darkness (5.4±0.2 g/L) or keeping the light on throughout the three phases of fermentation (3.4±0.7 g/L). These results suggest that chemical production may be improved by weak early pathway induction in new multiphasic fermentation protocols, a unique capability of optogenetic controls that is enabled by the enhanced light sensitivity of OptoAMP circuits.

Example 3

Figure 12A:
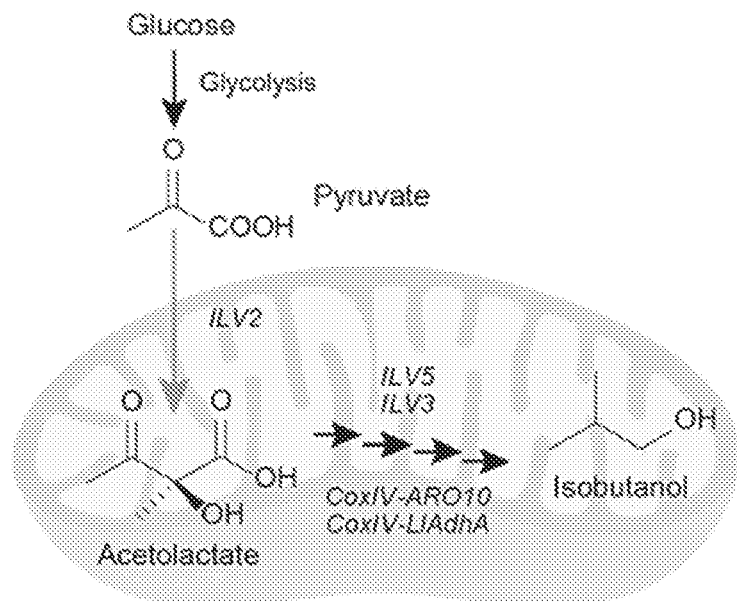
FIG. 12A is a schematic showing a mitochondrial isobutanol production pathway, with optogenetic control of ILV2 expression.

Next, a strain with light-induced isobutanol production was created to show that OptoAMP circuits can regulate production of a multistep biosynthetic pathway with low levels of light exposure during the production phase. Using OptoAMP4, the expression of the first gene of the mitochondrial isobutanol pathway (ILV2) from $P_{GAL1-M}$ was controlled with light, while the rest of the genes in the pathway (ILV5, ILV3, CoxIV-ARO10, and CoxIV-adhA$^{RE1}$ from *Lactococcus lactis*) were constitutively expressed. See FIG. 12A.

Specifically, enzymes of the mitochondrial isobutanol pathway—ketol-acid reducto-isomerase (ILV5), dihydroxy-acid dehydratase (ILV3), CoxIV-tagged α-ketoacid decarboxylase (CoxIV-ARO10), and CoxIV-tagged alcohol dehydrogenase were introduced from *Lactococcus lactis* (CoxIV-LladhA$^{RE1}$)—under constitutive promoters, along with acetolactate synthase (ILV2), the first enzyme in the mitochondrial isobutanol pathway, under $P_{GAL1-M}$. These genes (EZ-L390:2µ plasmid with URA3 selection) were transformed into YEZ336, creating YEZ516.

Colonies of YEZ516 were used to inoculate 1 mL of SC-Ura+2% glucose media in 24-well plates and grown overnight at 30° C., 200 rpm, and under ambient light conditions. Each culture was then back-diluted into new media to $OD_{600}$=0.1 and grown for 20 h (until cultures reached an $OD_{600}$ of 3) and grown in the dark (wrapped in tinfoil). Cultures were then grown for 12 more hours under full light. Each culture was then centrifuged at 1000 rpm for 5 min and cell pellets were resuspended in 1 mL of fresh SC-Ura+2% glucose media. The plates were then sealed with Nunc Sealing Tape and incubated for 48 h at 30° C. and 200 rpm under 2 s ON/118 s OFF pulsed light. Finally, cells were centrifuged, and supernatants were collected for HPLC analysis.

After screening 12 colonies for production of each chemical, 3-phase fermentations (in quadruplicates) were performed with the colony exhibiting the highest product yield, using different light schedules (full light, full darkness, or 1 s ON/79 s OFF pulses) during the growth, and induction phases. For all fermentations, the growth phase was 20 h following back-dilution of the overnight cultures; the induction phase was 12 h immediately following the growth phase, and carried out in the same media; finally, the production phase initiated after centrifuging the cultures and resuspending the cells in fresh media (to replenish nutrients, including glucose, as well as to remove inhibitory waste products, such as ethanol, that may accumulate during the previous phases). For isobutanol, the production phase was performed under 2 s ON/118 s OFF light for 48 h. After the fermentation, the cultures were centrifuged and the supernatants collected for HPLC analysis.

Figure 12B:
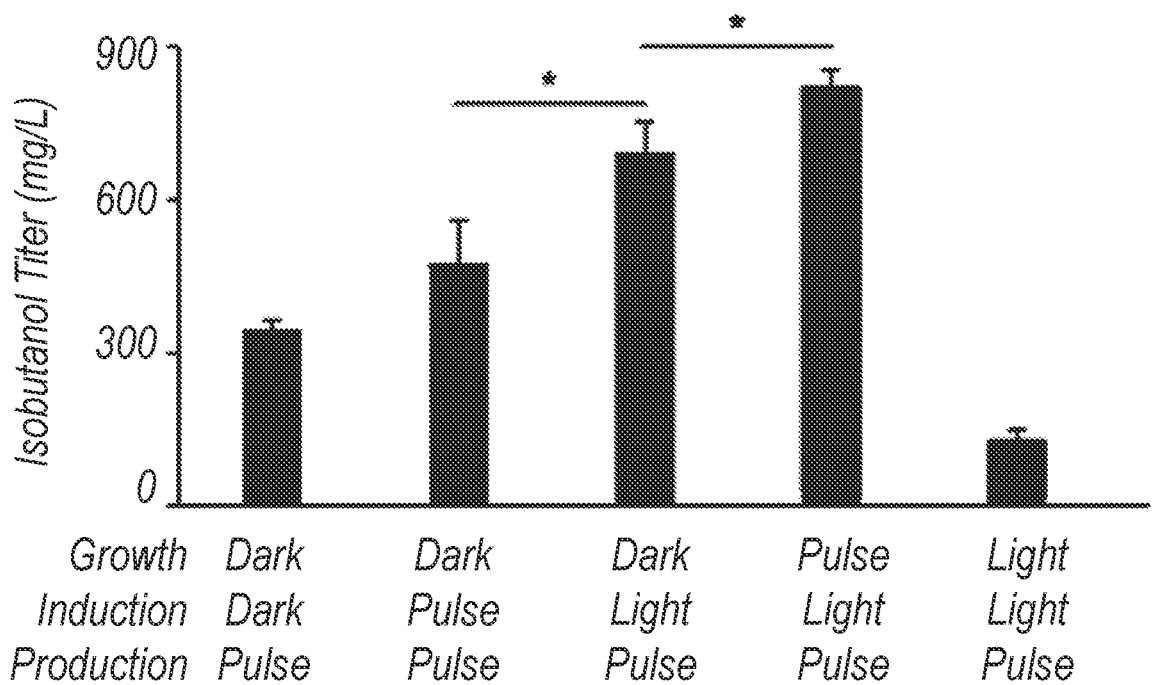
FIG. 12B is a graph showing isobutanol production using OptoAMP4 to control ILV2 expression from $P_{GAL1-M}$ (YEZ516) using different light schedules in the growth and induction phases.

Referring to FIG. 12B, the three-phase light-induced isobutanol fermentations were run, in which the cell cultures were exposed to different light schedules—dark ("Dark"), full light ("Light"), or light pulses ("Pulse")—1 s ON/79 s OFF ("Pulse") during the growth (20 h) and induction (12 h) phases. 1 s ON/79 s OFF was used for pulses in the first two phases, but every phase was only exposed to a limited 1.7% light dose (2 s ON/118 s OFF) light pulses during the production phase (48 h) to mimic the limited light penetration conditions typically found in larger bioreactors. Isobutanol titers reach 350±20 mg/L when fermentations are exposed to light only during the production phase. However, applying 1.3% light or full light during the induction phase leads to a 1.4-fold or 2-fold improvement in titer (480±80 and 700±60 mg/L), respectively, consistent with light-induced pathway expression prior to the production phase. Applying a low light dose during the growth phase leads to a further 19% increase in isobutanol titers (830±30) compared to keeping the cultures in the dark during the same phase (690±60 mg/L). In contrast, exposing cultures to full light during the growth phase leads to 6.4-fold lower isobutanol titer (130±20 vs 830±30 mg/L). These results again imply that early (but not excessive) pathway induction during the growth phase can improve chemical production, similar to what was observed for LA production.

Example 4

Figure 13A:
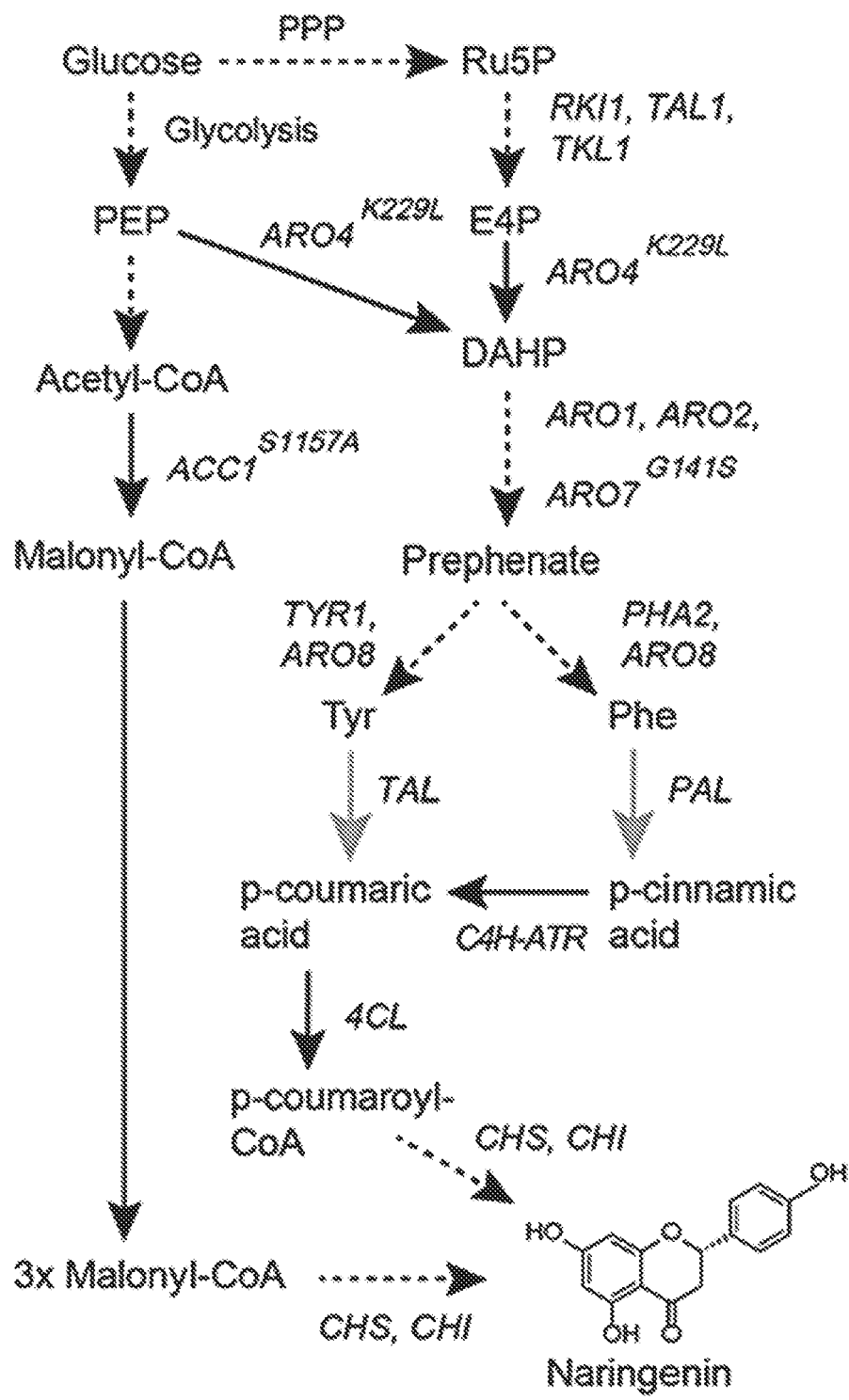
FIG. 13A is a schematic showing a naringenin biosynthetic pathway, with FjTAL and AtPAL2 expression controlled optogenetically (where PPP=pentose phosphate pathway, and multienzymatic steps are shown in dashed arrows).

Some metabolic pathways may benefit from more complex fermentation protocols afforded by the ease with which light can be instantly applied and removed. Such is the case for the biosynthesis of naringenin, a flavonoid with anti-inflammatory and other therapeutic properties derived from tyrosine and phenylalanine. See FIG. 13A.

Starting from strain JCY125 (YEZ44 ΔARO10), Opto-AMP4 (EZ-L580) was integrated into the HIS3 locus, creating YEZ480. pMAL236 was then integrated, containing constitutively expressed enzymes to boost shikimate production—ribose-5-phosphate ketol-isomerase (RKI1), trans-aldolase (TAL1), transketolase (TKL1), pentafunctional aromatic enzyme (ARO1), feedback-insensitive 3-deoxy-D-arabino-heptulosonate-7-phosphate synthase (ARO4$^{K229L}$), chorismate synthase (ARO2), and feedback-insensitive cho-rismite mutase (ARO7G$^{141S}$)—into the LEU2 locus of YEZ480 to create YEZ482. Next, constitutively expressed enzymes were introduced to overproduce tyrosine, phenylalanine, and malonyl-CoA-phenylalanine and tyrosine transaminase (ARO8), prephenate dehydrogenase (TYR1), prephenate dehydratase (PHA2), and phosphorylation inactivation-resist-ant acetyl-CoA carboxylase (ACC1$^{S1157A}$)—through multicopy integration of pMAL311 and pMAL399 into δsites to make YEZ486. Finally, enzymes of the naringenin pathway—phenylalanine ammonium lyase from *Arabidopsis thaliana* (AtPAL2), a fusion of cinnamate 4-hydroxylase and NADPH-cytochrome P450 reductase from *A. thaliana* (AtC4H-AtATR2), 4-coumarate-CoA ligase from *A. thaliana* (At4CL2), naringenin-chalcone synthase *Hypericum* and *rosaemum* (HaCHS), and chalcone isomerase from *Petunia hybrida* (PhCHI)—were introduced under constitutive promoters, along with tyrosine ammonia-lyase from *Flavobacterium johnsoniae* (FjTAL) and phenylalanine ammonia-lyase from *A. thaliana* (AtPAL2), the first enzymatic step toward naringenin biosynthesis from tyrosine and phenylalanine, under $P_{GAL1-S}$. These genes were introduced using a 2 µl plasmid (EZ-L645) with URA3 selection to transform YEZ486, creating YEZ488.

Colonies of YEZ488 were used to inoculate 1 mL of SC-Ura+2% glucose media in 24-well plates and grown overnight at 30° C., 200 rpm, and under ambient light conditions. Each culture was then back-diluted into new media to OD$_{600}$=0.1 and grown for 20 h (until an OD$_{600}$ of 3) in the dark (wrapped in aluminum foil). Cultures were then grown for 12 more
hours under full light. Each culture was then centrifuged at 1000 rpm for 5 min and cell pellets were resuspended in 1 mL of fresh SC-Ura+2% glucose media. The plates were then sealed with Nunc Sealing Tape and incubated for 48 h at 30° C. and 200 rpm in full darkness. Finally, cells were centrifuged, and supernatants were collected for HPLC analysis.

Figure 13B:
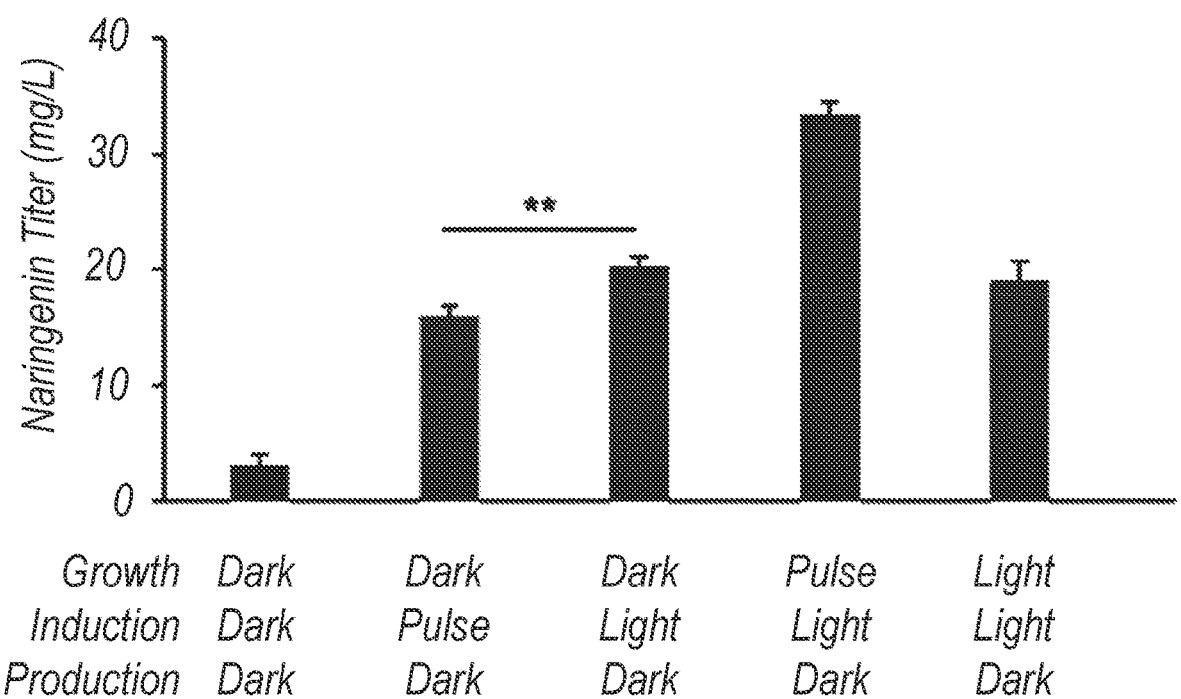
FIG. 13B is a graph showing naringenin production using OptoAMP4 to control the expression of FjTAL and AtPAL2 from $P_{GAL1-S}$(YEZ488) using different light schedules in the growth and induction phases.

Thus here, starting from a strain background that is engineered to upregulate aromatic amino acid production, enzymes of the naringenin pathway (AtC4H-AtATR2, At4CL2, HaCHS, and PhCHI) were introduced under constitutive promoters. In addition, OptoAMP4 was used to control $P_{GAL1-S}$ to drive expression of the first enzymatic steps to produce naringenin from tyrosine and phenylalanine: tyrosine ammonia-lyase (FjTAL) and phenylalanine ammonia-lyase (AtPAL). See FIG. 13A. Referring to FIG. 13B, three-phase fermentations for naringenin production, testing various light conditions in all three phases. As with LA and isobutanol, naringenin production benefits from a low light dose (1.3%) during the growth phase (20 h), achieving 76% and 65% higher titers than if this phase is kept in full light or darkness, respectively. Moreover, naringenin titers improve 6.8-fold when the production phase (48 h) is kept in complete darkness compared to under full light. This suggests that the levels of FjTAL and AtPAL accumulated during the induction phase (12 h) are sufficient to achieve higher naringenin production, making light exposure during the production phase unnecessary and perhaps detrimental due to cellular overburden, or photosensitivity of the product or its precursors. Optogenetic control of naringenin production is thus a good example of how specifically tailored light schedules in three-phase designer fermentations may benefit different metabolic pathways.

Example 5

Figure 14:
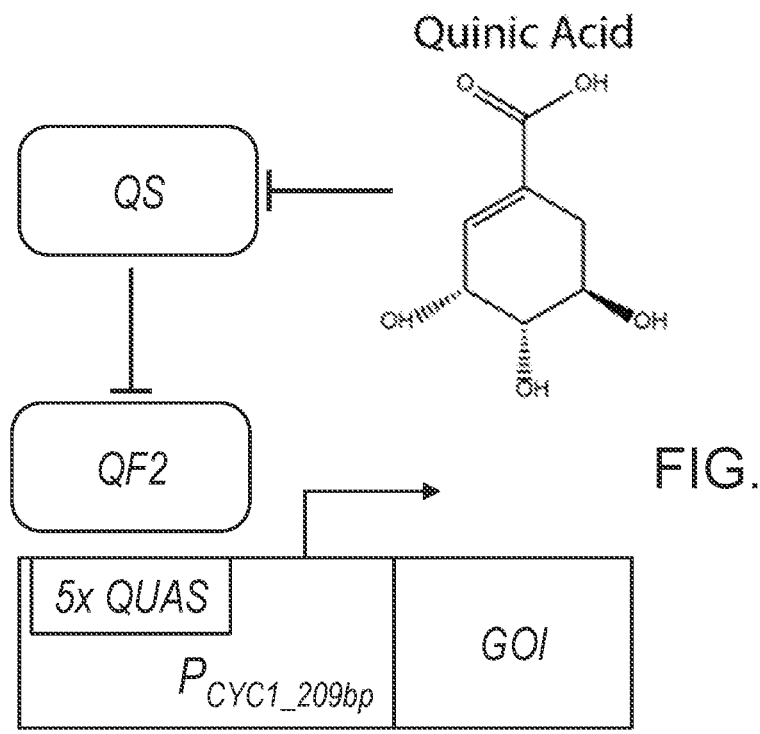
FIG. 14 is an illustration showing Q system functionality in *S. cerevisiae*, where QF2 binds to 5xQUAS operators embedded within a truncated PCYC1 promoter to activate transcription. QS inhibits QF2 activity, repressing transcription. QS repression of QF2 is inhibited by quinic acid.

To obtain a functional QF in *S. cerevisiae* (see FIG. 14) a truncated version lacking the middle domain of the protein (residues 206-650) was expressed but with N-terminal DNA-binding and C-terminal transcriptional activation domains intact. This truncated version, previously named QF2, was found to alleviate toxicity of QF in *D. melanogaster* without sacrificing transcriptional strength. A QF2-activated synthetic promoter was designed for *S. cerevisiae* by embedding five QUAS sites within a truncated $P_{CYC1}$ promoter.

Specifically, promoter-gene-terminator sequences were cloned into standardized vector series (pJLA vectors) as known in the art (see FIGS. 7C-7H). When pJLA vectors were not available, Gibson isothermal assembly was used to insert constructs into pJLA vectors for compatibility with the rest of the vectors. Epoch Life Science DNA Miniprep, Omega E.Z.N.A. Gel Extraction, and Omega E.Z.N.A. Cycle Pure kits were used to extract and purify plasmids and DNA fragments. Genes and promoters (GAL4, GAL80, GFP, $P_{GAL1-M}$, $P_{GAL1-S}$, $P_{CCW12}$, $P_{TEF1}$, $P_{PGK1}$, $P_{HHF2}$, $P_{ADH1}$, $P_{RNR2}$) were amplified from yeast genomic DNA or lab plasmids, using CloneAmp HiFi PCR premix from Takara Bio, following manufacturer's instructions. Primers were ordered from Integrated DNA Technologies (Coralville, IA). All plasmids were verified using Sanger sequencing from Genewiz (South Plainfield, NJ). Tandem repeats were avoided to prevent recombination after transformation and thus do not observe instability of strains.

Using QF2 (transcribed from $P_{PGK1}$) to constitutively express green fluorescent protein (GFP) from $P_{5xQUAS}$ [SEQ ID NO. 5] achieves the same expression level as the strong constitutive $P_{TEF1}$ promoter. However, $P_{5xQUAS}$ alone (without expressing QF2), also shows substantial endogenous constitutive activity, reaching 5.8% of $P_{TEF1}$ expression. Furthermore, $P_{5xQUAS}$ activity is enhanced in media containing galactose, possibly through the derepression of Gal4p activity. To avoid potential cross-activation of $P_{5xQUAS}$ by Gal4p, all CGG sequences (found in Gal4p binding sites) from $P_{5xQUAS}$ were replaced with AGG sequences, creating $P_{5xQUASf}$ [SEQ ID NO. 6]. It was found that $P_{5xQUASf}$ has a 55% and 77% reduction in endogenous constitutive activity compared to $P_{5xQUAS}$ in glucose and galactose, respectively, while QF2-mediated activation of this promoter still achieves PTEF1 levels of GFP expression. Thus, $P_{5xQUASf}$ in yeast strains expressing QF2 is a strong constitutive promoter that is not activated by galactose.

The QF2, QS, qa-y, and $P_{5xQUAS}$ sequences were synthesized by Bio Basic's gene synthesis service. The $P_{5xQUASf}$ sequence was synthesized by Synbio Technologies' gene synthesis service. To make $P_{5xQUAS}$, five QUAS binding sites were placed upstream of the TATA-1β box of a truncated 209-base-pair Pox' promoter with UAS1 and UAS2 sites removed. Because the original 5xQUAS sequence contains a CGG-N12-CGG sequence, which is similar to the CGG-N11-CGG sequence recognized by Gal4p, all CGG sequences were replaced with AGG sequences to prevent potential activation of the promoter by Gal4p, calling this variant $P_{5xQUASf}$.

Yeast transformations were carried out using standard lithium acetate protocols; the resulting strains are catalogued in FIGS. 8C-8G. Gene deletions (BDH1) were carried out by homologous recombination as known in the art. Gene assemblies in pYZ12-B, pYZ162, and pYZ23 were integrated into the HIS3 locus, LEU2 locus, or δ-sites (YARCdelta5) as previously described. 5 Zeocin (Thermo Fisher Scientific) was used at a concentration of 1200 μg/mL to select for δ-integration.

Single colonies from agar plates were inoculated into liquid SC dropout media in triplicate and grown in 96-well (U.S.A. Scientific #CC7672-7596) or 24-well (U.S.A. Scientific #CC7672-7524) plates at 30° C. and shaken at 200 rpm (19 mm orbital diameter). To stimulate cells with blue (465 nm) light, we used LED panels (HQRP New Square 12" Grow Light Blue LED 14 W) placed above the culture such that light intensity was between 80 and 110 μmol/m²/s as measured using a Quantum meter (Apogee Instruments, Model MQ-510), which corresponds to placing the LED panels approximately 40 cm from the cultures. To control light duty cycles, LED panels were regulated with a Near-pow Multifunctional Infinite Loop Programmable Plug-in Digital Timer Switch.

To measure cell concentration, optical density measurements were taken at 600 nm ($OD_{600}$), using media (exposed to the same light and incubation conditions as the yeast cultures) as blank. Measurements were taken using a TECAN plate reader (infinite M200PRO) or Eppendorf spectrophotometer (BioSpectrometer basic) with a microvolume measuring cell (EppendorfμCuvette G1.0), using samples diluted to a range of $OD_{600}$ between 0.1 and 1.0.

GFP fluorescence was quantified by flow cytometry using a BD LSR II flow cytometer and BD FacsDiva 8.0.2 software (BD Biosciences, San Jose, CA, U.S.A.) with a 488 nm laser and 525/50 nm bandpass filter. BFP fluorescence was quantified with a 405 nm laser and 450/50 nm bandpass filter. For experiments involving both GFP and BFP, compensation was applied to account for spectral overlap. The gating used in these analyses was defined to include positive (YEZ186 for GFP; yMAL270 for GFP+BFP) and negative (YEZ140; yMAL248) cells based on fluorescence but exclude particles that are either too small or too large to be single living yeast cells, based on the side scatter (SSC-A) versus forward scatter (FSC-A) plots as well as forward scatter area (FSC-A) versus width (FSC-W) plots. Median fluorescence values were determined from 10,000 single-cell events.

To process fluorescence data, the background fluorescence from cells lacking GFP (YEZ140; yMAL248) were subtracted from the fluorescence values of each sample to account for cell autofluorescence and potential light bleaching. All fluorescence measurements were performed once per sample, such that potential activation of VP16-EL222 by the light used to excite GFP or emitted by BFP did not affect our experiments or results.

Figure 15:
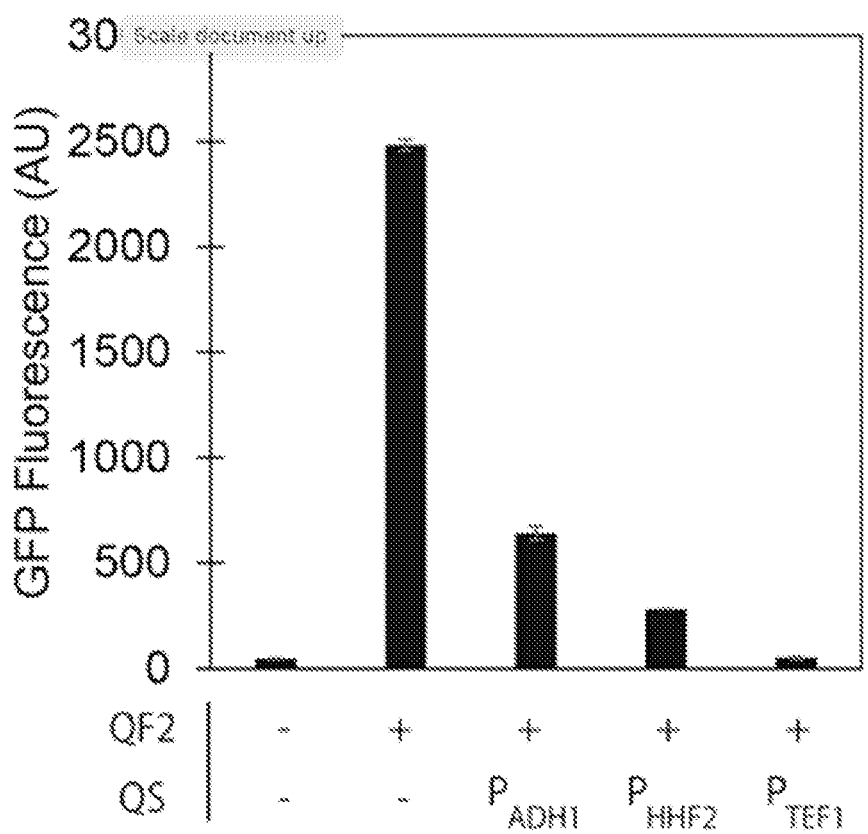
FIG. 15 is a graph showing expression of QF2-mediated GFP expression by QS transcribed from promoters of increasing strength: $P_{ADH1}$ (yMAL110), $P_{HHF2}$ (yMAL112), and $P_{TEF1}$ (yMAL111).

It was next explored whether QS could repress QF activity in yeast, as it has shown different efficacy levels in other organisms. To test this, QF2 and QS was co-expressed in a strain containing $P_{5xQUASf}$-GFP, using different constitutive promoters of varying strengths to express QS. It was found that the extent of QF2 repression depends on the strength of the promoter used to express QS, reaching 74%, 89%, and 98% repression when using $P_{ADH1}$, $P_{HHF2}$, and $P_{TEF1}$, respectively. See FIG. 15. These results show that both protein components of the Q System are fully functional in S. cerevisiae, and that the transcriptional activity of QF2 is tunable by titrating the expression level of the QS repressor.

Figure 16:
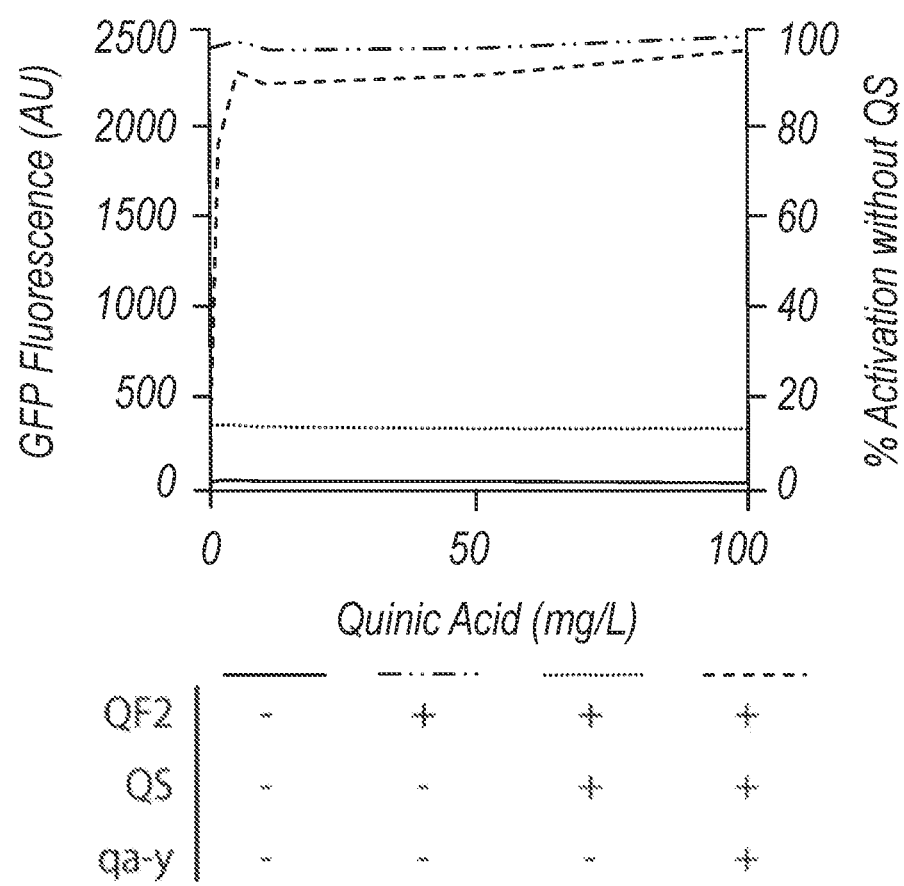
FIG. 16 is a graph showing GFP expression by QF2-activation of $P_{5xQUASf}$ without QS (yMAL53f, dashed-and-dotted line); with QS (yMAL112, dotted line); or with QS and qa-y (yMAL321, dashed line), compared to a negative control (YEZ140, solid line), in 0, 1, 5, 10, 50, or 100 mg/L quinic acid.

Having a functional QF2/QS pair in S. cerevisiae offered the possibility of developing a new chemically inducible system in this organism. Quinic acid is known to inhibit QS-mediated repression of QF in N. crassa, allowing it to activate transcription of the qa gene cluster. See FIG. 14. To test whether quinic acid could be utilized as a new chemical inducer in S. cerevisiae, strains containing $P_{5xQUASf}$-GFP, $P_{PGK1}$-QF2, and QS expressed from different promoters were grown in media containing quinic acid and checked for recovery of GFP expression due to QS inhibition. GFP recovery was observed in strains expressing QS from $P_{ADH1}$ or $P_{HHF2}$ but only after adding >1 g/L quinic acid, and only minimal recovery in the strain expressing QS from $P_{TEF1}$, likely due to the higher strength of this promoter. Considering the possibility that a quinic acid transport bottleneck was preventing the accumulation of enough intracellular levels to inhibit QS, the quinate permease encoded by qa-y from N. crassa was added to the strain expressing QS with $P_{HHF2}$. The resulting strain shows a 6.6-fold increase in sensitivity to quinic acid: 78% of GFP expression is recovered by addition of 1 mg/L quinic acid, while recovery is above 92% at concentrations >5 mg/L, reaching 96% at 100 mg/L. See FIG. 16. Moreover, expression is tunable by varying the concentration of quinic acid between 0.01 and 1 mg/L (GFP fluorescence~500 AU at 0.01 mg/L up to ~1900 AU at 1 mg/L), and optionally up to 10 mg/L (GFP fluorescence 2300 AU at 10 mg/L). Thus quinic acid can be established as a new chemical inducer in S. cerevisiae, achieving strong gene expression even at low inducer concentrations.

Specifically, To characterize $P_{5xQUAS}$, $P_{5xQUASf}$ and QF2 in S. cerevisiae, linearized pMAL217, pMAL217f, pMAL221, and pMAL221f were integrated into the HIS3 locus of CEN.PK2-1C, creating yMAL49, yMAL49f, yMAL53, and yMAL53f, respectively. 1 mL overnight cultures were grown of YEZ140, YEZ186, yMAL49, yMAL49f, yMAL53, and yMAL53f in SC-His+2% glucose media in triplicate. The cultures were then back diluted to ($OD_{600}$=0.1 in 150 μL triplicates into a 96-well plate and grew the cultures for 6 h. Then, 25 μL from each well was diluted into 175 μL of ice-cold phosphate buffered saline (Corning Life Sciences), kept on ice, and taken for flow cytometry analysis.

To determine the extent of repression of QF2 by QS, linearized pMAL381, pMAL382, and pMAL570 were integrated into the HIS3 locus of CEN.PK2-1C, creating yMAL110, yMAL111, and yMAL112, respectively. 1 mL overnight cultures were grown of YEZ140, yMAL53f, yMAL110, yMAL111, and yMAL112 in SC-His+2% glucose media. The cultures were then back-diluted to $OD_{600}$=0.1 in 150 μL triplicates into a 96-well plate and the cultures were grown for 6 h. Samples were then taken for flow cytometry analysis (as above).

To test inhibition of QS by quinic acid, 1 mL overnight cultures were grown of YEZ140, yMAL110, yMAL111, and yMAL112 in SC-His+2% glucose media. The cultures were then back-diluted to $OD_{600}$=0.1 in 150 µL triplicates into a 96-well plate in SC-His+2% glucose+0 mg/L, 50 mg/L, 100 mg/L, 500 mg/L, 1 g/L, 5 g/L, or 10 g/L quinic acid. Acidification of the media from the addition of quinic acid was neutralized to pH=5 using 5 M KOH. The cultures were grown for 6 h. Samples were then taken for flow cytometry analysis (as above).

To test functionality of qa-y, linearized pMAL745 was integrated into the HIS3 locus of CEN.PK2-1C, creating yMAL321. 1 mL of cultures of YEZ140, yMAL53f, yMAL112, and yMAL321 were grown overnight in SC-His+2% glucose media. The cultures were then back-diluted to $OD_{600}$=0.1 in 150 µL triplicates into a 96-well plate in SC-His+2% glucose+0, 1, 5, 10, 50, or 100 mg/L quinic acid. Acidification of the media from addition of quinic acid was neutralized to pH=5 using 5 M KOH. The cultures were grown for 6 h. Samples were then taken for flow cytometry analysis (as above).

Figure 17:
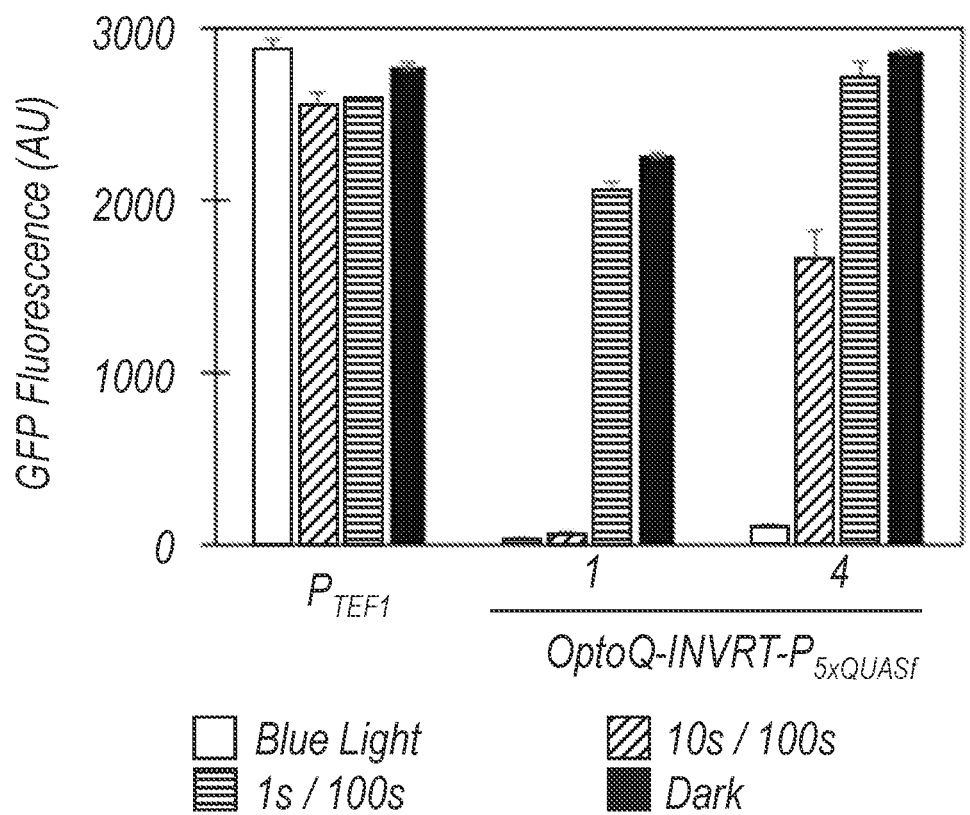
FIG. 17 is a graph showing GFP expression from $P_{TEF1}$ (YEZ186) or from $P_{5xQUASf}$ controlled by OptoQ-INVRT1 (yMAL227) or OptoQ-INVRT4 (yMAL239) under different doses of blue light: full light (100% light), 10 s ON/90 s OFF (10% light), 1 s ON/99 s OFF (1% light), and full darkness (0% light).

Using the Q System to Develop Optogenetic Inverter (OptoQ-INVRT) Circuits. Although the Q System enables the use of quinic acid as a new alternative to traditional chemical inducers in yeast, it also provides an exogenous platform upon which new optogenetic circuits may be developed. To build inverter circuits based on the Q System, or OptoQ-INVRT circuits, that induce gene expression in the dark, VP16-EL222 and $PC_{120}$ were used to express the QS repressor, thereby repressing QF2 transcriptional activity in blue light while allowing it in the dark. Guided by the design of the previously disclosed OptoINVRT circuits (US 2019/0119331, the contents of which are incorporated by reference herein), $P_{PGK1}$ was used to express QF2 and two copies of QS under the control of $P_{C120}$ and VP16-EL222, creating OptoQ-INVRT1. When using OptoQ-INVRT1 to control GFP expression from $P_{5xQUASf}$, 81.5% of $P_{TEF1}$ expression was achieved in darkness compared to 1.3% of $P_{TEF1}$ in blue light or a 61.2-fold induction between light and dark. See FIG. 17, Table 1.

TABLE 1

OptoQ-INVRT Circuit Characterization

| OptoQ-INVRT | 1 | 4 |
|---|---|---|
| Plasmid | pMAL513 | pMAL498 |
| Strain | yMAL227 | yMAL239 |
| QF2 tag | N/A | PSD |
| QS tag | N/A | ODCmut |
| Fold induction (dark/blue) | 61.2 | 26.5 |
| Maximum activation (% $P_{TEF1}$) | 81.5 | 103.2 |
| leakiness (% $P_{TEF1}$) | 1.3 | 3.9 |
| activation in 10/100 s blue light (% dark) | 3.2 | 63.0 |
| activation in 1/100 s blue light (% dark) | 91.3 | 95.2 |
| half-activation time (hours) | 3.2 | 1.5 |
| time delay (hours) | 1.7 | <1 |

In addition, OptoQ-INVRT1 is highly light-sensitive, reaching 99% of full repression when cells are exposed to a 10% light dose (a 10 s ON/90 s OFF light duty cycle). These results show that the Q System can be harnessed to develop new optogenetic circuits with the first demonstration, OptoQ-INVRT1, enabling strong gene expression in the dark and tight repression in the light.

Previously, it had been shown that the convention Opto-INVRT optogenetic inverter circuits exhibit time delays due to the half-life of the repressor protein and that reducing the stability of this repressor leads to faster rates of response and overall enhanced activity of the circuits. Therefore, it was set out to improve the activity of OptoQ-INVRT1 by destabilizing QS, which we hypothesized would lead to faster activation kinetics via accelerated derepression of QF2 in the dark. To achieve this, two copies of $PC_{120}$-controlled QS were integrated, C-terminally tagged to a weakened variant of the murine ornithine decarboxylase degradation tag (here, ODCmut). To prevent a potential increase in circuit leakiness under blue light due to reduced QS activity, a photosensitive degradation tag (PSD) was also fused to the C terminus of QF2, which increases its degradation rate in light conditions. The resulting circuit, OptoQ-INVRT4, exhibits a 26.7% increase in the maximum level of GFP expression obtained in the dark, relative to OptoQ-INVRT1, although a 2.9-fold increase in leakiness also reduces the light-to-dark fold of induction to 26.5-fold. See FIG. 17, Table 1. OptoQ-INVRT4 also shows a substantial decrease in light sensitivity, exhibiting a 37% reduction in expression under 10 s ON/90 s OFF light compared to 97% reduction for OptoQ-INVRT1, making OptoQ-INVRT4 easier to fine-tune at intermediate light doses. Therefore, OptoQ-INVRT1 and OptoQ-INVRT4 are both new valuable optogenetic circuits that may be selectively deployed depending on the specific needs for strength, light sensitivity, or fold of induction.

To explore the effect of modifying the half-lives of QF2 and QS on circuit kinetics, the change in GFP expression was measured over time. It was found that OptoQ-INVRT1 activation is detectable roughly 1.7 h following induction (switching from light to dark conditions), exhibiting a half-activation time of 3.2 h. The kinetic profile of OptoQ-INVRT1 is similar to that of the fastest previously developed OptoINVRT circuit, OptoINVRT7, which employs the Gal80p repressor and Gal4p activator modified with the same ODCmut and PSD tags, respectively. In contrast, OptoQ-INVRT4 shows a 1.5 h half-activation time (2.5 h faster than OptoINVRT7) and <1 h time delay. In addition, OptoQ-INVRT1 and OptoQ-INVRT4 show tight blue light repression for the duration of the time course. Therefore, modifying the turnover rates of QF2 and QS makes OptoQ-INVRT4 the fastest optogenetic inverter circuit developed to date.

Specifically, to construct OptoQ-INVRT1 and 4, linearized pMAL513 and pMAL498 were integrated into the HIS3 locus of CEN.PK2-1C, creating yMAL227 and yMAL239, respectively. 1 mL overnight cultures were grown of YEZ140, YEZ186, yMAL227, and yMAL239 in SC-His+2% glucose media under blue light. The cultures were then back-diluted to $OD_{600}$=0.1 in 150 µL triplicates into 96-well plates and the cultures were grown for 6 h under continuous (100%) blue light, 10% (10 s ON/90 s OFF) blue light, 1% (1 s ON/99 s OFF) blue light, or darkness (wrapped in aluminum foil). Samples were then taken for flow cytometry analysis (as above).

To compare the kinetics of OptoQ-INVRT circuits, 1 mL overnight cultures were grown of YEZ140, yMAL227, yMAL239, and YEZ230 (OptoINVRT7 with $P_{GAL1}$-M-GFP) in SC-His+2% glucose media under blue light. The cultures were back diluted to $OD_{600}$=0.1 in 1 mL triplicates in eight separate 24-well plates and grown for 3 h under blue light, at which point the cultures reached $OD_{600}$=0.8. Then, six plates were switched to the dark (by wrapping in aluminum foil); one plate was left in blue light for 8 h as a control and another was processed immediately (0 h time point). After 0, 1, 2, 3, 4, 6, and 8 h in the dark, 25 µL from each well was diluted into 175 µL of ice-cold phosphate buffered saline, kept on ice, and taken for flow cytometry analysis (as above).

To calculate the half-activation time of each circuit, a trendline was constructed using the linear portion of each activation curve and it was used to calculate the time at which half of the GFP maximum was reached (i.e., calculated the time (x) value at which GFP (y)=GFPmax/2). To calculate the time delay, the x-intercept of the trendline was found (i.e., calculated the time (x) value at which GFP (y)=0).

Using the Q System to Develop Optogenetic Amplification (OptoQ-AMP) Circuits.

Figure 18:
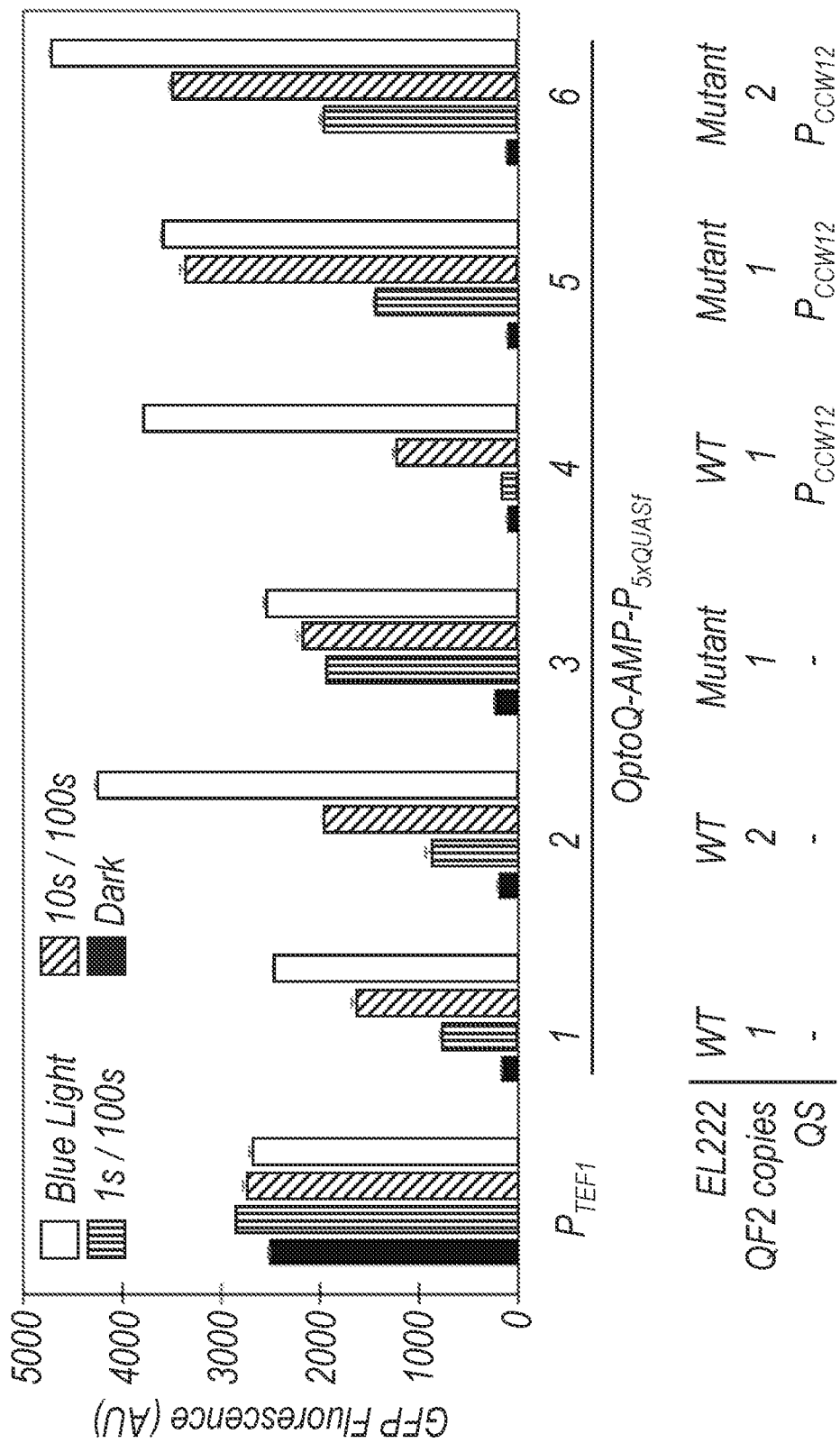
FIG. 18 is a graph showing GFP expression from $P_{TEF1}$ (YEZ186) or from $P_{5xQUASf}$ controlled by OptoQ-AMP1-6 (yMAL176, yMAL273, yMAL299, yMAL298, yMAL301, yMAL305) under different doses of blue light: full light (100% light), 10 s ON/90 s OFF (10% light), 1 s ON/99 s OFF (1% light), and full darkness (0% light).

Optogenetic amplification circuits provide another strategy to overcome potential limitations in light penetration, while enabling the use of light-activated systems to control gene expression. The Q System was applied to design new optogenetic amplifier circuits, following a similar architecture as the previously developed OptoAMP circuits, which are based on the GAL regulon. VP16-EL222 was used to control QF2 from $P_{C120}$, making its expression, and thus expression of genes downstream of $P_{5xQUAS}$, blue light-inducible. This circuit, which is referred to as OptoQ-AMP1, can amplify the effective transcriptional response of VP16-EL222 (direct activation with OptoEXP circuit) by 8.9-fold, reaching 92% of $P_{TEF1}$-GFP expression levels under full blue light, compared to 6.8% of $P_{TEF1}$ in the dark. See FIG. 18. OptoQ-AMP1 exhibits a 13.5-fold induction between light and darkness with intermediate levels of expression under shorter light duty cycles. To increase the maximum expression levels, one can add an extra copy of $P_{C120}$-QF2, resulting in OptoQ-AMP2, which achieves 158% the expression levels of $P_{TEF1}$ in blue light, and a 19.8-fold dark-to-light induction. Furthermore, to increase light sensitivity, one can use a mutant EL222 (A79Q), which has an increased lit-state half-life of 300 s compared to 30 s of the wild-type. The resulting circuit, OptoQ-AMP3, is highly sensitive to light, reaching 72% of maximum activation with only 1% light dose (a 1 s ON/99 s OFF light duty cycle).

While these modifications improve the strength and sensitivity of OptoQ-AMP circuits, they also increase their leakiness in the dark (7.9% and 9.6% of $P_{TEF1}$, for OptoQ-AMP2 and OptoQ-AMP3, respectively; see Table 2). Thus, it was aimed to further engineer the circuits to reduce background expression.

TABLE 2

| | OptoQ-AMP | | | | | |
|---|---|---|---|---|---|---|
| | 1 | 2 | 3 | 4 | 5 | 6 |
| Plasmid | pMAL358 | pMAL669 | pMAL722 | pMAL716 | pMAL724 | pMAL728 |
| Strain | yMAL176 | yMAL273 | yMAL299 | yMAL298 | yMAL301 | yMAL305 |
| EL222 | WT | WT | A79Q | WT | A79Q | A79Q |
| # of QF2 | 1 | 2 | 1 | 1 | 1 | 2 |
| QS_PSD Promoter | N/A | N/A | N/A | $P_{CCW12}$ | $P_{CCW12}$ | $P_{CCW12}$ |
| Fold Induction (blue/dark) | 13.2 | 19.8 | 9.9 | 32.1 | 30.6 | 36.9 |
| Maximum Activation (% $P_{TEF1}$) | 91.8 | 158.5 | 95.0 | 141.6 | 134.5 | 175.8 |
| Leakiness (% $P_{TEF1}$) | 6.8 | 8.0 | 9.6 | 4.4 | 4.4 | 4.8 |
| Activation in 10/100 s blue light (% full blue) | 65.0 | 45.0 | 83.9 | 31.7 | 91.4 | 72.8 |
| Activation in 1/100 s blue light (% full blue) | 29.7 | 19.6 | 71.8 | 4.3 | 38.0 | 39.7 |

To preserve tight repression in the OFF-state without sacrificing ON-state expression, the QS repressor was co-expressed, C-terminally tagged with a PSD. With this modification, QS stably represses leaky expression from QF2 in the dark but is rapidly degraded under blue light to preserve maximal expression. To find an optimal expression level for QS-PSD, a range of constitutive promoters were tested (from weaker to stronger: $P_{RNR2}$, $P_{PGK1}$, and $P_{CCW12}$). Higher QS-PSD expression levels ($P_{PGK1}$ and $P_{CCW12}$) reduce leaky gene expression in the dark as expected, but also increase gene expression under full light, a similar phenomenon to what was observed in our OptoQ-INVRT4 inverter circuit. On the basis of this finding, QS-PSD was expressed from the strong $P_{CCW12}$ promoter alongside one copy of $P_{C120}$-QF2. This new circuit, OptoQ-AMP4, shows lower basal expression in the dark (4.4% of $P_{TEF1}$) and higher expression in full light (142% of $P_{TEF1}$) compared to OptoQ-AMP1. Because OptoQ-AMP4 exhibits reduced light sensitivity, EL222 was replaced with the hypersensitive EL222$^{A79Q}$ variant to make OptoQ-AMP5, which shows an 8.4-fold increase in activation under 1% light exposure. Finally, an extra copy of $P_{C120}$-QF2 was added to OptoQ-AMP5, creating OptoQ-AMP6, which shows the highest activation levels (176% of $P_{TEF1}$ under full light) and largest dynamic range (37-fold induction) of our OptoQ-AMP circuits. The differences observed in strength, sensitivity, tunability, and fold of induction between this suite of OptoQ-AMP circuits, provide flexible options for the particular needs of different applications.

The response times of the OptoQ-AMP circuits were also characterized by measuring changes in GFP expression over time after switching strains from darkness to full light. OptoQ-AMP1 and OptoQ-AMP3 exhibit similar kinetics to those of the previously developed OptoAMP1 circuit, reaching 78% of maximum GFP expression in 1 h and full expression within 3 h of light induction. Moreover, the additional copy of QF2 (in OptoQ-AMP2 and -AMP6) and/or QS-PSD (in OptoQ-AMP4, -AMP5, and -AMP6) significantly increases maximum expression capacity while maintaining similar initial activation kinetics. While the simpler OptoQ-AMP1, OptoQ-AMP3, and Opto-AMP1 reach full activation within 3 h, circuits containing QS-PSD or an extra copy of QF2 (OptoQ-AMP2, -AMP4, -AMP5, and -AMP6) continue to induce expression for at least 9 h more, which allows them to achieve higher levels of gene expression. Furthermore, fold-changes between light and darkness remain high 12 h after induction, indicating tight OFF-state control. Therefore, all OptoQ-AMP circuits show rapid initial activation rates with the strongest ones (OptoQ-AMP2, -AMP4, -AMP5, and -AMP6) exerting their effect over longer periods of time.

Specifically, to construct OptoQ-AMP1-6, linearized pMAL358, pMAL669, pMAL722, pMAL716, pMAL724, and pMAL728 were integrated into the HIS3 locus of CEN.PK2-1C, creating yMAL176, yMAL273, yMAL299, yMAL298, yMAL301, and yMAL305, respectively. 1 mL overnight cultures were grown of YEZ140, YEZ186, yMAL176, yMAL273, yMAL299, yMAL298, yMAL301, and yMAL305 in SC-His+2% glucose media in the dark. The cultures were then back-diluted to $OD_{600}$=0.1 in 150 μL triplicates into 96-well plates and grown for 6 h under continuous (100%) blue light, 10% (10 s ON/90 s OFF) blue light, 1% (1 s ON/99 s OFF) blue light, or darkness (wrapped in aluminum foil). Samples were then taken for flow cytometry analysis (as above).

To investigate how the strength of the promoter driving QS PSD expression impacts circuit performance, linearized pMAL609 and pMAL723 were integrated into the HIS3 locus of CEN.PK2-1C, creating yMAL243 and yMAL300, respectively. 1 mL overnight cultures were grown of YEZ140, YEZ186, yMAL299, yMAL243, yMAL300, and yMAL305 in SC-His+2% glucose media in the dark. The cultures were then back-diluted to $OD_{600}$=0.1 in 150 μL triplicates into 96-well plates in SC-His+2% glucose and grown for 6 h under continuous (100%) blue light, 10% (10 s ON/90 s OFF) blue light, 1% (1 s ON/99 s OFF) blue light, or darkness (wrapped in aluminum foil). Samples were then taken for flow cytometry analysis (as above).

To compare the kinetics of OptoQ-AMP1, OptoQ-AMP3, and OptoAMP1, 1 mL overnight cultures were grown of YEZ140, yMAL176, yMAL299, and YEZ72 (OptoAMP1 with $P_{GAL1}$ GFP) in SC-His+2% glucose in the dark. The cultures were back-diluted to $OD_{600}$=0.1 in 1 mL triplicates in four separate 24-well plates and grown for 3 h in darkness (covered with aluminum foil), at which point the cultures reached $OD_{600}$=1. The plates were then exposed to blue light. After 0, 1, 2, and 3 h of illumination, 25 μL from each well was diluted into 175 μL of ice-cold phosphate buffered saline, kept on ice, and taken for flow cytometry analysis (as above). To compare the kinetics of OptoQ-AMP1, OptoQ-AMP2, OptoQ-AMP4, OptoQ-AMP5, and OptoQ-AMP6, 1 mL overnight cultures were grown in the dark of YEZ140, yMAL176, yMAL273, yMAL298, yMAL301, and yMAL305 in SC-His+2% glucose. The cultures were then back-diluted to $OD_{600}$=0.1 in 1 mL triplicates in eight separate 24-well plates and grown for 3 h in darkness, at which point the cultures reached $OD_{600}$=1. Seven of the plates were then exposed to blue light; one plate was left in darkness for 12 h as a control. After 0, 2, 4, 6, 8, 10, and 12 h of illumination, 25 μL from each well was diluted into 175 μL of ice-cold phosphate buffered saline, kept on ice, and taken for flow cytometry analysis (as above).

The Q System Is Orthogonal to the GAL Regulon. To combine inverter and amplifier circuits in a single strain, it is necessary to use orthogonal circuit components. Because the original $P_{5xQUAS}$ promoter showed higher activity in galactose media, it was explored whether the GAL and Q Systems exhibit crosstalk by examining if each system affects the gene expression driven by the other. Using GFP as a reporter, it was found that constitutive expression of GAL4 does not activate $P_{5xQUASf}$, while coexpressing GAL80 with QF2 does not reduce GFP expression compared to expressing QF2 alone. These results confirm that Gal4p and Gal80p do not interfere with the activities of $P_{5xQUASf}$ or QF2. Similarly, constitutive expression of QF2 does not activate $P_{GAL1}$, and coexpression of GAL4 and QS does not decrease gene expression relative to expressing GAL4 alone. These results demonstrate that Gal4p and Gal80p do not interfere with the activities of $P_{5xQUASf}$ or QF2, and similarly QF2 and QS do not interfere with $P_{GAL1}$ or Gal4p. The robust orthogonality between the GAL regulon and Q System thus allows for application of optogenetic signal amplification and inversion in the same strain.

To test for cross-talk between QF2, Gal4p, and Gal80p, linearized pMAL217f, pMAL221f, pMAL398, and pMAL380 were integrated into the HIS3 locus of YEZ44, creating yMAL207, yMAL268, yMAL195, and yMAL198, respectively. 1 mL overnight cultures were grown of YEZ140, yMAL207, yMAL268, yMAL195, and yMAL198 in SC-His+2% glucose media. Cultures were then back-diluted to $OD_{600}$=0.1 in 150 μL triplicates into a 96-well plate and grown for 6 h. Samples were then taken for flow cytometry analysis (as above).

To test for cross-talk between Gal4p, QF2, and QS, linearized EZ-L164, pMAL397, pMAL374, and pMAL379 were integrated into the HIS3 locus of YEZ44, creating YEZ82, yMAL194, yMAL251, and yMAL197, respectively. 1 mL overnight cultures were grown of YEZ140, YEZ82, yMAL194, yMAL251, and yMAL197 in SC-His+2% glucose media. Cultures were then back-diluted to $OD_{600}$=0.1 in 150 μL triplicates into a 96-well plate and grown for 6 h. Samples were then taken for flow cytometry analysis (as above).

To confirm that OptoINVRT and OptoQ-AMP could be used in the same strain without cross-talk, linearized pMAL592 (OptoQ-AMP1 driving $P_{5xQUASf}$ BFP) was integrated into the LEU2 locus of YEZ230 (OptoINVRT7 driving PGAL1-MGFP in the HIS3 locus), creating yMAL246. This strain should only show GFP expression in darkness, and TagBFP expression in blue light. To make a control strain to subtract autofluorescence in which neither GFP nor BFP are expressed, linearized EZ-L439 (OptoINVRT7) was integrated into the HIS3 locus of YEZ25, creating yMAL155. Linearized pMAL743 (OptoQ-AMP1) was then integrated into the LEU2 locus of yMAL155, creating yMAL248. To make a strain that controls only GFP expression, linearized pMAL743 was integrated into the LEU2 locus of YEZ230, creating yMAL245. To make a strain that controls only BFP expression, linearized pMAL592 was integrated into the LEU2 locus of yMAL155, creating yMAL249. To make a positive control that expresses both GFP and TBFP constitutively as a test for potential fluorophore photobleaching, linearized pMAL653 (PTEF1_BFP) was integrated into the LEU2 locus of YEZ186 (which already contains PTEF1_GFP), creating yMAL270. Overnight cultures of yMAL270, yMAL245, yMAL246, yMAL248, and yMAL249 were grown in darkness in SC–His–Leu+2% glucose. Cultures were then back-diluted to $OD_{600}$=0.1 in 150 μL triplicates into 96-well plates and grown for 6 h under blue light or darkness (plates wrapped in aluminum foil). Samples were then taken for flow cytometry analysis (as above).

It was found that GFP expression from OptoINVRT7 is unaffected by the presence of OptoQ-AMP1 driving BFP, and vice versa, expression of BFP in the light is unchanged by OptoINVRT7. The fact that there is no reduction in maximal expression of GFP (from OptoINVRT7) or BFP (from OptoQ-AMP1) suggests that intracellular levels of VP16-EL222 (which is expressed from the strong $P_{TEF1}$ promoter) are not limiting even when controlling two optogenetic circuits. The results confirm that the amplifier and inverter circuits function orthogonally in the same strain, opening the door for their simultaneous use in practical applications, such as metabolic engineering for chemical production.

Simultaneous Optogenetic Amplification and Inversion for Chemical Production.

Figure 19A:
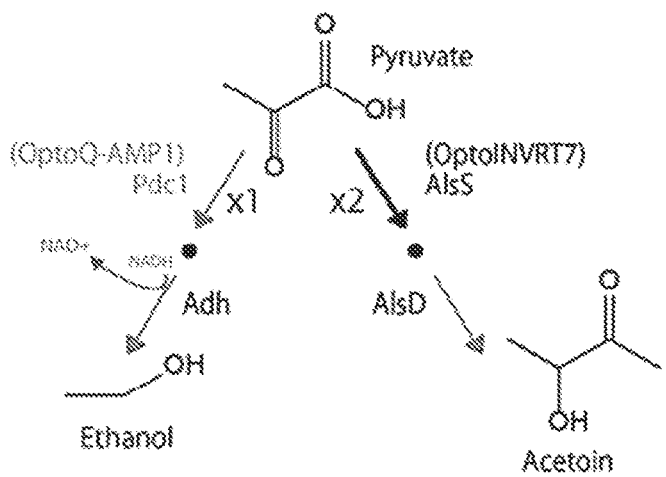
FIG. 19A is an illustration of the metabolic branch point between ethanol (Pdc1p) and acetoin (AlsS) production. $P_{DC1}$ is expressed from $P_{5xQUASf}$ controlled by OptoQ-AMP1 in blue light; alsS (from *B. subtilis*) is expressed from $P_{GAL1-S}$ controlled by OptoINVRT7 in darkness.

To demonstrate the benefit of implementing amplifier and inverter circuits simultaneously in a single strain, they were applied to metabolic engineering, co-utilizing OptoQ-AMP and OptoINVRT circuits to respectively control cellular growth and the biosynthetic pathway for a chemical of interest. As seen in FIG. 19A, in *S. cerevisiae* fermentations, pyruvate decarboxylases (Pdc enzymes encoded by PDC1, PDC5, and PDC6) compete with metabolic pathways of interest that utilize pyruvate, producing ethanol as an undesirable fermentation byproduct. However, deleting all three PDC genes results in strains that are unable to grow on glucose. To overcome this challenge, OptoQ-AMP1 was used to control the expression of PDC1 from $P_{5xQUASf}$ in a Pdc-deficient (pdc1, pdc5, pdc6) strain, resulting in strain yMAL241. With this optogenetic amplifier, a single copy of $P_{DC1}$ is sufficient to recover growth on glucose, even at light doses as low as 10% (100 s ON/900 s OFF duty cycles). This contrasts with previous similar light-dependent strains obtained without amplification (using VP16-EL222 in the direct OptoEXP circuit), which require six copies of PDC1 driven by $P_{C120}$ and full light to grow on glucose. Although this new light-dependent strain exhibits a longer lag phase, there is no reduction in biomass accumulation compared to a wild-type control. OptoQ-AMP1 thus provides sufficient transcriptional amplification to optogenetically control growth of Pdc-deficient yeast using a single copy of PDC1.

Using OptoINVRT7, we then set out to redirect pyruvate in yMAL241 toward the biosynthesis of a desired chemical during a darkness-induced production phase. This capability was demonstrated for the production of acetoin, a desired food flavoring agent known for its buttery odor, whose biosynthetic pathway directly competes for pyruvate with ethanol production. A construct was integrated into δ-sites of yMAL241, the construct containing two enzymes from *Bacillus subtilis* that convert pyruvate to acetoin: α-acetolactate synthase (alsS) under the control of the $P_{GAL1}$ hyperactive derivative $P_{GAL1-S}$ which makes it dark-inducible with OptoINVRT7, and α-acetolactate decarboxylase (alsD) constitutively expressed with $P_{CCW12}$, naming the resulting strain yMAL322. As controls, testing used strains with a light-inducible PDC1 but a constitutively expressed acetoin pathway (controlling growth only), an endogenous PDC1 but a dark-inducible acetoin pathway (controlling production only), and an endogenous PDC1 and a constitutively expressed acetoin pathway (controlling neither growth nor production).

Specifically, to construct a strain that allows for optogenetic control over cellular growth, linearized pMAL566 (OptoQ-AMP1 driving PDC1) was integrated into YEZ207, then counter-selected against plasmid pJLA121-PDC1$^{0202}$ using 5-FOA, creating yMAL241. To verify that this strain could only grow under blue light, overnight cultures of CEN.PK2-1C and yMAL241 were inoculated in SC+2% glucose media under blue light. Each culture was then diluted to 0.01 OD$_{600}$ and grown at 30° C., 200 rpm, either under continuous (100%) blue light or in darkness (wrapped in aluminum foil), taking OD600 measurements until reaching steady state. The BDH1 gene (which converts acetoin into 2,3-butanediol) was deleted from yMAL241, creating strain yMAL311.

Plasmids pMAL557 and pMAL558 contain the acetoin biosynthetic pathway, α-acetolactate synthase (AlsS) and α-acetolactate decarboxylase (AlsD) from *Bacillus subtilis*, for multicopy integration into δ-sites (YARCdelta5) within the yeast genome. The first gene in the pathway, alsS, is expressed constitutively using $P_{TDH3}$ (pMAL557) or in darkness using $P_{GAL1-S}$ (pMAL558). Linearized pMAL558 was integrated into yMAL311, creating yMAL322. To make a control strain that lacks optogenetic regulation of acetoin production, linearized pMAL557 was integrated into yMAL311, creating yMAL323. Transformants were plated on YPD agar overnight and grown under full blue light. The next day, colonies were replica plated onto YPD agar supplemented with 1200 m/mL Zeocin.

To make a control strain that lacks optogenetic control of growth, pJLA121-PDC1$^{0202}$ was removed from YEZ207 using 5-FOA and the endogenous copy of $P_{DC1}$ (in its original locus) was then restored, creating yMAL327. Linearized OptoQ-AMP1 (pMAL743) was integrated into the LEU2 locus, creating yMAL328. BDH1 was then deleted from yMAL328, creating yMAL331. Finally, linearized pMAL558 was integrated into the δ-sites of yMAL331, creating yMAL332. To make a control strain that lacks optogenetic control of both growth and production, linearized pMAL557 was integrated into the δ-sites of yMAL331, creating yMAL364. Transformants were plated on YPD agar overnight; transformants for yMAL332 were grown under full blue light to avoid potential negative selection due to pathway expression. The next day, colonies were replica plated onto YPD agar supplemented with 1200 m/mL Zeocin.

Figure 19B:
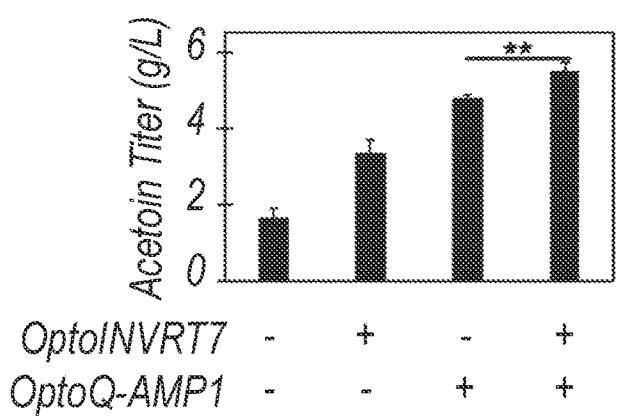
FIG. 19B is a graph showing acetoin production in fermentations of 48 h and 20 g/L glucose when constitutively expressing endogenous $P_{DC1}$ and alsS from $P_{TDH3}$ (yMAL364); expressing endogenous $P_{DC1}$ and alsS from $P_{GAL1-S}$ controlled by OptoINVRT7, using $\rho_s=0.2$ (yMAL332); expressing $P_{DC1}$ from $P_{5xQUASf}$ controlled by OptoQ-AMP1 and alsS from $P_{TDH3}$, using $\rho_s=0.3$ (yMAL323); or expressing $P_{DC1}$ from $P_{5xQUASf}$ controlled by OptoQ-AMP1 and alsS from $P_{GAL1-S}$ controlled by OptoINVRT7, using $\rho_s=0.5$ (yMAL322)

To compare acetoin production in each optogenetically controlled strain, we optimized the cell density at which cultures are switched from growth to production ($\rho_s$). For all three strains, acetoin production is maximized at relatively low $\rho_s$ values ($\rho_s$=0.2-0.5). Strain yMAL322, using both OptoQ-AMP1 and OptoINVRT7, achieves the highest maximum titers of the three, with 5.5±0.2 g/L, while the strain using only OptoINVRT7 to control alsS achieves the lowest with 3.4±0.3 g/L. Therefore, using amplifier and inverter circuits simultaneously to dynamically controlling both cell growth (PDC1) and acetoin biosynthesis (alsS) results in the highest acetoin production. This is demonstrated by yMAL322 achieving 232% higher titers than a strain without growth or production control, which is also higher than titers obtained from strains controlling only growth (with OptoQ-AMP1) or only production (with OptoINVRT7) by 16% and 65%, respectively (See FIG. 19B). For this metabolic branch point, regulating growth (PDC1) appears to be more critical than regulating production (alsS), as indicated by comparing acetoin production in strains using only one optogenetic circuit. Nevertheless, controlling both growth and production leads to the highest production, demonstrating the value in using simultaneous amplification and inversion of optogenetic responses, specifically in this case, in metabolic engineering for chemical production.

The ability to tune gene expression without manipulating process conditions or media components makes light an attractive option for inducing gene expression. It has been previously shown that pulsing light during the production phase of a fermentation could restore $NAD^+$ levels through transient PDC1 expression, thus preventing premature metabolic arrest and improving isobutanol titers. Therefore, it was set out to determine if simultaneous optogenetic amplification and inversion could enhance the effect of this strategy to boost acetoin production, whose biosynthesis also results in an $NAD^+/NADH$ imbalance. Light-controlled fermentations was carried out in synthetic complete medium with 15% glucose and light-pulsed production phases using yMAL322, containing both OptoQ-AMP1 and OptoINVRT7 (to control growth and production, respectively), as well as control strains containing only one of each circuit. The cultures were incubated under continuous light stimulation during the growth phase until the optimal $\rho_s$ value was reached for each strain. Following a 2 h incubation in the dark, cells were pelleted and resuspended in fresh media, then started a production phase in which different light schedules were applied.

Eight colonies from each transformation plate were screened for acetoin production. Each colony was used to inoculate 1 mL of SC+2% glucose media in 24-well plates and grown overnight under blue light. The cultures were back-diluted to $OD_{600}$=0.1 and grown under blue light for approximately 6 h, at which point $OD_{600}$=1.5. At this point, the plates were wrapped in aluminum foil and the cultures were incubated in the dark for 2 h as previously described. The cultures were then centrifuged in a Sorvall Legend XTR at 2000 rpm for 10 min and resuspended in fresh SC+2% glucose media. Plates were then sealed with Sealing Tape (Excel Scientific, Victorville, CA, U.S.A.; Catalog No. STR-SEAL-PLT) and incubated in the dark for 48 h. Cultures were harvested and centrifuged at 2000 rpm for 10 min. Supernatants were analyzed with GC-FID as described below. The highest producing colonies of yMAL322, yMAL323, and yMAL332 were selected for subsequent optimization.

To find the optimal cell density at which to switch cultures from light to dark, $\rho_s$, overnight cultures were grown of yMAL322, yMAL323, and yMAL332 under blue light in SC+2% glucose. The cultures were back-diluted to different initial $OD_{600}$ values, ranging from 0.01 to 0.2, in 1 mL quadruplicates. The strains were then grown for approximately 12 h under continuous blue light, at which point OD600=0.2–3.9. We then incubated the cultures in the dark for 2 h. The cultures were then centrifuged in a Sorvall Legend XTR at 2000 rpm for 10 min and resuspended in fresh SC+2% glucose media. Plates were then sealed with sealing tape and incubated in the dark for 48 h. Control cultures were grown under constant blue light throughout the fermentation. Cultures were harvested and centrifuged at 2000 rpm for 10 min. Supernatants were analyzed with GC-FID as described below.

To investigate the benefit of pulsing light during the production phase of high glucose fermentations, overnight cultures were grown of yMAL322, yMAL323, and yMAL332 under blue light in SC+2% glucose. The cultures were back-diluted to $OD_{600}$=0.1 in 1 mL triplicates and grown under blue light for approximately 4 h at which point $OD_{600}$=0.2–0.5. We then incubated the cultures in the dark for 2 h. The cultures were then centrifuged in a Sorvall Legend XTR at 2000 rpm for 10 min and resuspended in fresh SC+15% glucose media. Plates were then sealed with sealing tape and incubated for 96 h under the light schedule: 4 h of constant blue light, followed by blue light pulses of 10 s ON/90 s OFF for 30 min every 2, 6, or 10 h. Control cultures were grown under constant blue light or darkness following resuspension in fresh media. Cultures were harvested and centrifuged at 2000 rpm for 10 min. Supernatants were analyzed with GC-FID as described below.

Figure 19C:
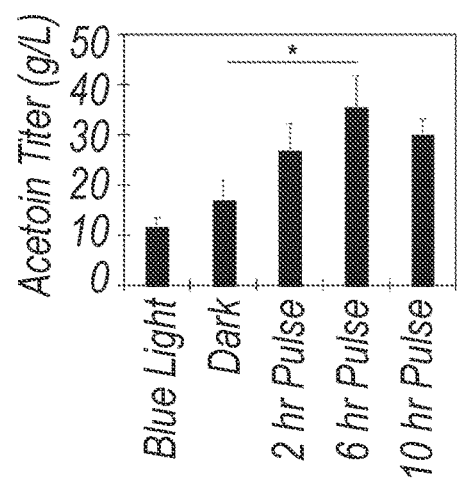
FIG. 19C is a graph showing acetoin production in fermentations of 96 h and 150 g/L glucose using $\rho_s=0.5$ for yMAL322. During the production phase (following resuspension in fresh media), cultures were incubated in full blue light for 4 h, then subjected to light duty cycles of 10 s ON/90 s OFF (10% light) for 30 min every 2, 6, or 10 h. Control cultures were kept in blue light or darkness for the entire production phase.
Figure 19D:
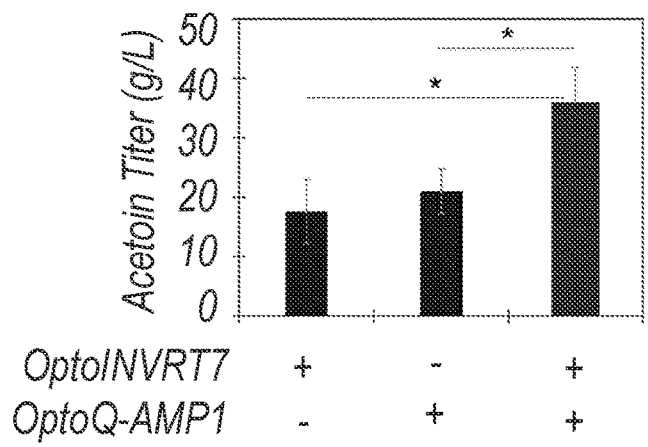
FIG. 19D is a graph showing acetoin production in fermentations of 96 h and 150 g/L glucose using $\rho_s=0.5$ and a duty cycle of 10 s ON/90 s OFF (10% light) for 30 min every 6 h during the production phase for yMAL322; $\rho_s=0.3$ and full darkness during the production phase for yMAL323; or $\rho_s=0.2$ and full darkness during the production phase for yMAL332.

Periodic light pulses during the production phase do not increase acetoin production in strains containing only OptoQ-AMP1 or OptoINVRT7 relative to their production in full darkness (21±4 and 18±5 g/L, respectively). In contrast, acetoin titers increase up to 111% in yMAL322 using light pulses compared to its production in full darkness; while acetoin production reaches 17±4 g/L in full darkness, it achieves 35±6 g/L when using a 10 s ON/90 s OFF duty cycle (10% light dose) for 30 min every 6, during the 96-h production phase. See FIG. 19C. This maximum titer achieved by yMAL322 is 68% and 100% higher than those reached by strains containing only OptoQ-AMP1 or OptoINVRT7 in full darkness, respectively. See FIG. 19D. These results thus demonstrate that simultaneous amplification and inversion of metabolic optogenetic responses can boost the production benefits of periodically operating light-responsive fermentations with light pulses.

Simultaneous Optogenetic Amplification and Inversion to Fine-Tune Enzyme Levels. As a second demonstration of the utility of optogenetic bidirectional control, optogenetic amplifier and inverter circuits were combined to achieve a delicate balance of metabolic pathways that carry lower fluxes. These circuits can fine-tune the production levels of different proteins by varying light exposure. For example, expression levels of two fluorescent proteins (GFP and BFP) in the same strain can be tuned using different light duty cycles with a 10% light dose (10 s ON/90 s OFF duty cycle) resulting in intermediate levels of both GFP and BFP expression.

Figure 20A:
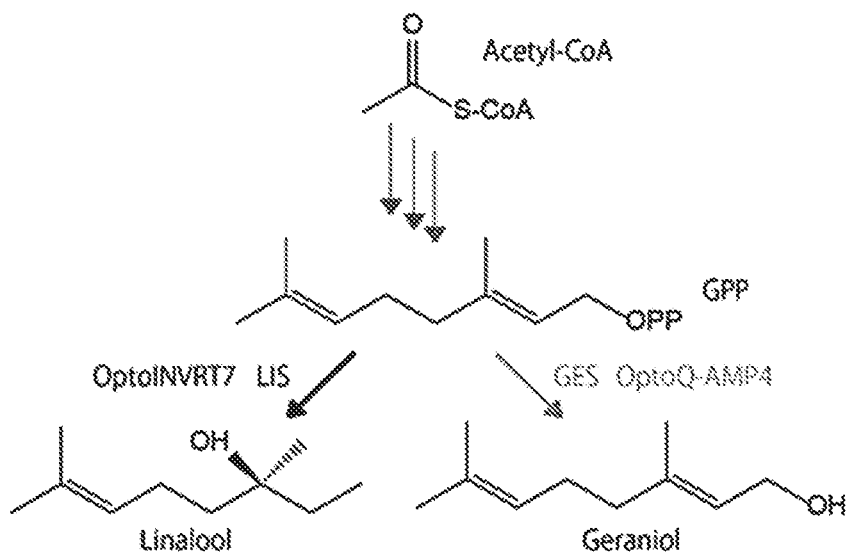
FIG. 20A is an illustration of the metabolic branch point between geraniol (ObGES) and linalool (McLIS) production, where ObGES is expressed from $P_{5xQUASf}$ controlled by OptoQ-AMP4 and McLIS is expressed from $P_{GAL1-S}$ controlled by OptoINVRT7.
Figure 20B:
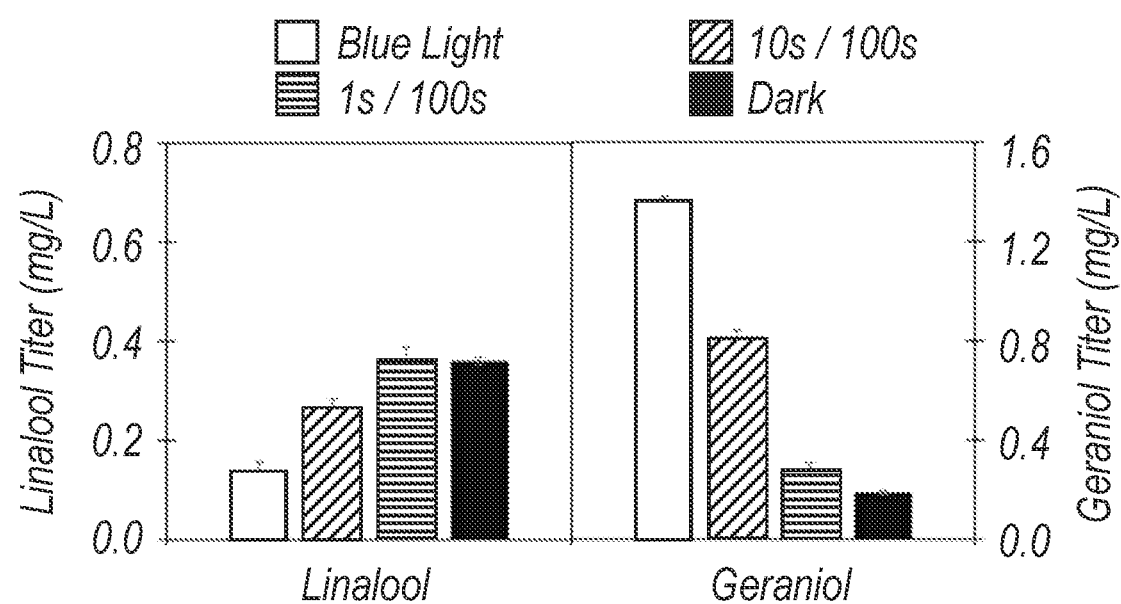
FIG. 20B is a graph showing tunability of geraniol and linalool production using both OptoINVRT7 and OptoQ-AMP1 in the same strain (yMAL360) under different doses of blue light: full light (100% light), 10 s ON/90 s OFF (10% light), 1 s ON/99 s OFF (1% light), and full darkness (0% light).

Thus, it was reasoned that such control could be extended to biosynthetic enzymes for fine-tuning blends of chemicals in which composition is more important than final titers. To test this hypothesis, the OptoINVRT7 and OptoQ-AMP4 circuits were utilized to simultaneously regulate the biosyntheses of geraniol and linalool (see FIG. 20A), two monoterpenes implicated as primary contributors to the hoppy flavor in beer. In a previous study, a combinatorial expression library was used to generate strains of brewer's yeast with different levels of geraniol and linalool production, from which beer of desired flavor profiles could be achieved. By controlling geraniol production with an optogenetic amplifier circuit and linalool production with an inverter circuit, we sought to instead apply different light pulses to adjust the composition of these hoppy flavor monoterpenes in fermentations using a single strain. To balance geraniol and linalool production with light, OptoQ-AMP4 was used to control the expression of geraniol synthase from *Ocimum basilicum* (ObGES) from $P_{5xQUAS}$; and OptoINVRT7 was used to control the expression of linalool synthase from *Mentha citrata* (McLIS) from $P_{GAL1-S}$. See FIG. 20A. The resulting strain, yMAL360, can produce blends of different compositions of geraniol and linalool depending on the light duty cycles to which the fermentation is exposed, favoring geraniol production with increasing light doses, and linalool with longer periods of darkness (see FIG. 20B). Linalool production saturates at lower light duty cycles (1 s ON/99 s OFF), reaching maximum titers of 0.36±0.01 mg/L. In contrast, geraniol concentrations remained tunable within the range of light-duty cycles tested, reaching as much as 1.4±0.1 mg/L in full light. These results imply that McLIS has lower catalytic activity than ObGES, given that the level of expression achieved with OptoINVRT7 using $P_{GAL1-S}$ is 2.5-fold that of $P_{TEF1}$, while OptoQ-AMP4 achieves 1.4-times $P_{TEF1}$ levels. Higher linalool production could likely be attained by using a mutant LIS with higher activity, adding an N-terminal SKIK tag to improve expression, or introducing additional copies of LIS. Nevertheless, the ability to use light to fine-tune the composition of geraniol-linalool blends in a single strain demonstrates the vast potential of combining optogenetic amplifier and inverter circuits to balance metabolic pathways, whether they carry high or low metabolic fluxes.

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like.

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof. As such, the appropriate scope of the invention is to be determined according to the claims.

What is claimed:

1. A method for operating fermentations with a plurality of temporal phases, comprising:
   fermenting yeast grown from a yeast cell comprising:
      a first optogenetic gene expression system comprising:
         (a) a first sequence encoding a transcriptional activator under a first promoter;
         (b) optionally, a second sequence encoding a transcriptional repressor under a second promoter;
         (c) a third sequence encoding a protein or enzyme of interest downstream of a promoter activated by the transcriptional activator; and
         (d) a fourth sequence encoding a light-responsive transcription factor that controls the first promoter; and
   while fermenting, exposing the yeast culture to a plurality of different temporal phases, where each different temporal phase has a change in specific light-duty schedule from the previous different temporal phase.

2. The method according to claim 1, wherein the specific light-duty schedule in each temporal phase is constant across the temporal phase.

3. The method according to claim 1, wherein the specific light-duty schedule in at least one temporal phase continuously changes from an initial light condition to a final light condition.

4. The method according to claim 1, wherein at least one specific light-duty schedule includes darkness, at least one specific light-duty schedule includes constant light exposure, and at least one specific light-duty schedule includes conditions in which multiple cycles of light are on for a first period of time and off for a second period of time, where the second period of time is greater than or equal to the first period of time.

* * * * *